(12) United States Patent
Choudhury et al.

(10) Patent No.: US 9,100,285 B1
(45) Date of Patent: Aug. 4, 2015

(54) DYNAMIC CONTROL CHANNEL ESTABLISHMENT FOR SOFTWARE-DEFINED NETWORKS HAVING CENTRALIZED CONTROL

(71) Applicant: Juniper Networks, Inc., Sunnyvale, CA (US)

(72) Inventors: Abhijit K. Choudhury, Cupertino, CA (US); James M. Murphy, Alameda, CA (US); Pradeep Sindhu, Los Altos Hills, CA (US); Jayabharat Boddu, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/672,058

(22) Filed: Mar. 27, 2015

Related U.S. Application Data

(63) Continuation-in-part of application No. 14/231,350, filed on Mar. 31, 2014, which is a continuation of application No. 13/842,453, filed on Mar. 15, 2013, now Pat. No. 8,693,374.

(60) Provisional application No. 61/738,955, filed on Dec. 18, 2012.

(51) Int. Cl.
*H04L 12/28* (2006.01)
*H04L 12/751* (2013.01)
(Continued)

(52) U.S. Cl.
CPC ............ *H04L 45/026* (2013.01); *H04L 45/021* (2013.01); *H04L 45/122* (2013.01); *H04L 45/507* (2013.01); *H04L 45/68* (2013.01)

(58) Field of Classification Search
None
See application file for complete search history.

(56) References Cited

U.S. PATENT DOCUMENTS 7,263,061 B2 * 8/2007 Yamada ................ 370/217
7,286,529 B1 * 10/2007 Thomas ................ 370/389
(Continued)

FOREIGN PATENT DOCUMENTS

CN   1488215 A   4/2004
EP   1653688 A1  10/2005
(Continued)

OTHER PUBLICATIONS

"Open Flow 1.2," Open Flow Switch Specification, Version 1.2 (Wire Protocol 0x03), Open Network Foundation, Dec. 5, 2011, 83 pp.
(Continued)

*Primary Examiner* — Afshawn Towfighi
(74) *Attorney, Agent, or Firm* — Shumaker & Sieffert, P.A.

(57) ABSTRACT

Dynamic control channel establishment for an access network is described in which a centralized controller provides seamless end-to-end service from a core-facing edge of a network to access nodes. For example, a method includes receiving, by the centralized controller, a discover message originating from a network node, which includes an intermediate node list that specifies a plurality of network nodes the discover message traversed from the network node to an edge node, determining, based on the plurality of nodes specified by the discover message, a path from the edge node to the network node, allocating each of a plurality of Multi-protocol Label Switching (MPLS) labels to a respective outgoing interface of each of the plurality of network nodes, and outputting one or more control messages for configuring the network node, wherein the control messages are encapsulated within a label stack comprising the allocated plurality of labels.

16 Claims, 37 Drawing Sheets

(51) Int. Cl.
*H04L 12/733* (2013.01)
*H04L 12/723* (2013.01)
*H04L 12/755* (2013.01)
*H04L 12/721* (2013.01)

(56) References Cited

U.S. PATENT DOCUMENTS

| | | | |
|---|---|---|---|
| 8,018,880 | B2 | 9/2011 | Figueira et al. |
| 8,085,791 | B1 | 12/2011 | Aggarwal et al. |
| 8,259,718 | B2 | 9/2012 | Akahane et al. |
| 8,504,718 | B2 | 8/2013 | Wang et al. |
| 8,635,326 | B1 | 1/2014 | Chaganti et al. |
| 8,693,374 | B1 | 4/2014 | Murphy et al. |
| 8,700,801 | B2 | 4/2014 | Medved et al. |
| 8,711,855 | B1 | 4/2014 | Murphy et al. |
| 8,885,463 | B1 | 11/2014 | Medved et al. |
| 2002/0071390 | A1* | 6/2002 | Reeves et al. ............ 370/235 |
| 2003/0026268 | A1 | 2/2003 | Navas |
| 2004/0120710 | A1* | 6/2004 | Seddigh et al. ............ 398/33 |
| 2005/0117576 | A1 | 6/2005 | McDysan et al. |
| 2005/0152286 | A1 | 7/2005 | Betts et al. |
| 2007/0286198 | A1 | 12/2007 | Muirhead et al. |
| 2008/0159311 | A1* | 7/2008 | Martinotti et al. ........ 370/401 |
| 2008/0225864 | A1 | 9/2008 | Aissaoui et al. |
| 2008/0228943 | A1 | 9/2008 | Balus et al. |
| 2008/0239970 | A1* | 10/2008 | Lu et al. ............ 370/245 |
| 2008/0247406 | A1 | 10/2008 | Figueira et al. |
| 2011/0235524 | A1 | 9/2011 | North et al. |
| 2011/0235545 | A1 | 9/2011 | Subramanian et al. |
| 2012/0320926 | A1 | 12/2012 | Kamath et al. |
| 2013/0083782 | A1 | 4/2013 | Murphy et al. |
| 2013/0103818 | A1 | 4/2013 | Koponen et al. |
| 2013/0121164 | A1 | 5/2013 | Shabtay et al. |
| 2014/0211615 | A1 | 7/2014 | Murphy et al. |

FOREIGN PATENT DOCUMENTS

| | | | |
|---|---|---|---|
| EP | 1653675 | A1 | 5/2006 |
| EP | 1653690 | A1 | 5/2006 |
| WO | 2008118467 | A1 | 10/2008 |

OTHER PUBLICATIONS

"Wireless Mesh," Black Box Network Services, blackbox.com/go/SmartPath, first accessed Sep. 14, 2011, 12 pp.

Atlas et al., "Interface to the Routing System Framework," Network Working Group, Internet-Draft, Jul. 30, 2012, 21 pp.

Choudhury et al., "Cloud Control Protocol,"draft-ccp-02, Network Working Group, Internet-Draft, Nov. 16, 2012, 21 pp.

European Search Report from European Counterpart Application No. 13197643.3, dated Feb. 26, 2014, 8 pp.

Fedyk et al., "GMPLS Control of Ethernet IVL Switches," Nortel, Oct. 2005, 16 pp.

Furquan et al., "ForCES Element Bindings and Topology Discovery Protocol: draft-anasari-forces-discovery-00.txt," Lucent Tech. Hormuzd Khosravi Intel Corp., Jul. 10, 2004, 14 pp.

Gredler et al., "Advertising Link-State Information in BGP," draft-gredler-bgp-te-01, Inter-Domain Routing, Internet-Draft, Jul. 11, 2011, 24 pp.

Open Network Foundation, Open Flow Switch Specification, Version 1.2 (Wire Protocol 0x03), Dec. 5, 2011, 83 pp.

Vasseur et al., Path Computation Element (PCE) Communication Protocol (PCEP), Network Working Group, RFC 5440, Mar. 2009, 88 pp.

Elz, et al., "Serieal No. Arithmetic," Network Working Group, RFC 1982, Aug. 1996, 7 pp.

U.S. Appl. No. 14/500,793 filed by Choudhury et al., on Sep. 29, 2014.

U.S. Appl. No. 14/672,068 filed by Choudhury et al., on Mar. 27, 2015.

Prosecution History from U.S. Appl. No. 13/842,453, from Jul. 1, 2013 through Nov. 22, 2013, 52 pp.

Prosecution History from U.S. Appl. No. 13/842,796, from Sep. 9, 2013 through Feb. 20, 2014, 47 pp.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Service Name...                                                |
.                                                                .
.                                                                .
+-+-+-+-+-+-+-+-+-+-+-+-+-+-+-+-+-+-+-+-+-+-+-+-+-+-+-+-+-+-+-+-+
|           ... Service Name    |      Type     |    Affinity   |
+-+-+-+-+-+-+-+-+-+-+-+-+-+-+-+-+-+-+-+-+-+-+-+-+-+-+-+-+-+-+-+-+
```

FIG. 24

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |              Port             |
+-+-+-+-+-+-+-+-+-+-+-+-+-+-+-+-+-+-+-+-+-+-+-+-+-+-+-+-+-+-+-+-+
|                         Subscriber MAC                         |
+-+-+-+-+-+-+-+-+-+-+-+-+-+-+-+-+-+-+-+-+-+-+-+-+-+-+-+-+-+-+-+-+
|   Subscriber MAC (Continued)  |             Status            |
+-+-+-+-+-+-+-+-+-+-+-+-+-+-+-+-+-+-+-+-+-+-+-+-+-+-+-+-+-+-+-+-+
```

FIG. 25

DYNAMIC CONTROL CHANNEL ESTABLISHMENT FOR SOFTWARE-DEFINED NETWORKS HAVING CENTRALIZED CONTROL

This application is a continuation-in-part of U.S. application Ser. No. 14/231,350, filed Mar. 31, 2014, which is a continuation of U.S. application Ser. No. 13/842,453, filed Mar. 15, 2013, now U.S. Pat. No. 8,693,374, which claims the benefit of U.S. Provisional Application No. 61/738,955, filed Dec. 18, 2012, the entire contents of each of which being incorporated herein by reference.

TECHNICAL FIELD

The disclosure relates to packet-based computer networks.

BACKGROUND

A wide variety of computing devices connect to service provider networks to access resources and services provided by packet-based data networks, such as the Internet, enterprise intranets, content providers and virtual private networks (VPNs). For example, many fixed computing devices utilize fixed communication links, such as optical, digital subscriber line, or cable-based connections, of service provider networks to access the packet-based services. In addition, a vast amount of mobile computing devices, such as cellular or mobile smart phones and feature phones, tablet computers, and laptop computers, utilize mobile connections, such as cellular radio access networks of the service provider networks, to access the packet-based services.

Each service provider network typically provides an extensive access network infrastructure to provide packet-based data services to the offered services. The access network typically includes a vast collection of access nodes, aggregation nodes and high-speed edge routers interconnected by communication links. These access devices typically execute various protocols and exchange signaling messages to anchor and manage subscriber sessions and communication flows associated with the subscribers. For example, the access devices typically provide complex and varied mechanisms for authenticating subscribers, identifying subscriber traffic, applying subscriber policies to manage subscriber traffic on a per-subscriber basis, applying various services to the traffic and generally forwarding the traffic within the service provider network.

As such, access networks represent a fundamental challenge for service providers and often require the service providers to make difficult tradeoffs over a wide range of user densities. For example, in some environments, user densities may exceed several hundred thousand users per square kilometer. In other environments, user densities may be as sparse as one or two users per square kilometer. Due to this diversity of requirements, access networks typically make use of a host of heterogeneous communication equipment and technologies.

SUMMARY

In general, techniques are described for dynamic control channel establishment for an access/aggregation network in which a centralized controller provides seamless end-to-end service from a core-facing edge of a service provider network through aggregation and access infrastructure out to access nodes located proximate to endpoints such as subscriber devices. The controller operates to provide a central configuration point for configuring access nodes and aggregation nodes of an access/aggregation network of the service provider to provide transport services to transport traffic between access nodes and edge routers on opposite borders of the aggregation network. A control channel between an access node and the controller is dynamically established in accordance with the techniques of this disclosure, and then the access node and the controller can exchange various control messages using the dynamically established control channel for subscriber management and network service integration.

The architectures described herein provide centralized control over the various network nodes within the network (e.g., access nodes and aggregation nodes), and support a separation of control plane and data plane, with the network nodes supporting full data-plane functionality but only a limited control plane with no persistent configuration. The more complex control functions are centralized at one or more controllers, which in turn configure the limited control planes of the network nodes. This enables lower total cost of ownership as the network nodes themselves can be simpler and less expensive, while the controller allows a single touchpoint in the network that allows better control and management.

In one example aspect, a method includes sending, by a network node, a plurality of hello messages to neighboring network nodes within a network, wherein each of the plurality of hello messages is sent on a different respective network link coupled to the network node and includes an indicator specifying a respective distance as a number of network hops from the network node to a centralized controller that manages the network, receiving, by the network node, a plurality of hello reply messages from respective neighboring network nodes within the network in response to the plurality of hello messages, wherein each of the plurality of hello reply messages is received on a different respective network link coupled to the network node and includes a respective indicator specifying a respective distance as a number of network hops from the respective neighboring network node sending the hello reply messages to a centralized controller that manages the network, and determining, by the network node and based at least in part on the respective distance specified by one or more of the plurality of hello reply messages received from the neighboring network nodes, an active one of the network links coupled to the network node to one of the neighboring network nodes having a shortest distance to the centralized controller. The method also includes forwarding, by the network node, a discover message on the active link to the neighboring network node having the shortest distance to the centralized controller, wherein the discover message includes a neighbor node list specifying a set of neighboring network nodes from which hello reply packets were received and an intermediate node list that will specify a set of network nodes the discover message will traverse; and after receiving a discover reply message sent by the centralized controller in response to the centralized controller receiving the discover message, sending, by the network node, a control message to the centralized controller encapsulated with a Multi-protocol Label Switching (MPLS) label that indicates the control message is to be automatically forwarded by a receiving one of the network nodes along a shortest path toward the centralized controller.

In another example aspect, a network node includes one or more processors; one or more physical interfaces configured to send a plurality of hello messages to neighboring network nodes within a network, wherein each of the plurality of hello messages is sent on a different respective network link coupled to the network node and includes an indicator specifying a respective distance as a number of network hops from the network node to a centralized controller that manages the network, wherein the one or more physical interfaces receive a plurality of hello reply messages from respective neighboring network nodes within the network in response to the plurality of hello messages, wherein each of the plurality of hello reply messages is received on a different respective network link coupled to the network node and includes a respective indicator specifying a respective distance as a number of network hops from the respective neighboring network node sending the hello reply messages to a centralized controller that manages the network. The network node also includes a protocol module executing on the one or more processors, wherein the protocol module is configured to determine, based at least in part on the respective distance specified by one or more of the plurality of hello reply messages received from the neighboring network nodes, an active one of the network links coupled to the network node to one of the neighboring network nodes having a shortest distance to the centralized controller, wherein the protocol module is configured to forward a discover message on the active link to the neighboring network node having the shortest distance to the centralized controller, wherein the discover message includes a neighbor node list specifying a set of neighboring network nodes from which hello reply packets were received and an intermediate node list that will specify a set of network nodes the discover message will traverse; and wherein the protocol module is configured to, after receiving a discover reply message sent by the centralized controller in response to the centralized controller receiving the discover message, send a control message to the centralized controller encapsulated with a MPLS label that indicates the control message is to be automatically forwarded by a receiving one of the network nodes along a shortest path toward the centralized controller.

In a further example aspect, a method includes receiving, by a centralized controller, a discover message originating from a network node, wherein the discover message includes an intermediate node list that specifies a plurality of network nodes the discover message traversed from the network node to an edge node; determining, by the centralized controller and based on the plurality of nodes specified by the discover message, a path from the edge node to the network node; allocating, by the centralized controller, each of a plurality of Multi-protocol Label Switching (MPLS) labels to a respective outgoing interface of each of the plurality of network nodes; and outputting, by the centralized controller, one or more control messages for configuring the network node, wherein the control messages are encapsulated within a label stack comprising the allocated plurality of labels.

In another example aspect, a centralized controller includes one or more physical interfaces configured to receive a discover message originating from a network node, wherein the discover message includes an intermediate node list that specifies a plurality of network nodes the discover message traversed from the network node to an edge node; a path computation module configured to determine, based on the plurality of nodes specified by the discover message, a path from the edge node to the network node; and a path provisioning module configured to allocate each of a plurality of Multi-protocol Label Switching (MPLS) labels to a respective outgoing interface of each of the plurality of network nodes, wherein the one or more physical interfaces are configured to output one or more control messages for configuring the network node, wherein the control messages are encapsulated within a label stack comprising the allocated plurality of labels, and wherein the one or more physical interfaces are configured to receive one or more control messages from the network node.

In a further example aspect, a method includes by a centralized controller, dynamically establishing a control channel between the centralized controller and an access node in a software-defined network having a plurality of network nodes managed by the centralized controller; receiving, by the centralized controller, a services indication message from a network node of the plurality of network nodes, wherein the services indication message indicates one or more network services provided by the network node in a software-defined network having a plurality of network nodes managed by the centralized controller; establishing, by a centralized controller, a transport label switched path (LSP) between the access node and the network node to transport network packets between the access node and the network node; receiving, by the centralized controller, an endpoint indication message from the access node via the control channel, wherein the endpoint indication message indicates that an endpoint that has joined the network at the access node; responsive to determining that a pseudo wire is needed between the access node and the network node to provide to the endpoint a network service of the one or more network services, outputting, by the centralized controller, a pseudo wire request message via the control channel to install forwarding state on the access node for creating the pseudo wire between the access node and the network node; and outputting, by the centralized controller, a direct switch message via the control channel to configure the access node to map traffic received from the endpoint to the pseudo wire.

In another example aspect, a centralized controller is configured to dynamically establish a control channel between the centralized controller and an access node in a software-defined network having a plurality of network nodes managed by the centralized controller, the centralized controller includes one or more physical interfaces configured to receive a services indication message from a network node of the plurality of network nodes, wherein the services indication message indicates one or more network services provided by the network node; and a path provisioning module configured to establish a transport label switched path (LSP) between the access node and the network node to transport network packets between the access node and the network node, wherein the one or more physical interfaces are configured to receive an endpoint indication message from the access node via the control channel, wherein the endpoint indication message indicates that an endpoint that has joined the network at the access node. The path provisioning module is configured to, responsive to determining that a pseudo wire is needed between the access node and the network node to provide to the endpoint a network service of the one or more network services, output a pseudo wire request message via the control channel to install forwarding state on the access node for creating the pseudo wire between the access node and the network node, and wherein the path provisioning module is configured to output a direct switch message via the control channel to configure the access node to map traffic received from the endpoint to the pseudo wire.

In a further example, a method includes dynamically establishing a control channel between a centralized controller and an access node in a software-defined network having a plurality of network nodes managed by the centralized controller; establishing a transport label switched path (LSP) between the access node and a network node of the plurality of network nodes to transport network packets between the access node and the network node; sending, by the access node and to the centralized controller via the control channel, an endpoint indication message that indicates that an endpoint that has joined the network at the access node; receiving, by the access node, a pseudo wire request message from the centralized controller via the control channel to install forwarding state for creating a pseudo wire to the access node for providing one or more network services to the endpoint; and receiving, by the access node, a direct switch message from the centralized controller via the control channel to configure the access node to map traffic received from the endpoint to the pseudo wire.

In a further example, an access node includes one or more processors; a protocol module executing on the one or more processors, wherein the protocol module is configured to dynamically establish a control channel between the access node and a centralized controller in a software-defined network having a plurality of network nodes managed by the centralized controller, wherein the protocol module is configured to establish a transport label switched path (LSP) between the access node and a network node of the plurality of network nodes to transport network packets between the access node and the network node, wherein the protocol module is configured to send, to the centralized controller via the control channel, an endpoint indication message that indicates that an endpoint that has joined the network at the access node, wherein the protocol module is configured to receive a pseudo wire request message from the centralized controller via the control channel to install forwarding state for creating a pseudo wire to the access node for providing one or more network services to the endpoint, and wherein the protocol module is configured to receive a direct switch message from the centralized controller via the control channel to configure the access node to map traffic received from the endpoint to the pseudo wire.

The techniques of this disclosure may provide one or more advantages. For example, the techniques of this disclosure can allow for reduced total cost of ownership (TCO) of service provider networks, with the ability to increase capacity at reasonable cost and being able to manage the networks and deploy services efficiently. The availability of cost-effective Ethernet solutions has helped the migration towards converged packet networks in the access and aggregation space, and MPLS has become the transport of choice for packetized traffic. However, this disclosure describes an architecture for access/aggregation networks that is based on packet switching, supports wired and mobile users, scales easily to support thousands of infrastructure nodes, such as routers and switches, as the service provider network grows, and makes the control and management of the large networks easier.

The new architectures and techniques described herein for access/aggregation networks may facilitate seamless plug-and-play insertion of nodes within the service provider networks, requiring little or no manual configuration. The nodes can join the network, discover their neighbors and be able to download configurations. Among other advantages, this helps reduce the overall operational expenses of the network.

The centralized control plane (or controller) becomes the site for centralized intelligence in the network and supports programmability. This provides a foundation for software-defined networking (SDN) in the access/aggregation networks with a high level northbound application programming interface (API). Applications can be written on this platform to utilize the information that is gathered from the network and made available at the controller.

The controller also allows the centralized configuration and management of Network Services (L3VPN, EVPN, VPLS, and Internet) which are bound by location or identity. The architecture is highly reliable by design, so that it can provide the level of service availability that service providers expect.

BRIEF DESCRIPTION OF THE DRAWINGS

FIG. 24 is a block diagram illustrating an example Services Indication Message Structure.

FIG. 25 is a block diagram illustrating an example Endpoint Indication Structure.

DETAILED DESCRIPTION

Figure 1:
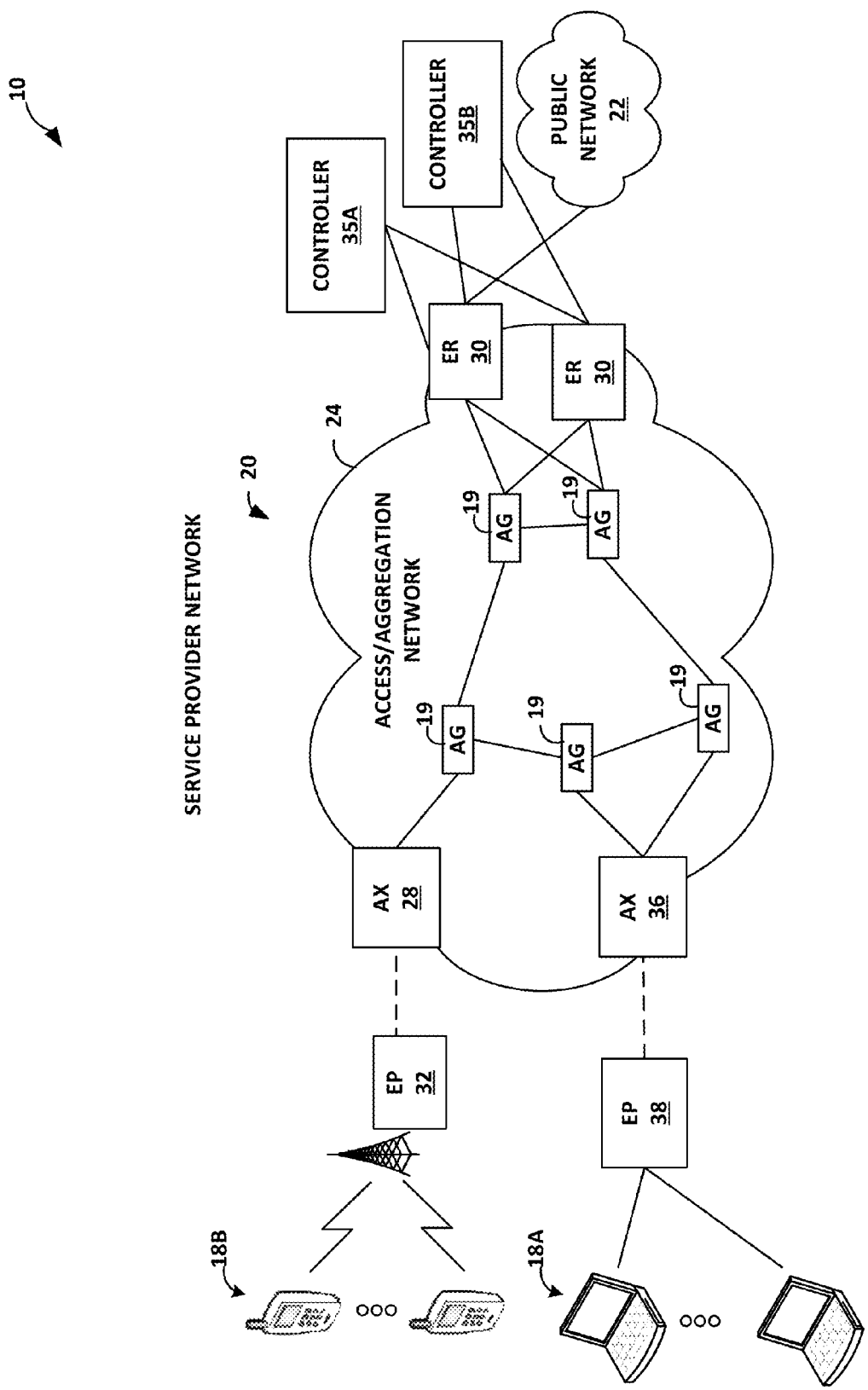
FIG. 1 is a block diagram illustrating an example network system in accordance with techniques described herein.

FIG. 1 is a block diagram illustrating an example network system 10 in accordance with techniques described herein. As shown in the example of FIG. 1, network system 10 includes a service provider network 20 coupled to a public network 22. Service provider network 20 operates as a private network that provides packet-based network services to subscriber devices 18A, 18B (herein, "subscriber devices 18"). Subscriber devices 18A may be, for example, personal computers, laptop computers or other types of computing device associated with subscribers. Subscriber devices 18 may comprise, for example, mobile telephones, laptop or desktop computers having, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others.

In the example of FIG. 1, service provider network 20 includes a pair of centralized redundant controllers 35A-35B ("controllers 35") that provide complete control-plane functionality for access/aggregation network 24. As described herein, controllers 35 provide seamless end-to-end service from a core-facing edge of a service provider network through aggregation and access infrastructure out to access nodes located proximate the subscriber devices 18.

Access/access/aggregation network 24 provides transport services for network traffic associated with subscribers 18. Access/aggregation network 24 typically includes one or more aggregation nodes ("AG") 19, such as internal routers and switches that provide transport services between access nodes ("AXs") 28, 36 and edge nodes 30. After authentication and establishment of network access through AXs 28, 36, any one of subscriber devices 18 may begin exchanging data packets with public network 22 with such packets traversing AXs 28, 36 and AGs 19. Although not shown, aggregation network may include other devices to provide security services, load balancing, billing, deep-packet inspection (DPI), and other services for mobile traffic traversing access/aggregation network 24.

As described herein, controller 35A operates to provide a central configuration point for configuring AGs 19 of access/aggregation network 24 provide transport services to transport traffic between AXs 28, 36 and edge nodes 30. Controllers 35 provide a redundant controller system with a control plane that is constantly monitoring the state of links between nodes in service provider network 20. Controller 35A serves as the master controller and synchronizes state actively with the backup controller 35B, and then in case of failure of the master controller, the backup controller 35B takes over right away without loss of any information.

The data plane of nodes in access/aggregation network 24 uses standard Multi-Protocol Label Switching (MPLS) for forwarding subscriber traffic, and essentially transforms the entire access/aggregation network 24 into an MPLS switching fabric. The use of standard MPLS avoids imposing additional hardware requirements on the nodes, since most hardware today already support full-featured MPLS. In this architecture, the provisioning of labels for MPLS forwarding is not done by signaling protocols such as Label Distribution Protocol (LDP) or RSVP. Rather, the forwarding tables are populated directly by the controller 35A, as described in further detail below. The use of MPLS makes the network resilient because of standard MPLS protection features.

The architecture features separation of control and data planes, extracting the complex control functions from the nodes in the access/aggregation network and centralizing them in controllers 35. Each AX 28, 36 and AG 19 may provide minimal control plane functionality in addition to the normal full-featured data plane. Consequently, the access and aggregation nodes are simple and inexpensive by design, with a minimal control plane and basic MPLS forwarding support with QoS. The nodes support plug-and-play deployment, control channel establishment to controller 35A and participate in auto-discovery of topology. Beyond that, all higher level control functionality is performed on controller 35A, which configures all the functions on the nodes. The simplicity of processing required in the nodes and the use of standard forwarding mechanisms is expected to reduce the cost of hardware required in the nodes. Also, since the software running on the node has very few features, software upgrades may be rarely needed. This, coupled with centralized management and trouble-shooting, may reduce the overall total cost of ownership.

Controller 35A manages configuration and operation of all the nodes in service provider network 20. In this manner, service provider network 20 can be considered a software-defined network. Controller 35A sets up transport paths and dynamically adjusts them according to node policy, subscriber policy, available capacity and traffic load in the network. Controller 35A also uses dynamic control algorithms to effect real-time traffic engineering and Quality of Service (QoS) provisioning. In addition, controller 35A automatically sets up Network Services for subscribers. Controller 35A also provides a single touch point into the network for subscriber policy, provisioning and management, as well as for applications to interact with the network via north-bound Application Programming Interface (API).

As further described below, controllers 35 each include a path computation module (PCM) that handles topology computation and path provisioning for the whole of access/aggregation network 24. That is, when controller 35A is the master controller, the PCM of controller 35A processes topology information for access/aggregation network 24, performs path computation and selection in real-time based on a variety of factors, including current load conditions of subscriber traffic, and provisions the LSPs and pseudo wires within the access/aggregation network 24.

As described, each of AXs 28, 36, AGs 19, edge nodes 30 (generally referred to herein as "network nodes") and controllers 35 executes a control protocol, described herein as the Multi-Protocol Label Switching-Open Centralized Control (MPLS-OCC) Protocol, to allow the nodes to be as simple as possible with minimal control functionality, while allowing the controllers 35 to perform the complex control functions. Network nodes do not need to run a routing protocol. As further described below, the MPLS-OCC protocol allows network nodes to discover their neighbors and report these neighbors to controller 35A. Controller 35A computes the topology of the network based on information reported by network nodes by messages in accordance with the MPLS-OCC protocol. Given this topology, controller 35A may then compute paths through the network and install forwarding table entries in the network nodes to support packet switching between any two nodes in the network. Controllers 35 are assumed to be Internet Protocol (IP)-reachable from edge nodes 30 and therefore communicate with edge nodes 30 via a Uniform Datagram Protocol (UDP) connection. Controllers 35 may be deployed in redundant pairs with active/standby semantics or in clusters, for example.

Controller 35A may use the MPLS-OCC protocol to provision paths with per Class of Service (CoS) policers to maintain QoS and fair network usage. The MPLS-OCC protocol also supports the provisioning of schedulers on the ports carrying the paths based on the bandwidth, scheduling discipline and buffer requirements per CoS. Once controller 35A has provisioned paths, controller 35A may use the MPLS-OCC protocol to connect endpoints to network services provided at the edge router. Controller 35A may use the MPLS-OCC protocol to provision Pseudo Wires (PWs) over the paths to connect endpoints with network services. Traffic entering PWs may also be subjected to per CoS policing and general packet filter actions. The MPLS-OCC protocol does not rely on the data plane to be established before the topology can be discovered. As described herein, access nodes 28, 36 and controller 35A use the MPLS-OCC protocol to automatically establish a control channel between controller 35 and the access nodes independent of a data channel.

Access nodes (AXs) 28, 36 and edge routers (ERs) 30 operate at the borders of access/aggregation network 24 and, responsive to network configuration information received from controller 35A, may apply network services, such as authorization, policy provisioning and network connectivity, to network traffic associated with subscribers 18 in communication with access nodes 28, 36. In the example of FIG. 1, for ease of explanation, service provider network 20 is shown having two access nodes 28, 36, although the service provider network may typically service thousands or tens of thousands of access nodes.

Aggregation nodes 19 are nodes which aggregate several access nodes 28, 36. AGs 19 may, for example, operate as label switched routers (LSRs) that forward traffic along transport label switched paths (LSPs) defined within access/aggregation network 24. AGs 19 and AXs 28, 36 have reduced control planes that do not execute a Multi-protocol Label Switching (MPLS) protocol for allocation and distribution of labels for the LSPs (e.g., no LDP or RSVP-TE protocol executing on the control planes). As one example, AXs 28, 36 and AGs 19 each execute a control-plane protocol, such as the MPLS-OCC protocol, to receive MPLS forwarding information directly from controller 35A, without requiring conventional MPLS signaling using a label distribution protocol such as LDP or RSVP.

Access/aggregation network 24 may also include additional network nodes that are not shown in FIG. 1. In general, the network nodes can discover neighboring network nodes and report those neighbors to controller 35A using a discovery mechanism. Network nodes are interconnected via point to point links. All network nodes are assumed to have at least one Ethernet MAC address that is used as a globally unique identifier. Network nodes have OCC links that are indexed locally.

Access nodes (also called "AX") may be considered a special type of network nodes that provide access functions to endpoints. An Access Node is a node that provides Ethernet services to an Endpoint (EP). The Access Node may map the port through which an Endpoint is connected to a Pseudo- Wire (PW) that carries the Endpoint's traffic to/from the Network Service located at the Edge Node. An AX may also locally switch traffic directly between two ports or directly between itself and another AX. The incoming traffic from the Endpoint may be subjected to uplink per packet policy and CoS based at the AX. The AX is a label edge router (LER) and applies per CoS policing to traffic entering an LSP. The AX is configuration-less at boot time and acquires its configuration from controller 35A. The AX uses MPLS-OCC to discover its neighbors and set up a control channel to controller 35A.

In this example, service provider network includes an access node (AX) 36 and endpoint (EP) 38 that provide subscriber devices 18A with access to access/aggregation network 24. In some examples, AX 36 may comprise a router that maintains routing information between subscriber devices 18A and access/aggregation network 24. AX 36, for example, typically includes Broadband Remote Access Server (BRAS) functionality to aggregate output from one or more EPs 38 into a higher-speed uplink to access/aggregation network 24.

Edge nodes 30 may be considered a special type of network nodes that have a connection to controller 35A. All packets from controller 35A to any node in service provider network 20 are sent via this connection. Edge Nodes 30 map a pseudo wire to Network Services. Edge Nodes 30 may also apply downlink per packet policy and CoS based policing to the traffic admitted to the PW. Network services may be configured and managed on Edge Nodes 30 via existing mechanisms. Edge Nodes 30 are assumed to be configured and connected directly to some management network where controllers 35 reside, and are configured with the IP Address of controllers 35. Edge Nodes 30 may provide an anchor point of active sessions for subscriber devices 18. In this sense, Edge Nodes 30 may maintain session data and operate as a termination point for communication sessions established with subscriber devices 18 that are currently accessing packet-based services of public network 22 via access/aggregation network 24. Examples of a high-end mobile gateway device that manages subscriber sessions for mobile devices are described in U.S. Pat. No. 8,635,326, entitled MOBILE GATEWAY HAVING REDUCED FORWARDING STATE FOR ANCHORING MOBILE SUBSCRIBERS," the entire content of which is incorporated herein by reference.

Endpoints are any device that receives Ethernet services from the network 20. An endpoint may be defined by a physical port location on an AX or by a Media Access Control (MAC) address. In the example of FIG. 1, EP 38 may communicate with AX 36 over a physical interface supporting various protocols. EP 38 may, for example, comprise a switch, a router, a gateway, or another terminal that operates as a demarcation point between customer equipment, such as subscriber devices 18B, and service provider equipment. In one example, EP 38 may comprise a digital subscriber line access multiplexer (DSLAM) or other switching device. Each of subscriber devices 18A may utilize a Point-to-Point Protocol (PPP), such as PPP over ATM or PPP over Ethernet (PPPoE), to communicate with EP 38. For example, using PPP, one of subscriber devices 18 may request access to access/aggregation network 24 and provide login information, such as a username and password, for authentication by policy server (not shown). Other embodiments may use other lines besides DSL lines, such as cable, Ethernet over a T1, T3 or other access links.

As shown in FIG. 1, service provider network 20 may include an access node (AX) 28 and EP 32 that provide subscriber devices 18B with access to access/aggregation network 24 via radio signals. For example, EP 32 may be connected to one or more wireless radios or base stations (not shown) to wirelessly exchange packetized data with subscriber devices 18B. EP 32 may comprise a switch, a router, a gateway, or another terminal that aggregates the packetized data received from the wireless radios to AX 28. The packetized data may then be communicated through access/aggregation network 24 of the service provider by way of AGs 19 and edge routers (ERs) 30, and ultimately to public network 22.

Access/aggregation network 24 provides session management, mobility management, and transport services to support access, by subscriber devices 18B, to public network 22. In some examples, access/aggregation network 24 may include an optical access network. For example, AX 36 may comprise an optical line terminal (OLT) connected to one or more EPs or optical network units (ONUs) via optical fiber cables. In this case, AX 36 may convert electrical signals from access/aggregation network 24 to optical signals using an optical emitter, i.e., a laser, and a modulator. AX 36 then transmits the modulated optical signals over one or more optical fiber cables to the CPEs, which act as termination points of the optical access network. As one example, EP 38 converts modulated optical signals received from AX 36 to electrical signals for transmission to subscriber devices 18A over copper cables. As one example, EP 38 may comprise a switch located in a neighborhood or an office or apartment complex capable of providing access to a plurality of subscriber devices 18A. In other examples, such as fiber-to-the-home (FTTH), EP 38 may comprise a gateway located directly at a single-family premise or at an individual business capable of providing access to the one or more subscriber devices 18A at the premise. In the case of a radio access network, the EPs may be connected to wireless radios or base stations and convert the modulated optical signals to electrical signals for transmission to subscriber devices 18B via wireless signals.

As described herein, access/aggregation network 24 may provide a comprehensive solution to limitations of current access networks. In one example, AXs 28, 36 provide optical interfaces that are each capable of optically communicating with a plurality of different endpoints through a common optical interface. Access node 36 may, for example, communicate with EPs 38 through a passive optical network using wave division multiplexing. Further, EPs 32, 38 may be low-cost, optical emitter-free EPs that incorporate a specialized optical interface that utilizes reflective optics for upstream communications. In this way, multiple EPs 38 are able to achieve bi-directional communication with access router 36 through a single optical interface of the access router even though the EPs are optical emitter (e.g., laser) free. In some examples, access/aggregation network 24 may further utilize optical splitters (not shown) for the optical communications associated with each of the different wavelengths provided by the optical interfaces of access nodes 28, 36.

In some examples, the optical interfaces of access nodes 28, 36 provide an execution environment for a plurality of schedulers, one for each port of the comb filter coupled to the optical interface, i.e., one for each wavelength. Each scheduler dynamically services data transmission requests for the set of EPs 32, 38 communicating at the given wavelength, i.e., the set of EPs coupled to a common port of the comb filter by an optical splitter, thereby allowing the access network to dynamically schedule data transmissions so as to utilize otherwise unused communication bandwidth. Further example details of an optical access network that uses wave division multiplexing and dynamic scheduling in conjunction with emitter-free EPs can be found in U.S. Pat. No. 8,687,976, entitled "OPTICAL ACCESS NETWORK HAVING EMITTER-FREE CUSTOMER PREMISE EQUIPMENT AND ADAPTIVE COMMUNICATION SCHEDULING," issued Apr. 1, 2014, the entire contents of which are incorporated herein by reference.

The techniques described herein may provide certain advantages. For example, the techniques may allow a service provider to achieve a reduction in total operating cost through use of centralized controllers 35 in conjunction with high-speed aggregation nodes 19 that are easy to manage and have no persistent configuration. Moreover, the techniques may be utilized within aggregation networks to unify disparate edge networks into a single service delivery platform for business, residential and mobile applications. Moreover, the techniques provide an aggregation network architected to easily scale as the number of subscriber devices 18.

Figure 2:
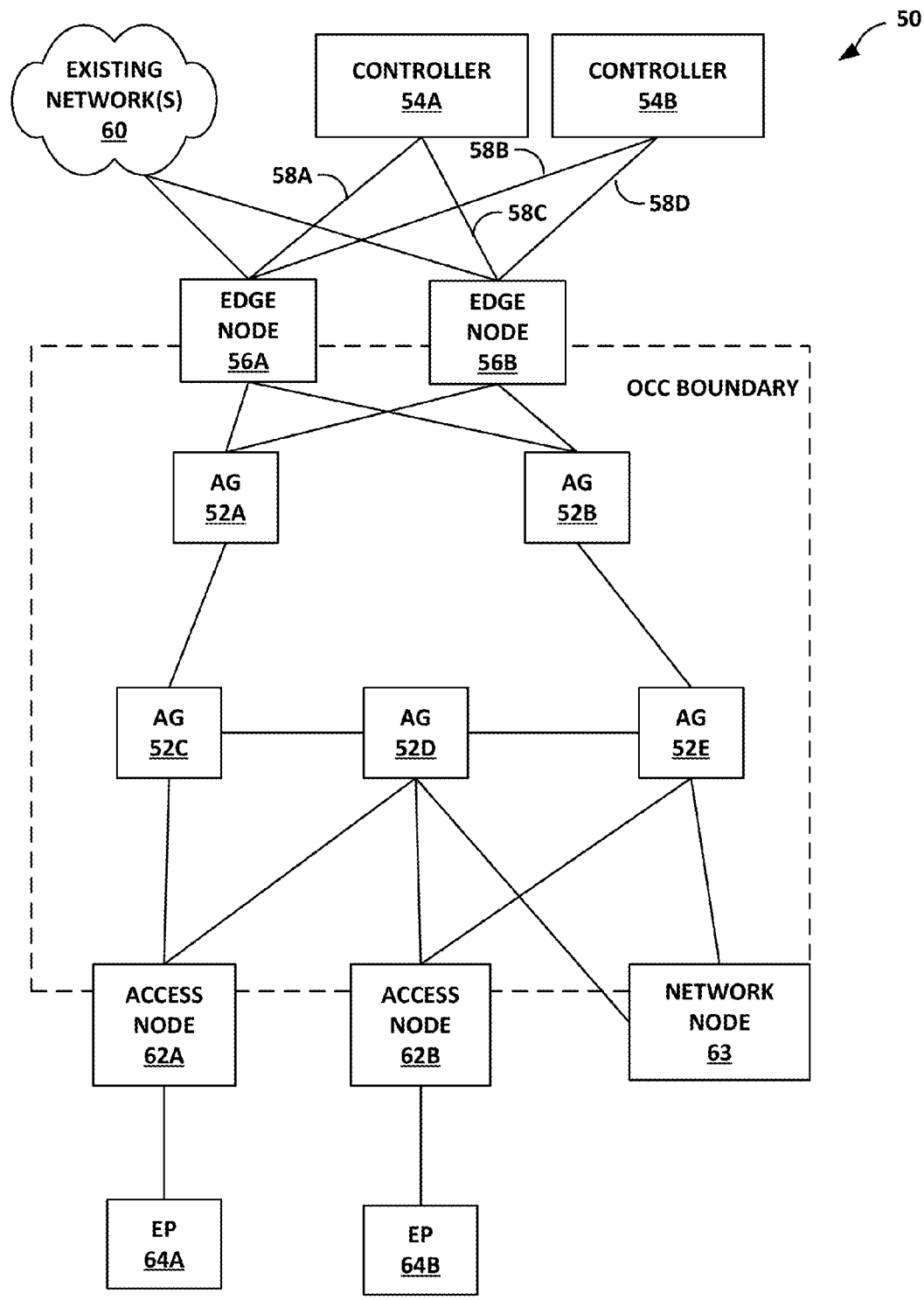
FIG. 2 is a block diagram illustrating a system including a collection of Access Nodes and Aggregation Nodes to be discovered by a controller according to the techniques of this disclosure.

FIG. 2 is a block diagram illustrating the basic architecture of a system including a collection of Aggregation Nodes "AG" 52A-52E (hereinafter "Aggregation Nodes 52") and access nodes 62A-62B (hereinafter, access nodes 62) to be discovered by a controller 54A or 54B (hereinafter, "controllers 54") using the MPLS-OCC Protocol, according to the techniques of this disclosure. MPLS-OCC is designed to allow the topology of a collection of network-nodes connected via point to point links to be discovered by a controller.

Figure 3:
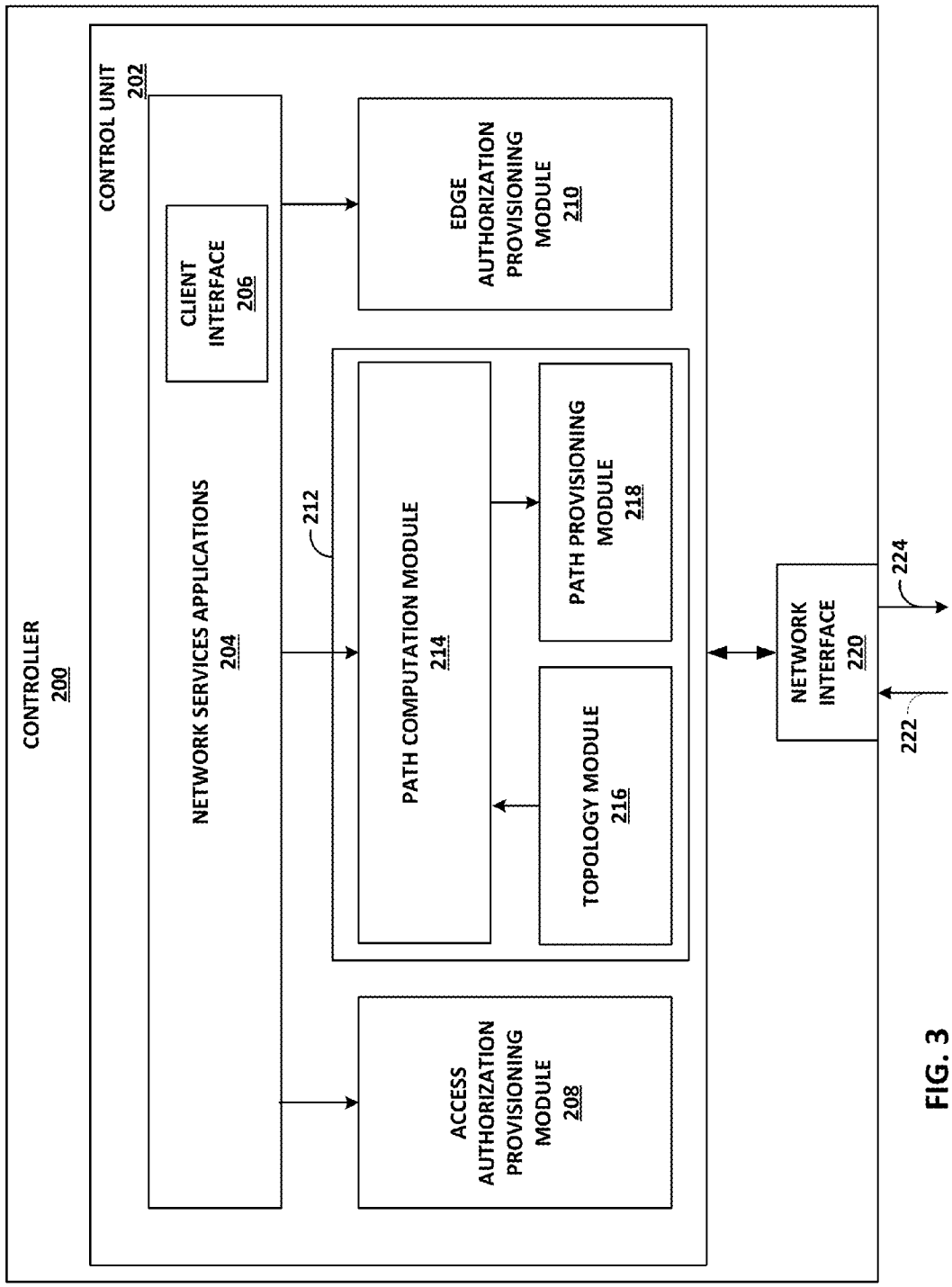
FIG. 3 is a block diagram illustrating an example controller in accordance with the techniques of this disclosure.

Controllers 54 represent the OCC Controller entity and may, for example, represent controllers 35 of FIG. 1. In this example, one of the controller's functions is to receive neighbor reports from network nodes and from these reports to compute topology and path information. In one example, controller 54 may be IP-reachable from the edge nodes 56A-56B (hereinafter, "Edge Nodes 56") and therefore may communicate to the Edge Nodes 56 via a UDP connection. In the example of FIG. 3, controllers 54A and 54B are deployed in redundant pairs with active/standby semantics. Other examples may include a single controller 54 without a redundant pair, or may include a set of three or more controllers 54 operating to provide centralized control.

Aggregation Nodes 52 can provide transport channels (e.g., PWs over LSPs) between Edge Nodes 56 and access nodes 62A-62C (hereinafter, access nodes 62). Edge nodes 56 map network services to the PWs. Access nodes 62 map network services via the PWs to End Points (EP) 64A-64C (hereinafter, "end points 64"). For example, end points 64 may include network devices such as routers, base stations, 802.11 access points, IP hosts, and other network devices.

Example operation of one implementation of the MPLS-OCC protocol for use in establishing an SRT control channel is as follows. Network nodes (including AGs 52 and access nodes 62) discover their neighbors by sending Hello messages on all of their OCC links. The Hello message specifies the distance to the active controller 54A from the sending node, e.g., expressed in number of hops. However, if the path to the controller 54A is via the link over which the Hello is sent, the distance specified is infinite. The distance is set to 1 plus the lowest distance the node received from other nodes. The edge node 56 always sets the distance to 0.

When a Hello Reply is received, a neighbor is discovered. Once a neighbor is discovered on a link, the network node declares the link as active and adds the link to the neighbor set for that node. The Hello Reply also carries the distance to the controller 54A from the neighbor. Once the network node receives all the Hello Reply messages from the neighbors, it knows the shortest distance from itself to the controller 54A.

A network node (for example, access node 62A) sends a Discover message to controller 54A, and the Discover message specifies the neighbor set. The Discover message contains a generation number, the neighbor list specifying the neighbor set, and an intermediate node list that is initially empty. The network node sends the Discover message out its active link with the shortest distance from controller 54A (e.g., to AG 52C). The receiving node of the Discover message first checks to see if the receiving node is on the intermediate node list. If the receiving node is on the list this implies that the packet has visited the node before, and the packet is dropped. If the receiving node is not on the list, the receiving node adds itself to the list along with its ingress and egress port indices, and then forwards the packet toward controller 54A along its shortest path link.

This process continues until an edge node receives the DDiscover message (e.g., edge node 56A). Edge node 56A transmits all Discover messages directly to controller 54A via a UDP control channel, such as one of UDP control channels 58A-58D.

When controller 54A receives the Discover message, controller 54A compares the generation number of the Discover message against the current generation number received for the initiating node. If the generation number is newer, controller 54A updates the neighbor list and the path to the node. Controller 54A computes the path to the node by reversing the path the Discover message took as recorded in the intermediate node list. This path is referred to as a Source Routed Tunnel (SRT), or "control channel" to the network node, and is used for the duration of this generation number for all OCC communications with the network node. Note that controller 54A may alternatively choose to compute an SRT based on the available topology information, in which case controller 54A need not use the same path as in the intermediate node list found in the Discover message.

The SRT control channel to a network node is specified by an MPLS label stack where the label value implicitly corresponds to the egress port index. When controller 54A sends control channel messages on the SRT control channel to a network node, controller 54A sends the messages having the MPLS label stack. Controller 54A allocates the labels in the MPLS label stack. At each hop along the SRT control channel to a network node, the outermost label is popped from the stack. At the penultimate hop, the outermost SRT MPLS label is popped. The top of the stack then includes a service label that identifies the packet as an OCC control channel packet at the final destination. This label is popped exposing a raw Ethernet frame which is then processed by the node's networking stack.

The controller 54A responds to the first Discover message of a given generation number by issuing a Discover Reply message via the newly discovered SRT to the node. When a node receives a Discover Reply of a matching generation number, the controller 54A and the node are in sync with respect the node's neighbor list and the SRT used to send additional OCC control messages.

The SRT from a node to the controller is specified as a single MPLS label meaning "To Controller". The "To controller" label is a Multi-protocol Label Switching (MPLS) label that indicates the message is to be automatically output by a receiving node toward the centralized controller. The "To controller" label is understood by all nodes in the network, and any packet received by the node with TO_CONTROLLER specified as its outer label is automatically switched by the receiving node to the least cost port to the controller, as indicated by Hello messages previously received by the node. In some examples, the "To controller" label is manually configured on the nodes. In some examples, the nodes receive the "To controller" label as configuration from the centralized controller. The label remains unchanged as the packet is transmitted to the next node on the path to the edge node. When a packet arrives at the edge node with the TO_CONTROLLER label, the LSP label is popped, exposing the CONTROL_SERVICE label, and the packet is then transmitted via the UDP control channel to controller 54A.

The node sends Keepalive packets to the controller 54A to ensure the state of the SRT. The controller 54A responds with a Keepalive Reply. If no Keepalive Reply occurs, the node restarts the discovery process by sending Hello messages, and generates a new Discover message with a new generation number to force the acceptance at the controller 54A of a new SRT.

The SRT control channel may now be used to program the forwarding plane of the node via other control messages. Such forwarding plane programming may include, for example, the specification of LSPs through the MPLS-OCC nodes, the provisioning of policers and CoS schedulers, the admittance of endpoints at the access nodes, and the provisioning of packet filters and Pseudo Wires.

FIG. 3 is a block diagram illustrating an example controller 200 in accordance with one or more aspects of the techniques of this disclosure. Controller 200 may include a server or network controller, for example, and may represent an example instance of any of controllers 35 of FIG. 1 or controllers 54 of FIG. 2.

Controller 200 includes a control unit 202 coupled to a network interface 220 to exchange packets with other network devices by inbound link 222 and outbound link 224. Control unit 202 may include one or more processors (not shown in FIG. 3) that execute software instructions, such as those used to define a software or computer program, stored to a computer-readable storage medium (not shown in FIG. 3), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204, access authorization provisioning module 208, path computation element 212, and edge authorization provisioning module 210. In one example, these modules may be implemented as one or more processes executing on one or more virtual machines of one or more servers. That is, while generally illustrated and described as executing on a single controller 200, aspects of these modules may be delegated to other computing devices.

Network services applications 204 represent one or more processes that provide services to clients of a service provider network that includes controller 200 to manage connectivity in the aggregation domain (alternatively referred to as the "path computation domain") according to techniques of this disclosure. Network services applications 204 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 204 require services provided by path computation element 212, such as node management, session management, and policy enforcement. Each of network services applications 204 may include client interface 206 by which one or more client applications request services. Client interface 206 may represent a command line interface (CLI) or graphical user interface (GUI), for instance. Client 206 may also, or alternatively, provide an application programming interface (API) such as a web service to client applications.

Network services applications 204 issue path requests to path computation element 212 to request paths in a path computation domain controlled by controller 200. In general, a path request includes a required bandwidth or other constraint and two endpoints representing an access node and an edge node that communicate over the path computation domain managed by controller 200. Path requests may further specify time/date during which paths must be operational and CoS parameters (for instance, bandwidth required per class for certain paths).

Path computation element 212 accepts path requests from network services applications 204 to establish paths between the endpoints over the path computation domain. Paths may be requested for different times and dates and with disparate bandwidth requirements. Path computation element 212 reconciling path requests from network services applications 204 to multiplex requested paths onto the path computation domain based on requested path parameters and anticipated network resource availability.

To intelligently compute and establish paths through the path computation domain, path computation element 212 includes topology module 216 to receive topology information describing available resources of the path computation domain, including access, aggregation, and edge nodes, interfaces thereof, and interconnecting communication links.

Path computation module 214 of path computation element 212 computes requested paths through the path computation domain. In general, paths are unidirectional. Upon computing paths, path computation module 214 schedules the paths for provisioning by path provisioning module 218. A computed path includes path information usable by path provisioning module 218 to establish the path in the network. Provisioning a path may require path validation prior to committing the path to provide for packet transport.

Figure 4:
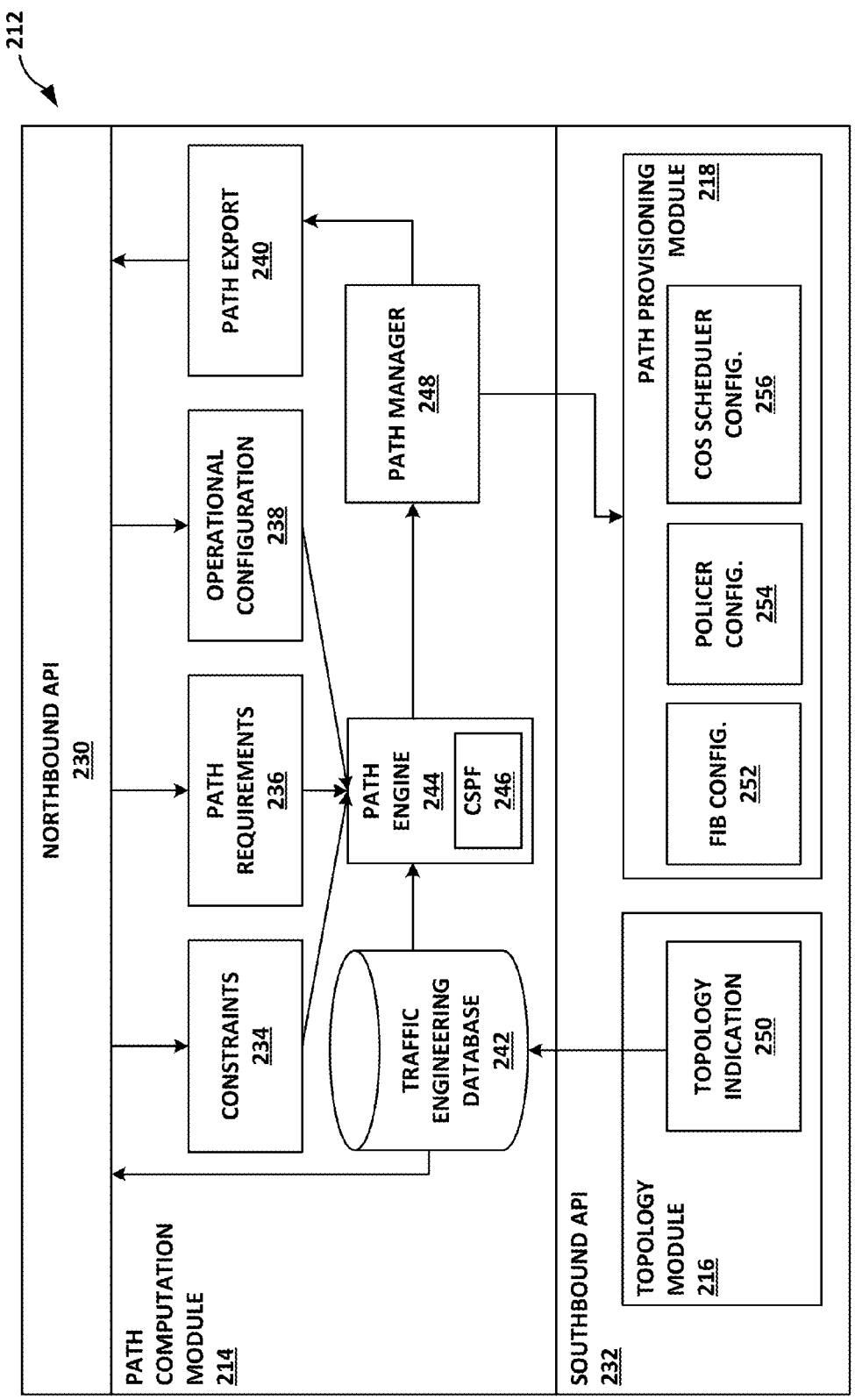
FIG. 4 is a block diagram illustrating an example implementation of a path computation element of the controller of FIG. 3.

FIG. 4 is a block diagram illustrating an example implementation of a path computation element 212 of controller 200 of FIG. 3. In this example, path computation element 212 includes northbound and southbound interfaces in the form of northbound application programming interface (API) 230 and southbound API (232). Northbound API 230 includes methods and/or accessible data structures by which network services applications 204 may configure and request path computation and query established paths within the path computation domain. Southbound API 232 includes methods and/or accessible data structures by which path computation element 212 receives topology information for the path computation domain and establishes paths by accessing and programming data planes of aggregation nodes and/or access nodes within the path computation domain.

Path computation module 214 includes data structures to store path information for computing and establishing requested paths. These data structures include constraints 234, path requirements 236, operational configuration 238, and path export 240. Network services applications 204 may invoke northbound API 230 to install/query data from these data structures. Constraints 234 represent a data structure that describes external constraints upon path computation. Constraints 234 allow network services applications 204 to, e.g., modify link attributes before path computation module 214 computes a set of paths. For examples, Radio Frequency (RF) modules (not shown) may edit links to indicate that resources are shared between a group and resources must be allocated accordingly. Network services applications 204 may modify attributes of link to effect resulting traffic engineering computations in accordance with MPLS-OCC. In such instances, link attributes may override attributes received from topology indication module 250 and remain in effect for the duration of the node/attendant port in the topology. A link edit message to constraints 234 may include a link descriptor specifying a node identifier and port index, together with link attributes specifying a bandwidth, expected time to transmit, shared link group, and fate shared group, for instance. The link edit message may be sent by the PCE.

Operational configuration 238 represents a data structure that provides configuration information to path computation element 214 to configure the path computation algorithm with respect to, for example, class of service (CoS) descriptors and detour behaviors. In some examples, operational configuration 238 may receive operational configuration information in accordance with MPLS-OCC. In some examples, an operational configuration message specifies CoS value, queue depth, queue depth priority, scheduling discipline, over provisioning factors, detour type, path failure mode, and detour path failure mode, for instance. In some examples, a single CoS profile may be used for the entire path computation domain.

Network Discovery is the process by which controller 200 learns of the capabilities of network nodes and their neighbors (and therefore the topology of the network), creates control channels by which controller 200 can configure the discovered nodes and learns of the Network Services available at the Edge Nodes in the network.

Topology module 216 of controller 200 performs topology discovery according to the MPLS-OCC protocol, by exchange of MPLS-OCC messages. Additional details of various MPLS-OCC messages are provided below. A node uses MPLS-OCC Hello messages to discover local neighbors. The node then reports the neighbors to controller 200 by sending MPLS-OCC Discover messages towards controller 200. The Discover messages, as they work their way toward the edge node, record the route taken to the edge node in the Intermediate Node List (INL) of the Discover messages. This recorded route is used by controller 200 to construct a Source Routed Tunnel (SRT) comprising ingress and egress interface pairs that specify the path from an edge node to the discovered node. Once the SRT is created, controller 200 and the node use the SRT for subsequent control message communication.

A node's capabilities are described via the MPLS-OCC Capabilities Indication message. Controller 200 may use the capabilities indicated in a Capabilities Indication message to make decisions about how the node is used. Capabilities may indicate resource limitations so controller 200 will not select nodes for certain services whose resources are exhausted. Such resources include Policers, Filter Rules, and output buffer space. Other capabilities include CoS scheduling capability.

Controller 200 discovers Network Services via receiving the MPLS-OCC Services Indication message from a network node such as an edge node. A Network Service is defined by a name associated with a Bridge Domain (or VLAN). It is assumed that Edge Nodes reporting the same Network Service represent redundancy for that Network Service.

As a result of Network Discovery, controller 200 has the following information: controller 200 has a control channel between itself and each discovered node. Controller 200 sees the topology of the entire network. Controller 200 understands the capabilities of each node. Controller 200 knows where Network Services are located and can make decisions about how to deploy resilient services.

Path computation module 214 computes paths across the discovered topology. Paths may be computed at the request of other system applications for two primary purposes: to establish an IP connection for a node for the purposes of Node Management, and to establish an Ethernet Service as some Endpoint. Generally speaking, path computation module 214 computes paths are between AXs and ENs to plumb PWs that map Endpoints to Network Services. In some examples, however, path computation module 214 may compute paths directly between AXs to support local switching.

Paths are requested with per-CoS bandwidth allocations. Each CoS may also have specific Path Computation attributes such as an Over-Subscription factor and Detour path requirements. Real-time path computation is possible. In some examples, path requests may be continuously modified to account for new sessions that are utilizing the Path or to support Auto-Bandwidth functions. Given that highly available access is of primary importance, the PCE includes configuration mechanisms whereby the network may run in a degraded state in the face of failure. A degraded state is defined as the condition where all Paths so provisioned are allocated proportionally less bandwidth than what they requested and some Paths for which protection is requested, none is provided or the protection provided is not via allocated resources. Such behavior may contrast with offline path computation implementations that may fail a path request for a given topology state. Such implementations are more concerned with TE and protection of a more static nature where, given a failure in the network, detours become operational, but a re-computation across the new topology may not be computed.

In some examples, CoS values are described as follows:

Queue Depth: Queue Depth represents the amount of time a packet can sit in a queue before it becomes stale. For TCP traffic, this time is generally the round trip time of the TCP session (150 msec). For VoIP this time is generally 10 to 50 msec. Different nodes may have different buffer capacities. It may not be possible to guarantee a specific time allotment per queue. Nodes should therefore be able to size queues according to the available buffer space and the service class for the queue.

Queue Depth Priority: When a class of service is active over some interface, the interface queues are sized to buffer at the indicated depth based on the bandwidth for the class. If there is insufficient buffer space, queue size is reduced according to queue depth priority. Lower priority classes are reduced before higher priority classes.

Scheduling Discipline: Scheduling Discipline determines how the queue is scheduled with respect to other queues. Deficit-weighted round-robin (DWRR) may be used, together with Strict scheduling for voice traffic. Controller 200 configures the schedulers on all node interfaces according to the bandwidth and scheduling class for each CoS active on the interface.

Over-Provisioning Factor: When a path is routed through the network/path computation domain, the path received allocated bandwidth from each link over which the is routed. For some classes of service is it appropriate to over-provision the network. This allows the policers at the edge and access to admit more traffic into the network than the network may actually be able to handle. This might be appropriate in cases where the traffic is best effort, for example. By over-provisioning certain classes of traffic, the network operator may realize better network utilization while still providing required QoS for other classes that are not over-provisioned.

Detour Type: Specifies the traffic engineering requirements for computed detours. Due to resource restrictions, users may elect to configure detours that have fewer constraints than the primary paths. Detour paths may, for instance, take on one of the following values: None, Best-effort, CoS-only, Strict-TE. The None value specifies do not compute detours. The Best-effort value specifies compute detours but ignore TE bandwidth and CoS requirements. CoS is dropped from the packet header and therefore the detour traffic gets best-effort CoS. The CoS-only value specifies preserve CoS but do not traffic engineer the detour. Under these conditions, traffic competes with other primary path traffic equally for available resources, therefore, interface congestion may occur when the detour is active. The Strict-TE value specifies preserve CoS and traffic engineering for the detour.

Path Failure Mode: Defines the per-CoS behavior to take when the primary path computation fails due to resource constraints. The Proportional Path Reduction (PPR), Ignore, and Fail options are available. The PPR option specifies all paths traversing the congested links are reduced proportionally until all paths can be accommodated over the points of congestion. The Ignore option specifies raise an alert message but otherwise allow the network to operate in this oversubscribed manner. The Fail option specifies fail to compute the remainder of the paths and do not admit traffic for failed paths into the network.

Detour Path Failure Mode: Defines the behavior of the system when detour paths cannot be computed due to resource constraints. This attribute may only be applicable when Detour Type is Strict-TE.

MPLS-OCC messages used by controller 200 for FIB Programming are described in further detail in below. FIB Programming includes two major areas. The first is LSP plumbing. When Path computation module 214 computes a Path, that Path is essentially a collection of links connecting the ingress and egress nodes in the Path. When Path computation module 214 computes a Path, path provisioning module 218 provisions an LSP representing the Path across all the nodes in the Path. Such provisioning is performed via the MPLS-OCC MPLS FIB Request messages. As described below, MPLS FIB Request messages specify the path ID, ingress label, egress label and egress port for a given path at a given node. Note that the ingress node is a special case and does not include the ingress label. The labels for the detour paths may also be specified using the same message.

At the ingress node, a per-CoS policer is also specified to police the traffic entering the LSP according to the provisioned Path's bandwidth requirements. Such policing allows the network to meet the QoS requirements for various classes of service. The MPLS-OCC Policer Request message is used to configure the policer on the LSP ingress node.

For each interface over which the Path traverses, CoS scheduler configure module 256 computes the CoS scheduling parameters based on the set of paths that traverse the interface. Whenever a Path is updated, CoS scheduler configure module 256 may modify such CoS scheduling parameters. Since Paths may be continuously recomputed or single network events may result in many paths being re-plumbed, CoS scheduler configure module 256 may time delay the CoS Scheduling operation to avoid thrashing and overloading the control channel. The MPLS-OCC CoS Scheduler Request message is used to configure the CoS Scheduler for some port.

The second primary area of FIB programming concerns the admittance of Endpoints into the network. This involves the establishment of a Pseudo-Wire (PW) at the AX and EN nodes and mapping Endpoint traffic to and from this PW. Additionally, per-Endpoint policy and CoS based policing may be applied at either end of the PW. Controller 200 receives a MPLS-OCC Endpoint Indication message sent by a network node to indicate the presence of a new Endpoint or change of status associated with an endpoint, and controller 200 sends a Pseudo Wire Request message to configure the PW to support the Endpoint.

Node Management concerns the configuration and management of an MPLS-OCC node. When a node is discovered by controller 200 using MPLS-OCC, in some examples the following operations are performed: (1) The node should be connected to a management IP network. MPLS-OCC supports a limited set of node management functions. More general or higher level functions should be supported over an IP interface rather than the MPLS-OCC control channel. The reasoning is as follows: The MPLS-OCC control channel is intended for low BW functions and to provide resiliency. The control channel uses a Source Routed Tunnel (SRT) for the basic control communication between the controller and the node. Messages from the controller to the node use the MPLS label stack that describes the source routed path to the node. Messages from the node to the controller use the TO_CONTROLLER label to traverse the path discovered via the Hello messages. Also, there is a plethora of functionality and protocols available for node management, once the node has an IP address. These include TCP, SNMP, Telnet, etc. 2. The node's image should be checked for compatibility with controller 200 and if found incompatible or otherwise requiring an update, the node's image should be updated. Image management is performed over the IP interface using Secure Copy Protocol (SCP). 3. A stats collection channel should be created between the node and the Controller. Stats are collected via standard SNMP MIBs. Where no MIB exists stats maybe collected via other mechanisms. 4. Depending on the type of the node, additional configuration may be required. This could include port or radio configuration.

Since third party nodes are expected to be integrated into the larger system, such nodes may have their own management systems. These systems may manage the node via the IP interface described above. The mechanism by which nodes and management systems discover each other is node specific. However, controller 200 provides northbound API 230 to third parties, which allows the third parties to discover the existence of nodes, their type and IP address. Node managers or node manager extenders (3rd party managers) may also use APIs to: 1. Specify that a given link of a node is a member of a shared resource group, thereby providing information to the PCE that BW allocation from any link effects all links in the group. 2. Discover the actual per CoS bandwidth allocations for all links in a shared resource group such that per link schedulers can be configured appropriately on each link. 3. Specify that certain links are members of a fate shared group. (Note, this could be a node management function or a function of some other application. However, the point here is that this information is available to MPLS-OCC and therefore must be discovered through external mechanisms). Regardless, the PCE uses this information to compute detours for paths that do not use links from the same fate sharing group as their primaries.

Before a node can allocate an IP address the must establish the data plane between itself and the EN to which the management network is connected. The establishment of the data plane for a node is almost the same as the establishment of the data plane for an Endpoint, with a difference being that the data plane for the node is terminated a the node's control processor rather than one of the node's Endpoints. Therefore, the same subscriber management functions are used in both cases.

Subscriber Management is the process by which subscribers (or Endpoints) are admitted into the network. For each subscriber, the controller derives an authorization record, e.g. based on policy configured on the controller. The network may include a Policy Manager entity associated with the Network Management platform that configures the policy on the controller with attributes that a user/subscriber can have, such as security level, policer configuration, SLA level, for example. The authorization record includes the Network Service to which the subscriber is to be admitted, the policy to be applied to the subscriber's traffic and the per-CoS bandwidth allocations for the subscriber. The per-CoS bandwidth allocations can specify a minimum and maximum. Such a range can be used to control the auto-bandwidth function of controller 200.

Note that multiple PWs may run over a given pair of Paths and that multiple subscribers may be handled by a single PW. In this case, the BW allocation for a given path is the aggregate for all the subscribers carried by the Path. Endpoints may be defined by <node, port> or <node, port, MAC>. In the first case, all the traffic from the <node, port> is subjected to the authorization record. In the second case, all the traffic from the MAC is subjected to the authorization record. Authorization records may be derived from policy configured on the Controller. Effectively, an Endpoint maps to a service profile that defines the authorization record. If the Endpoint is defined by <node, port> then there exists a mapping for each distinct <node, port> to a service profile (or a wild-card configuration). If the Endpoint is defined by <node, port, MAC> then the MAC address may be authorized via dot1X and a service profile is identified from the authorization record returned from RADIUS.

A subscriber's authorization record may include a minimum and maximum bandwidth allocation per CoS for uplink and downlink traffic. The minimum may be 0, indicating that no resources are allocated for that subscriber's traffic at that CoS. The minimum bandwidth is used to adjust the bandwidth allocations for the LSPs carrying the subscriber's traffic. Therefore, a Path's bandwidth allocation is the sum of the minimum bandwidth specification for all subscribers whose traffic traverses that Path.

The maximum bandwidth allocation is the maximum bandwidth that the subscriber may use. Policer configure module 254 may use this value to define the per subscriber policer on ingress to the PW carrying the subscriber's traffic. Maximum can be used either to protect the LSP bandwidth allocation, in which case minimum=maximum or to cap subscribers at some level. Service providers may, in some examples, choose to cap bandwidth for the purposes of selling higher levels of service. In other examples there may also be no maximum specified and hence no per-subscriber policing. If a subscriber's bandwidth exceeds the specified maximum, the traffic may be either dropped or reclassified as discard eligible. Alternatively, the discard-eligible packet could be moved to some other class of service; as such it would suffer from potential re-ordering issues with respect to non-discard-eligible packets.

Thus far, what has been described is a mechanism to build a DiffServ TE network where CoS allocations and Path computations are a function of subscriber policy alone. However, the system must also have the ability to support auto-bandwidth functionality. Auto-bandwidth is the ability to automatically size paths according to their current levels of load. With such a capability, instantaneous load can be distributed across the network in real time. Specifically, the algorithm could operate as follows:

1. Controller 200 initially plumbs paths with bandwidth set to the sum of all subscriber minimum bandwidth.
2. Over time, controller 200 monitors the actual bandwidth utilized on the Path, including dropped or reclassified packet counts.
3. If there are drops on the Path, controller 200 increases the bandwidth allocated for that path by some fraction.
4. For paths that are utilizing less than their current allocation, controller 200 reduces the current allocation to some fraction of their current utilization.
5. Go to step 2.

Note that all of these operations are done per CoS. Given this behavior and the PCE functionality, a set of use case scenarios can be realized. Each of these use cases is analyzed in detail in the following sections.

Voice generally fits into the DiffServ Expedited Forwarding (EF) forwarding class. Voice is highly sensitive to drops, latency and jitter. At the same time voice is typically very low bandwidth, requiring on the order of perhaps 64 Kbps per voice session. Since this architecture does not propose any interworking with voice signaling protocols, the bandwidth allocation is static per subscriber. Given the low bandwidth requirements, this is probably reasonable in practice. To ensure adequate bandwidth, the voice class is not over-provisioned. However, if a customer had a good understanding of their voice duty cycle per subscriber, an over-provisioning factor could be used.

Since voice has stringent real-time performance requirements, operators would likely provide voice with paths with detours that utilize strict TE. It is assumed that operators deploying voice in their network are only expecting a small percentage (5 to 10%) of the traffic to be voice traffic. So it is unlikely that Paths will fail due to an inability to allocate resources for voice. Therefore the Path Failure Mode could be either Fail or Proportional Path Reduction (PPR) with PPR being preferred as paths are still plumbed.

While auto-bandwidth could be used with voice, it is not likely to have a significant impact on network utilization as voice bandwidth is typically small. Voice traffic may be identified via DiffServ marking or 5 tuple packet classification. It is generally assumed that Endpoints will have the ability to mark their voice streams.

Video is typically batch streamed but it could be streamed in real time. It is somewhat sensitive to latency, delay and jitter, but not to the extent of conversational voice. It is bandwidth hungry and less elastic than typical Internet traffic. Therefore, video more appropriately fits into a DiffServ Assured Forwarding (AF) CoS. AF essentially gives better scheduling and queuing resources versus best-effort classes. Today, delivery of quality video is seen as a major differentiator by many service providers, so the use of auto-bandwidth to garner the required resources to deliver the video will likely be an attractive feature to many service providers.

Assuming that video makes use of auto-bandwidth to deliver the service, over-provisioning the class may not make sense since network allocations are a function of the current usage levels. However, if auto-bandwidth is not used then the network should be over-provisioned based on the per subscriber duty cycle for video.

Since video traffic is likely to be high bandwidth, use of CoS-only for detours is recommended. Such detours will be used to maintain existing streams, possibly at a reduced level of service, while the network is being repaired. Video traffic may be identified DiffServ marking or 5 tuple packet classification.

Internet Data with service level agreements (SLAs) typically falls under the DiffServ AF Class. Typically a customer is given a minimum BW allocation and allowed to burst to some maximum. The traffic outside of the minimum is typically marked as discard eligible and is delivered so long as there is no congestion in the network. Since there is an SLA involved, it is assumed that the minimum bandwidth is always allocated independent of actual load. Also, since operators may want to offer more expensive plans with higher maximum bandwidth, the bandwidth is capped. Therefore, the extent to which auto-bandwidth can operate is more restrictive than the video class. This also implies that over-provisioning may play a bigger role. In effect, it might be the case that over-provisioning and auto-bandwidth operate as two sides of the same coin—a technique to maximize network utilization. Over-provisioning is fast acting but uncontrolled and auto-bandwidth is slow acting but offers some degree of control. Detours are likely to be CoS only, but extreme SLAs may demand strict TE. Traffic identification is simpler in this case as it will depend on Endpoint or Network Service association. Some traffic from subscribers with SLAs may get mapped to voice or video classes and will therefore be subject to similar classification issues.

Internet Data Best Effort is the class of traffic that fits into all the space not occupied by the other classes of traffic. It is most resilient to drops, latency and jitter and is very elastic. It can be over-provisioned and is a good candidate for auto-bandwidth. Detours should be used just for the sake of service continuity. Since all traffic is still best effort the effect of traffic on the detour path should be negligible. By default, all traffic not otherwise classified falls into the best effort class.

The following table summarizes the service classes and their configuration for PCE parameters, auto-bandwidth and general network CoS parameters. Example service classes are defined in TABLE 1.

border of an aggregation network, and operate as an endpoint for pseudo wires to map subscriber traffic into and out of the pseudo wires, for example.

Figure 5:
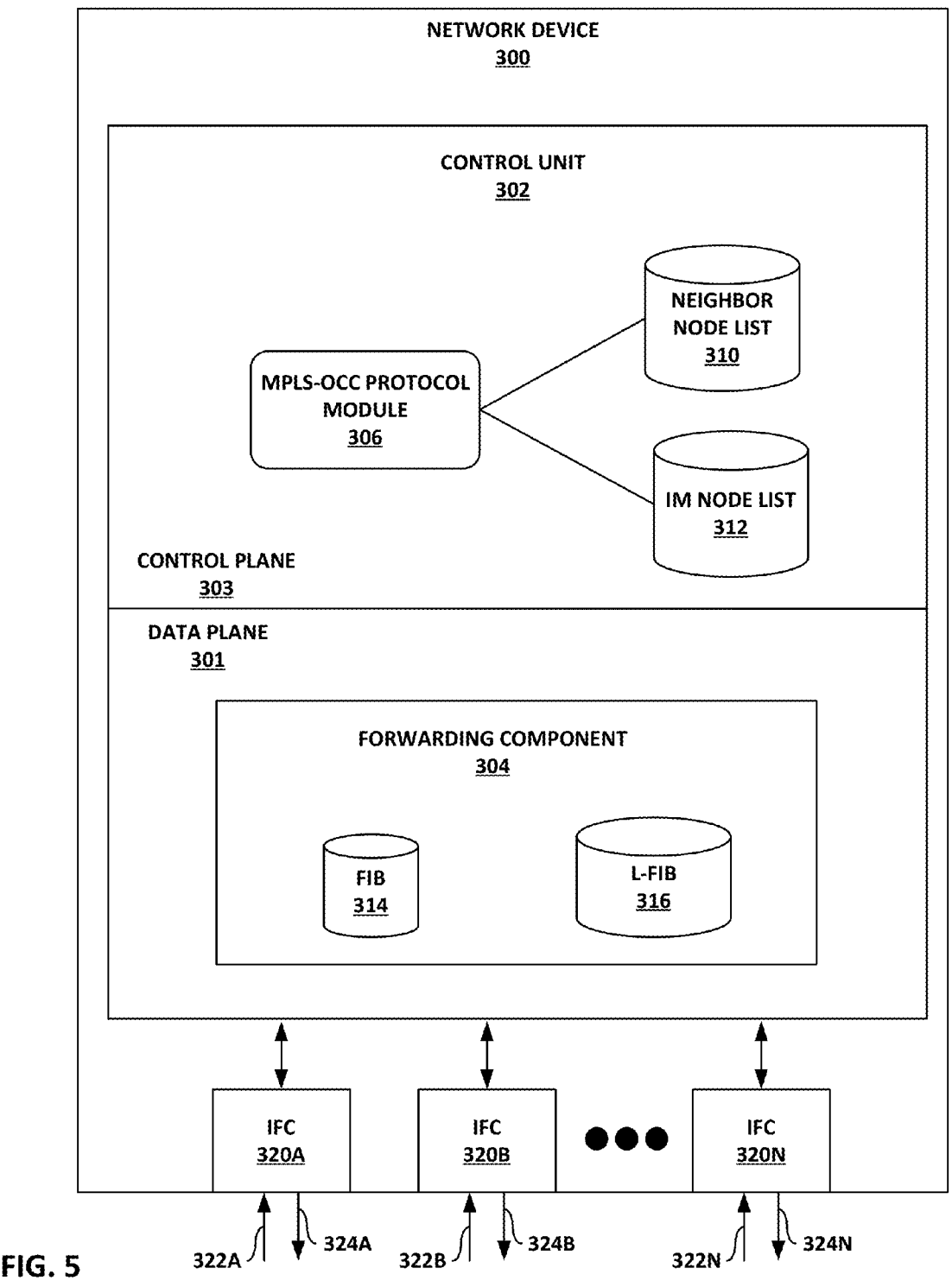
FIG. 5 is a block diagram illustrating an example network device in accordance with the techniques of this disclosure.

In the example of FIG. 5, network device 300 includes a control unit 302 that comprises data plane 301 and control plane 303. Data plane 301 includes forwarding component 304. In addition, network device 300 includes a set of interface cards (IFCs) 320A-320N (collectively, "IFCs 320") for communicating packets via inbound links 322A-322N (collectively, "inbound links 322") and outbound links 324A-324N (collectively, "outbound links 324"). Network device 300 may also include a switch fabric (not shown) that couples IFCs 320 and forwarding component 304.

Network device 300 executes an MPLS-OCC module 306 that operates in accordance with a control protocol as described herein, referred to herein as MPLS-OCC protocol. For example, network device 300 may send or receive any of the messages described herein.

In some examples, MPLS-OCC module 306 outputs a Hello message, on each interface and/or link. Each of the Hello messages includes an identifier that is unique to network device 300 (e.g., an aggregation node or access node) that sent the Hello message and the interface on which the Hello message was sent. The Hello messages may also indicate a distance from the sending node to the controller (e.g., in number of hops). In accordance with the MPLS-OCC protocol, network device 300 also outputs a Hello Reply message on each interface on which a Hello message was received. The Hello Reply messages may also indicate a distance from the sending node to the controller (e.g., in number of hops). MPLS-OCC module 306 maintains a neighbor node list 310 that identifies neighboring nodes from which network device 300 received Hello messages and the interfaces on which the Hello messages were received.

Responsive to receiving Hello Reply messages on a link, network device 300 declares the link as an active link and adds the neighboring node to the neighbor node list 310. MPLS-OCC module 306 determines, based on the received

TABLE 1

| Service Class | Queue Depth | Queue Depth Priority | Scheduling Discipline | Over Provisioning Factor | Detour Type | Path Failure Mode | Auto BW |
|---|---|---|---|---|---|---|---|
| Voice | 20 msec | High | Strict | 1 | Strict-TE | PPR | no |
| Video | 150 msec | Medium | DWRR | 2 | CoS-only | PPR video) | (0, max-) |
| Internet Data with SLA | 150 msec | Medium | DWRR | 5 | CoS-only | PPR | (SLA min, SLA max) |
| Internet Data Best Effort | 100 msec | Low | DWRR | 20 | Best-effort | PPR | (0, EP BW) |

FIG. 5 is a block diagram illustrating an example network device 300 in accordance with the techniques of this disclosure. Network device 300 may, for example, represent any of aggregation nodes 19 or access nodes 28, 36 of FIG. 1, or aggregation nodes 52 or access nodes 62 of FIG. 2. For example, network device 300 may be an access node that operates at the borders of the network and, responsive to receiving provisioning messages from the controller, applies network services including policy provisioning, policing and network connectivity to the network packets received from the subscriber devices. Network device 300 may reside at a Hello and Hello Reply messages, which active link has the shortest distance to the controller.

Network device 300 may output, on the active link having the shortest distance to the controller, a Discover message that specifies the neighbor node list identifying neighboring nodes and interfaces on which neighboring access nodes and aggregation nodes are reachable from network device 300. The Discover message also includes an intermediate node list that indicates layer two addresses and ingress/egress ports that the Discover message has traversed so far from an originating node. Discover message In addition, upon receiving a Discover message from a neighboring node and determining that the Discover message does not include a layer two address for network device 300, MPLS-OCC module 306 updates the intermediate node list of the Discover message to add its own layer two address and ingress/egress port information. MPLS-OCC module 306 may also store such information to intermediate node list 312 ("IM node list"). After updating the Discover message, MPLS-OCC module 306 forwards the updated Discover message on the active link having the shortest distance to the controller. Devices along the path from network device 300 to the controller similarly forward the Discover message along the path to the controller, updating the intermediate node list along the way. The controller, upon receiving the Discover message, establishes a Source Routed Tunnel (SRT) control channel with network device 300, based on the intermediate node list specified by the Discover message. Network device 300 executes the MPLS-OCC module 306 without executing an Interior Gateway Protocol (IGP) within a control plane 303 of network device 300.

Network device 300 may receive from the controller a Discover Reply message indicating that the controller has acknowledged receipt of the DDiscover message. The Discover Reply is sent via the SRT indicating that there is an MPLS label stack on the packet from the controller that corresponds to the source routed egress interface list used to route the packet. After receiving the Discover Reply message, network device 300 may periodically send Keepalive messages to the controller to maintain liveness of the SRT, and receive Keepalive reply messages in response. Responsive to determining that no Keepalive Reply is received from centralized controller network device within a time period, network device 300 may generate a new Discover message with a new generation number to force acceptance at the controller of a new SRT control channel.

The centralized controller computes topology information for the network and computes the forwarding information for the data channels (e.g., pseudo wires) in accordance with discovery messages that are received from nodes in the network. Network device 300 may receive, from the controller and via the respective SRT control channels, a message that specifies the forwarding information computed by the centralized controller for configuring forwarding component 304 of network device 300 to forward the network packets. In some examples, the pre-computed forwarding information comprises directed FIB state including one or more MPLS labels for network device 300 to use for sending packets on an LSP. In some examples, the directed FIB state includes policers to police ingress traffic for the LSP according to the computed bandwidth. Based on the forwarding information, the centralized controller may also compute one or more backup LSPs for the network, and output one or more messages to network device 300 to communicate and install, within network device 300, forwarding information for the backup LSPs.

Network device 300 may store the received forwarding information for the LSPs and the backup LSPs to L-FIB 316 and/or FIB 314, for example. Based on forwarding information base (FIB) 314 and labeled FIB (L-FIB) 316, forwarding component 304 forwards packets received from inbound links 322 to outbound links 324 that correspond to next hops associated with destinations of the packets. In response to a network event, forwarding component 304 may reroute at least a portion of the network packets along the backup LSP. The network event may be, for example, a link or node failure. The controller may also compute detour LSPs to handle fast reroute for any interior node failure.

In some examples, network device 300 may send a port attributes indication message to describe its port attributes to the controller, such as maximum bandwidth or port type, and the centralized controller computes the forwarding information for the LSPs based at least in part on quality of service (QoS) metrics requested for the LSPs and the port attributes received in the port attributes indication message.

In this manner, network device 300 has a reduced control plane 303 that does not execute a conventional Multi-protocol Label Switching (MPLS) protocol (e.g., LDP or RSVP) for allocation and distribution of labels for the LSPs and does not execute a routing protocol such as an interior gateway protocol (IGP). Instead, network device 300 executes the MPLS-OCC module 306 to receive MPLS forwarding information directly from a central controller (e.g., controller 35A of FIG. 1), without requiring conventional MPLS signaling using a label distribution protocol such as LDP or RSVP. The centralized controller network device provides a centralized, cloud-based control plane to configure the plurality of aggregation nodes and access nodes to effectively operate as an MPLS switching fabric to provide transport LSPs and pseudo wires between the edge nodes and the access nodes for transport of subscriber traffic. In various examples, the messages exchanged between network device 300 and the centralized controller may conform to any of the message formats described herein.

In one embodiment, forwarding component 304 may comprise one or more dedicated processors, hardware, and/or computer-readable media storing instructions to perform the techniques described herein. The architecture of network device 300 illustrated in FIG. 5 is shown for example purposes only. In other embodiments, network device 300 may be configured in a variety of ways. In one embodiment, for example, control unit 302 and its corresponding functionality may be distributed within IFCs 320.

Control unit 302 may be implemented solely in software, or hardware, or may be implemented as a combination of software, hardware, or firmware. For example, control unit 302 may include one or more processors which execute software instructions. In that case, the various software modules of control unit 302 may comprise executable instructions stored on a computer-readable medium, such as computer memory or hard disk.

Various example Control Packet Formats will now be described. With reference to FIG. 1, for example, these control packets may be exchanged between controller 35A and access nodes 28, 26, between controller 35A and aggregation nodes 19, for example.

Figure 6:
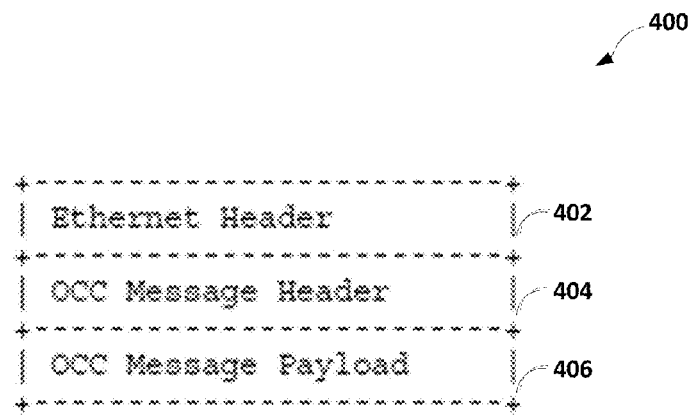
FIG. 6 is a block diagram illustrating an example OCC Control Packet Structure according to the techniques of this disclosure.

In one example embodiment, the control packets have the structure illustrated in FIG. 6. FIG. 6 is a block diagram illustrating an example OCC Control Packet structure 100 according to the techniques of this disclosure. In the example of FIG. 6, OCC control packet structure 400 includes an Ethernet Header 402, an OCC message header 404, and an OCC message payload 406.

The Ethernet Header 402 is a standard Ethernet II header. The Ethernet header 402 is used so that the OCC Control plane can be run natively over standard Ethernet interfaces. If other physical or logical interfaces are used, the only requirement placed on those interfaces is that they can transport an Ethernet frame. Generally, the Source Address is the MAC address of the sending node and the Destination Address is the MAC address of the receiving node or all Fs in the case of Hello and Discover messages. The Ether type may be, for example, 0xA000.

The OCC Message Header 404 includes the message type. The OCC Message Payload 406 is the payload for the specified message type.

Figure 7:
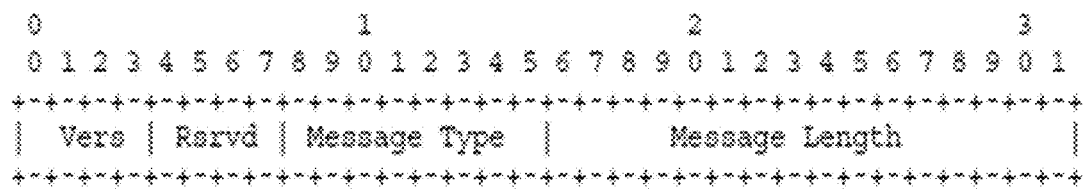
FIG. 7 is a block diagram illustrating an example OCC Message Header in further detail.

FIG. 7 is a block diagram illustrating an example OCC Message Header 404 in further detail. The OCC Message Header is used to identify the OCC message type. The OCC Message Header may have the following structure. The OCC Message Header includes a Vers field that specifies the version number of the protocol. This document defines protocol version 1. The OCC Message Header includes a Rsrvd field. This field is reserved. In some examples, this is set to zero on transmission and ignored on receipt. A Message Type field specifies the OCC message type. OCC message types are described below. A Message Length field specifies the length of the Message Payload.

Figure 8:
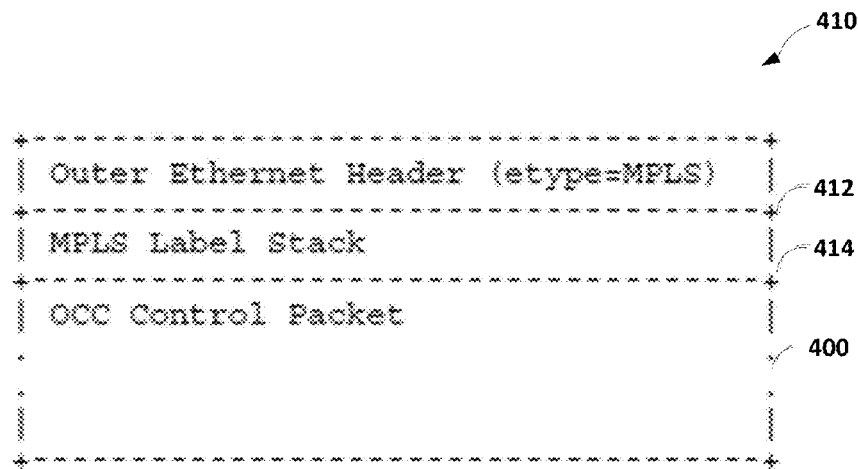
FIG. 8 is a block diagram illustrating an example Base Packet Structure for SRT packets.

FIG. 8 is a block diagram illustrating an example base packet structure 410 for SRT packets.

The Outer Ethernet Header 412 is a standard Ethernet II header, which is used to support the Ethernet encapsulation of the MPLS label stack 414. The Source and Destination Addresses are the source and destination MAC addresses of the nodes at either end of the link.

The MPLS Label Stack 414 is of two varieties depending on whether the packet is from the controller or to the controller. When the packet is from the controller, the label stack includes labels that correspond to the egress interfaces for the nodes receiving the packet. Such labels were discovered when the Discover message was sent from the node to the controller. For packets from the node to the controller, there is only one element on the MPLS label stack 414. This MPLS header encodes the special label which means to send the packet to the controller. By virtue of the Hello packets discussed earlier, each node knows the least cost next-hop to the controller and installs this as the next-hop for the TO_CONTROLLER label value. The value of TO_CONTOLLER is 17.

A label value of (Port Index+18) maps to egress port Port Index. The implicit label operation is Pop. All labels in the range of 18 through 255+18 are implicitly allocated to support source routing.

Packet structure 410 also includes the OCC Control Packet 400, as described with respect to FIG. 6.

Figure 9:
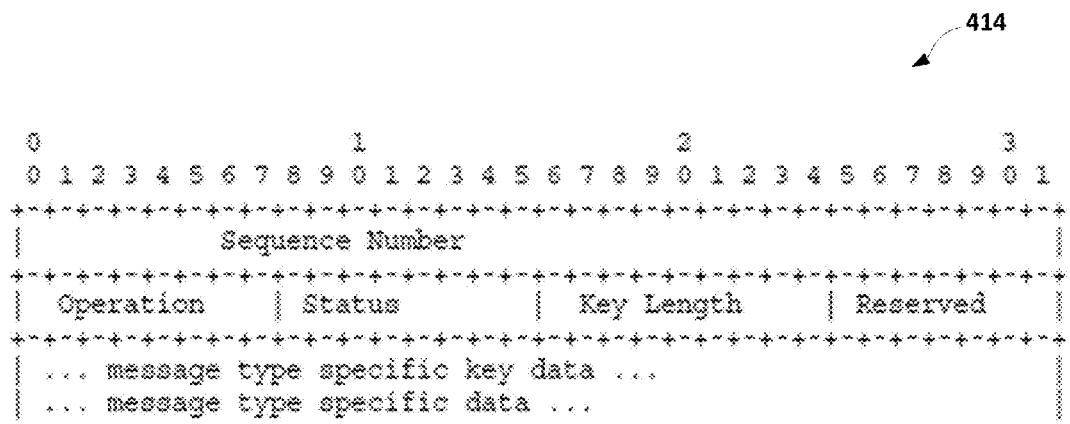
FIG. 9 is a block diagram illustrating an example Node Indication Header Structure.

MPLS-OCC Control messages are organized into three message sub types. Types having common elements are collected into a sub type. Topology and Control Channel messages are used to establish the control channel and describe the topology. There is no common element set associated with these messages. These messages are all sent directly across links to immediate neighbors except for Discover Reply, Keepalive and Keepalive Reply which are sent via the SRT. Topology and Control Channel messages can include the following types:
1: Hello
2: Hello Reply
3: Discover
4: Discover Reply
5: Keepalive
6: Keepalive Reply
7: SRT Down FIG. 9 is a block diagram illustrating an example Node Indication Header Structure 520. Node Indication messages are used by nodes to indicate their state to the controller, and get a response back. Node Indication messages are sent via the SRT channel. Each message payload is preceded by a common element header with the following structure:

The Node Indication Header 414 includes sequence number field that specifies the sequence number of the Indication or Confirmation. Each message refers to an object and each object has a version represented by the sequence number. Since MPLS-OCC control is run over an unreliable datagram network, the sequence number ensures consistent state between the controller and the node. Receivers must ignore messages with sequence numbers less than their version of the object's current sequence number. The sequence number is also used to correlate the Indication with the Confirmation. Each message has a key element or elements that identify the object associated with the message. The sequence number has no meaning across message types or within messages of the same type but having different key element values. Sequence Numbers may use Serial Number Arithmetic, such as described in R. Elz, "Serial Number Arithmetic," Network Working Group RFC 1982, August 1996.

An Operation field specifies the operation being performed on the object. The operation may include SET or CLEAR. A SET operation may create or modify the specified object in accordance with the remainder of the message. A CLEAR operation may clear the specified object.

Figure 10:
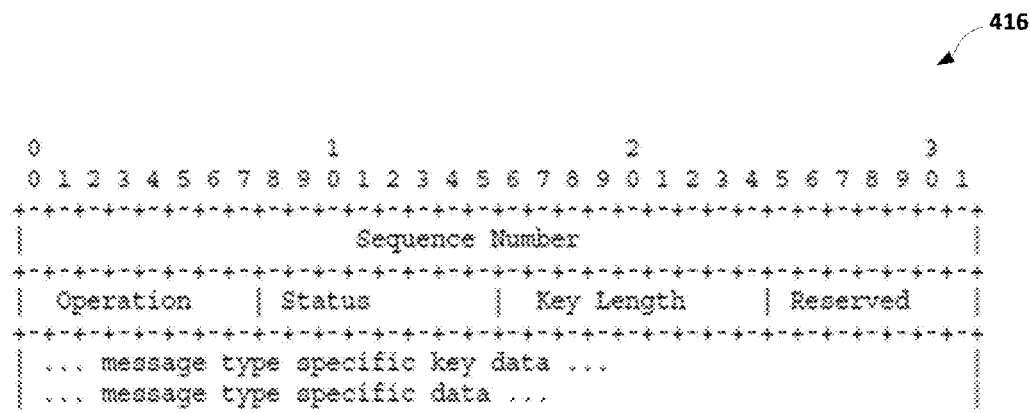
FIG. 10 is a block diagram illustrating an example Node Configuration Header Structure.

A Status field specifies the status code, which is set to 0 for all Indication messages and set to the message specific value on Confirmation. See the individual messages for details. A Key Length field specifies the length of the type specific key data. This information is used to correlate the object being operated on between the controller and the node. All Node Indication messages include their key data in the first Key Length bytes of their message structures. The Node Indication Header includes a Reserved field. This field is reserved. It is set to zero on transmission and ignored on receipt. Certain messages may use the Node Indication Header, including:
101: Port Attributes Indication
102: Port Attributes Confirmation
103: Capabilities Indication
104: Capabilities Confirmation
105: Services Indication
106: Services Confirmation
107: Endpoint Indication
108: Endpoint Confirmation FIG. 10 is a block diagram illustrating an example Node Configuration Header Structure 416. Node Configuration messages are generated by the controller to configure the target node, and to get responses back from the nodes. They are sent via the SRT channel. The Node Configuration Header includes a Sequence Number field that is used to correlate the Request with the Response. The general rules for sequence numbers are the same as those described for Node Indication Messages.

An Operation field specifies the operation being performed on the object. The operation may include SET or CLEAR. A SET operation may create or modify the specified object in accordance with the remainder of the message. A CLEAR operation may clear the specified object. A Status field includes a status code that is set to 0 for all Request messages and set to the message specific value on Responses. See the individual messages for details. A Key Length field specifies the length of the type specific key data. This information is used to correlate the object being operated on between the controller and the node. All Node Configuration messages include their key data in the first Key Length bytes of their message structures.

Figure 11:
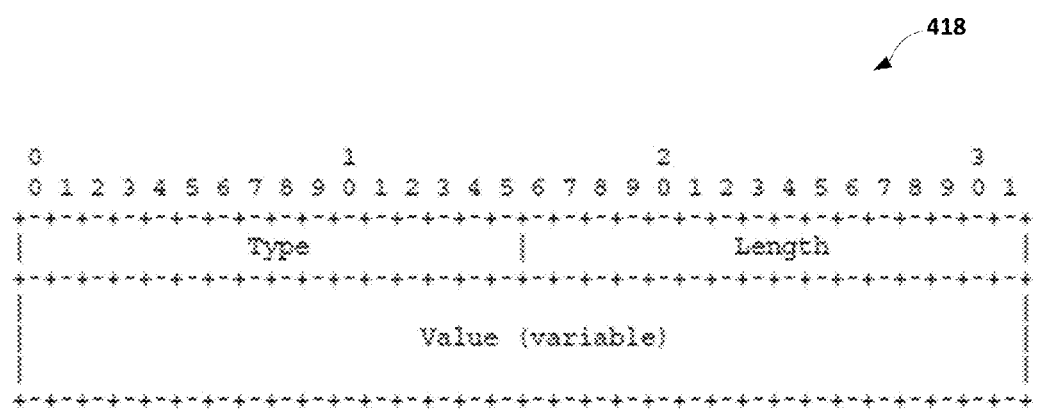
FIG. 11 is a block diagram illustrating an example TLV Structure.

The Node Configuration Header includes a Reserved field. This field is reserved. It is set to zero on transmission and ignored on receipt. The Node Configuration Header may be used with certain messages, including:
201: MPLS FIB Request
202: MPLS FIB Response 203: Policer Request
204: Policer Response
205: CoS Request
206: CoS Response
207: Filter Request
208: Filter Response
209: Pseudo Wire Request
210: Pseudo Wire Response
211: Direct Switch Request
212: Direct Switch Response
213: MAC FIB Request
214: MAC FIB Response FIG. 11 is a block diagram illustrating an example TLV Structure 418. Some of the messages encode their attributes as TLV (type, length, value) triples. TLVs are used generally to support message attributes of variable length. They also ease message extensions and can be used to support vendor specific attributes. A TLV structure may include a Type field that specifies the TLV Type. In some examples, a TLV of type 0 is used for vendor specific TLVs. In some examples, the TLV type may be a message specific value between 1 and 65535. See the message specific section for usage. The Length field defines the length of the value portion in octets (thus a TLV with no value portion would have a length of zero). A Value field specifies the contents of TLV. See the specific TLV description for more information.

Figure 12:
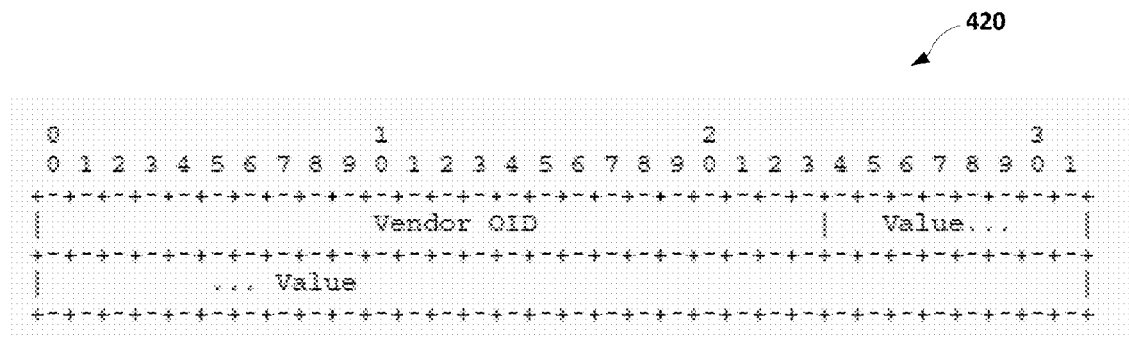
FIG. 12 is a block diagram illustrating an example Vendor Specific TLV Structure.

FIG. 12 is a block diagram illustrating an example Vendor Specific TLV Structure 420. A vendor specific TLV is used by vendors to extend messages with vendor specific attributes. The Value of the TLV has the following structure. A Vendor OID field specifies a Vendor Organization Identifier, including a unique identifier for the vendor as gotten from IEEE. A Value field specifies the Vendor specific value. This may be of any length and encoding as chosen by the vendor.

Figure 13:
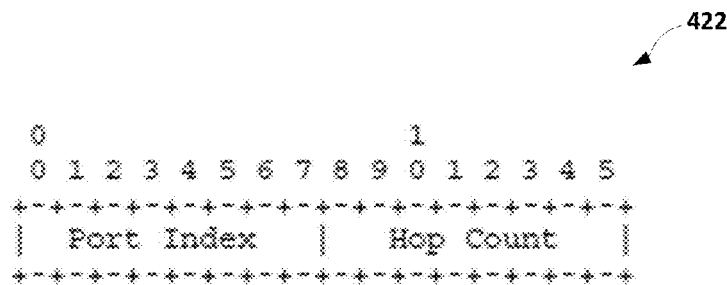
FIG. 13 is a block diagram illustrating an example Hello Message Structure.

FIG. 13 is a block diagram illustrating an example Hello Message Structure 422. The Hello message is a link-local broadcast message used to discover a neighbor across a point to point link. A node sends a Hello message periodically on all of its ports at a rate chosen by the sending node. The Hello message is used for both discovery and to determine the liveness of the link. The Source Address of the Ethernet header is the MAC address of the sending node and the Destination Address is all Fs. The Hello Message may include a Port Index field. The port index is local to the sender. Ports are indexed from 0 to 0xFE. The Port Index of 0xFF is reserved for the control plane of the node. Therefore OCC nodes may be restricted to 255 interfaces. In some examples, this may be a 16 or 32 bit index.

The Hello Message may include a Hop Count field that indicates the number of hops the sender is from the controller. Edge nodes set the hop count to 1 if they have a connection to the controller. Non-edge nodes select the least cost Hop Count from their neighbors and increment by 1 and transmit that hop count in their messages. When a node sends a Hello message to the node it is using as its TO_CONTROLLER nexthop, it sets the Hop Count to 0xFF to ensure that the receiving node will not immediately attempt to use the dependent node as an SRT path. When a node reboots, the first Hello message also carries a Hop Count of 0xFF.

Figure 14:
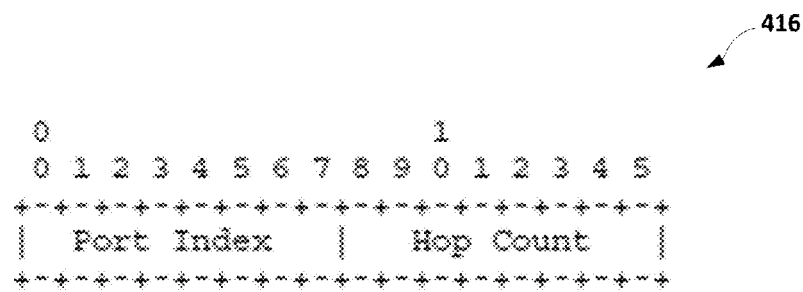
FIG. 14 is a block diagram illustrating an example Hello Reply Message Structure.

FIG. 14 is a block diagram illustrating an example Hello Reply Message Structure 416. The Hello Reply message is a unicast message used to reply to a Hello message. When a Hello Reply message is received on a port, the link is set to active by the receiver. The sender of the Hello Reply message MUST set the Source Address of the Ethernet Header to its own MAC address, and the Destination Address of the Ethernet Header to the Source Address of the corresponding Hello message. The Hello Reply message is sent on the same port from which the Hello message was received. The Hello Reply message may include a Port Index field. The port index is local to the sender. Upon receipt of this message, the receiving node can unambiguously describe the link between itself and its neighbor in terms of local and remote node identifiers (MAC addresses) and local and remote port indexes. The Hello Reply message may include a Hop Count field. The Hop Count field may be substantially similar to the Hop Count field for the Hello Message.

Figure 15:
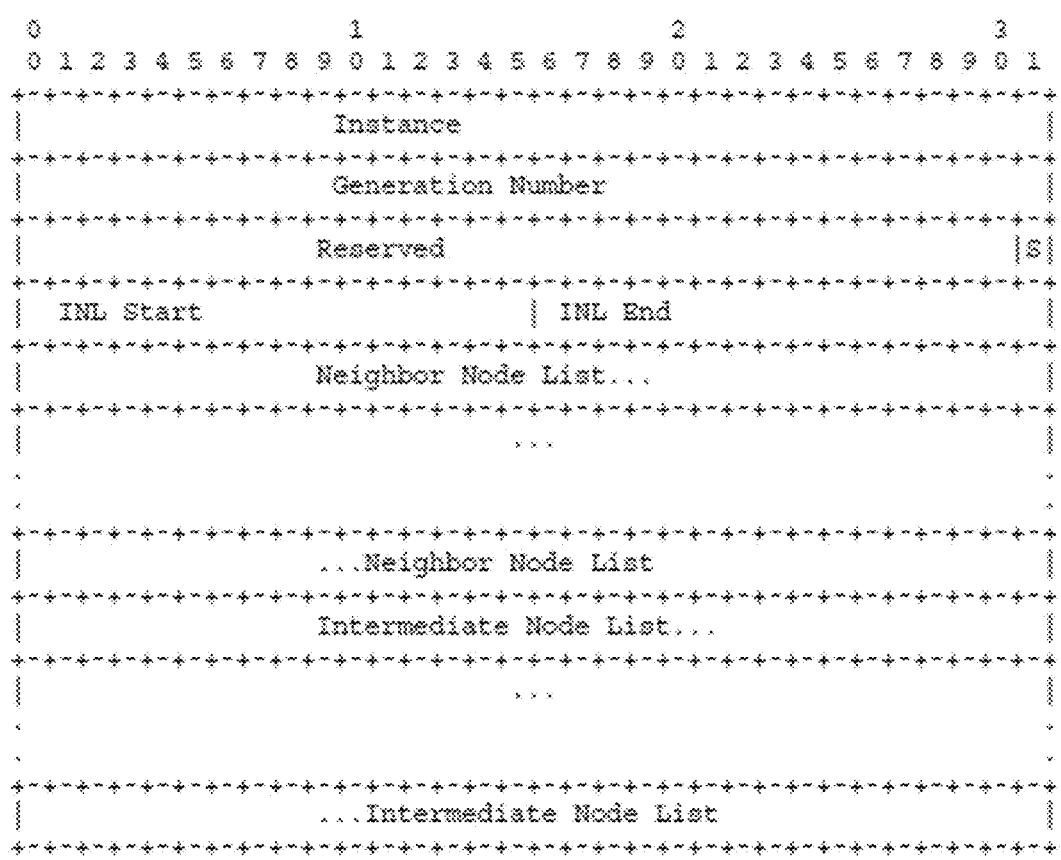
FIG. 15 is a block diagram illustrating an example Discover Message Structure.

FIG. 15 is a block diagram illustrating an example Discover Message Structure 418. The Discover message is generated by a node when its neighbor list changes, when its currently active SRT times out or when the least cost next-hop to the controller changes. In all cases, a new generation number is generated. The Discover message is periodically sent until its corresponding Discover Reply is received.

A Discover Message may include an Instance field. The Instance ID is a unique number for the instance of the node. A node should generate a new instance ID each time it reboots or otherwise resets its software state. The instance ID is used to disambiguate a Discover message with the same generation number between resets. The instance ID may be a random number or a monotonically increasing integer for nodes having some ability to store information between reboots.

A Discover Message may include a Generation Number field. The Generation Number is a monotonically increasing number. The controller ignores any Discover message with a generation number less than the most recently received generation number (unless the Instance changes). A Discover Message may include a Reserved field. This field is reserved. It is set to zero on transmission and ignored on receipt. A Discover Message may include a State bit field ("S"). This bit is set to 1 if the node has state as programmed by a controller. This bit is used by the controller to synchronize state between the controller and the node. Specifically, if the node has state but the controller does not have any state for the node, the controller should request that the node reset all of its state via the R flag of the Discovery Reply message.

A Discover Message may include an Intermediate Node List (INL) Start field that specifies the offset from the beginning of the OCC Message Payload to the start of the Intermediate Node List. This offset is required since the Neighbor Node List is variable in length. A Discover Message may include an INL End field that specifies the offset from the beginning of the OCC Message Payload to the end of the Intermediate Node List. A Discover Message may include a Neighbor Node List field that specifies the list of neighbors associated with this node. Each element in the list includes the neighbor's MAC address, the local port index on which a Hello Reply message was received and the neighbor's port index as indicated in the Hello Reply message.

A Discover Message may include an Intermediate Node List field that specifies the MAC addresses and their corresponding ingress and egress ports through which this packet traversed en route from the originating node to the terminating edge node (EN) inclusive.

Figure 16:
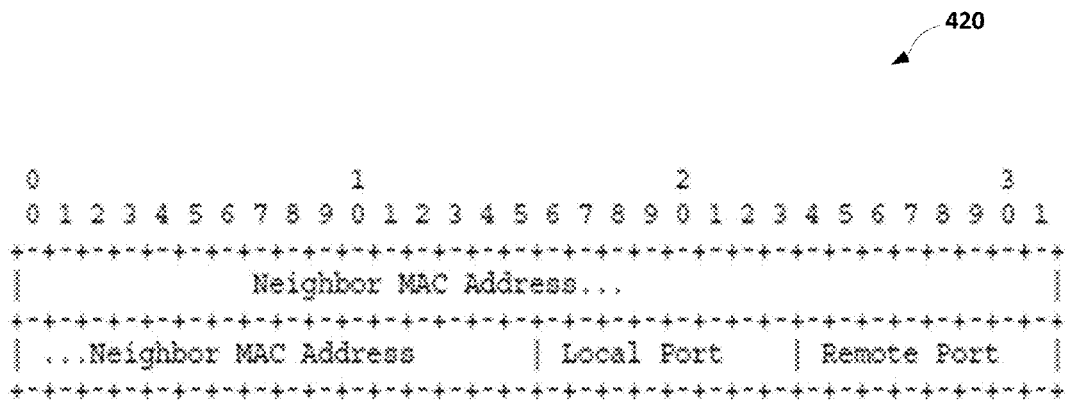
FIG. 16 is a block diagram illustrating an example Neighbor Node List Element Structure.

FIG. 16 is a block diagram illustrating an example Neighbor Node List Element Structure 420. A Neighbor MAC Address field specifies the MAC address of the neighbor as reported in the Ethernet Source Address of the Hello Reply Message. A Local Port field specifies the local port index over which the Hello Reply was received. A Remote Port field specifies the remote port index as reported in the Port Index of the Hello Reply packet.

Figure 17:
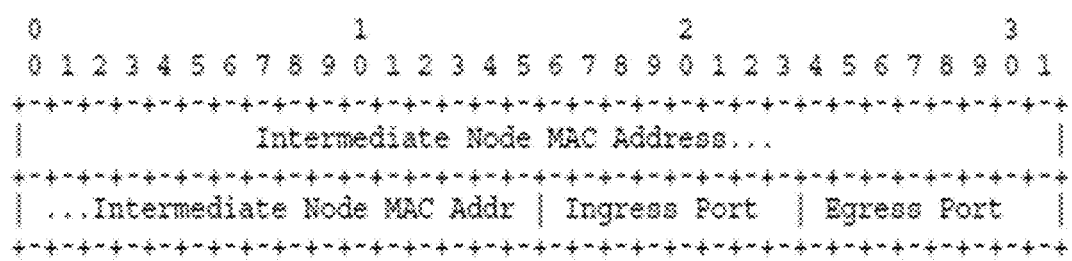
FIG. 17 is a block diagram illustrating an example Intermediate Node List Element Structure.

FIG. 17 is a block diagram illustrating an example Intermediate Node List Element Structure 422. An Intermediate MAC Address field specifies the MAC address of a node that received the Discover message and sent the packet toward the controller. An Ingress Port field specifies the index of the port on which the packet was received. An Egress Port field specifies the index of the port on which the packet was sent. This is also the port on the least cost path to the controller.

Figure 18:
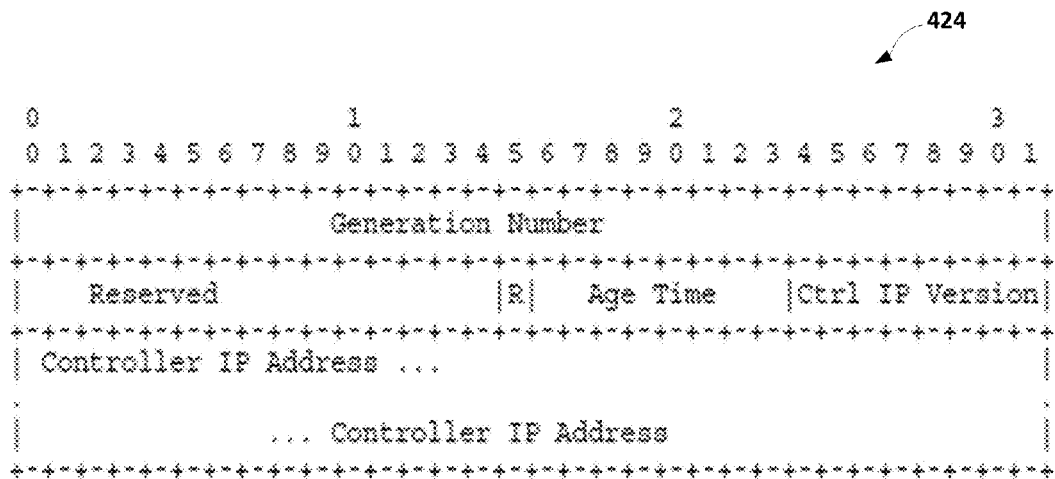
FIG. 18 is a block diagram illustrating an example Discover Reply Message Structure.

FIG. 18 is a block diagram illustrating an example Discover Reply Message Structure 424. The Discover Reply message is sent by the controller to acknowledge receipt of the Discover message. The Discover Reply is sent via an SRT indicating that there is an MPLS label stack on the packet from the controller that corresponds the source routed egress interface list used to route the packet. A Discover Reply message may include a Generation Number field. The Generation number is used to correlate the Discover Reply with the original Discover message. If the Generation number does not match the current generation number, the node discards the message. If they do match, the node initiates keepalive processing on the shortest path to the controller. A Discover Reply message may include a Reserved field. This field is reserved. It is set to zero on transmission and ignored on receipt.

A Discover Reply message may include a Reset bit ("R") field. This bit is set when the node indicates it has programmed forwarding state via the S bit of the Discover message but the controller has no state for the node. In this case the controller sets the R bit to force the node to reset all of its state and to generate another Discover packet.

A Discover Reply message may include an Age Time field. Age time is used to indicate to the node that the controller needs to synchronize its state with the node's state. When Age Time is non-zero, the node marks all of its state as "dirty." When Age Time, measured in seconds, expires, all state with the "dirty" bit set is cleared. In the mean-time, the controller is expected to replay all the state that had been previously pushed to the controller. When state is pushed into the controller, the "dirty" bit is cleared. When Age Time is nonzero, the node resends all Node Indication Messages.

A Discover Reply message may include a Crtl IP Version field that specifies the IP Version of the controller IP address, which implies its length. A Discover Reply message may include a Controller IP Address field that specifies the IPv4 or IPv6 address of the controller. This is the address the node should use to establish a TCP/IP control channel with the controller. It may also be used for other networking functions that are outside the scope of this specification.

The Keepalive message is used to maintain liveness of an SRT. It is periodically sent by a node after it has received a Discover Reply for the current generation number. The Keepalive message is sent via the SRT using the TO_CONTROLLER label from a node to the controller. The Keepalive message has no additional content. The Keepalive Reply message is sent by the controller upon receiving a Keepalive message. The Keepalive Reply message has no content. The Keepalive Reply message is sent via the SRT to the sender of the corresponding Keepalive message.

Figure 19:
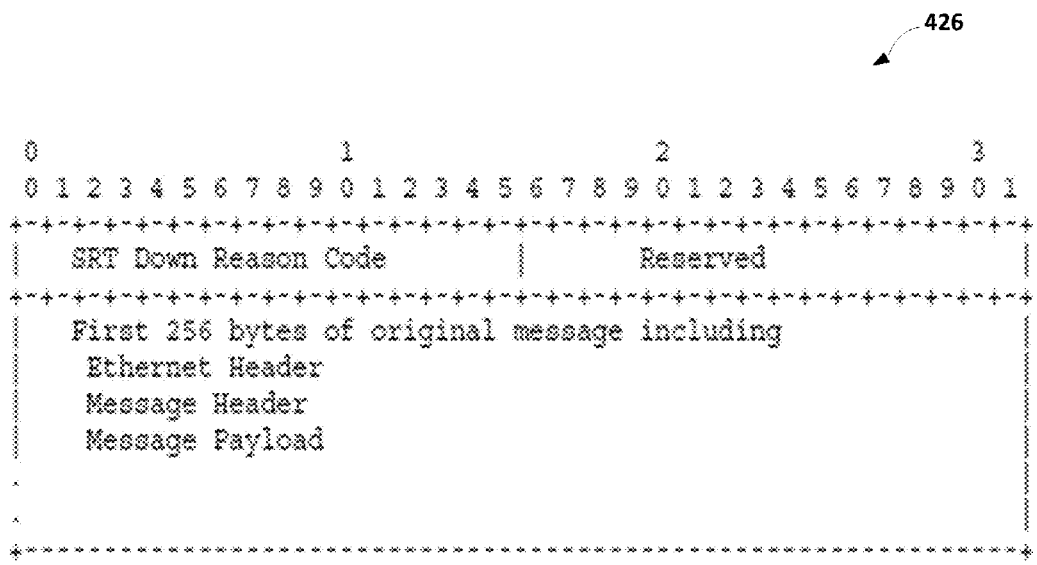
FIG. 19 is a block diagram illustrating an example SRT Down Message Structure.

FIG. 19 is a block diagram illustrating an example SRT Down Message Structure 426. The SRT Down message is used to indicate to a sending node that the SRT over which it has sent a packet has broken. This message provides immediate feedback to the sender that the SRT is down. With this indication, the sender does not have to wait for a keepalive timeout before taking corrective action.

When an NN receives an SRT Down message it increments its generation number and generate a new Discover message to establish a new SRT with the controller. When a controller receives an SRT Down message it modifies its state for the affected node such that the next Discover message from the node of equal to or greater than generation number is immediately accepted. That is, in some examples the controller compares the generation number specified by the Discover message to a current generation number received from the access node, and updates it stored network topology information if the generation number specified by the Discover message is greater than or equal to the current generation number. This avoids the condition where a Discover Reply for a given generation number is not able to follow the SRT specified and all Discovers from the node would be ignored since they specify a different INL.

When a controller receives an SRT Down message it may choose to recompute a new SRT to the node based on its local knowledge of the topology. Such a computation may shorten the required time to repair the control channel to the node in question. It also opens the opportunity for the controller to traffic engineer SRT paths to the nodes in the network.

The node detecting the SRT Down constructs the SRT Down message according to the following procedure: Construct an Ethernet header where the Source Address is set to the MAC address of the node sending the SRT Down message. The Destination Address is set the MAC address of the original packet. Add a new Message Header with OCC message type SRT Down and set the reason code. Append the first 256 bytes of the original packet including the Ethernet Header, the Message Header and the Message Payload. If the original packet is from the controller, send the packet along the TO_CONTROLLER path. Specifically encapsulate the packet with a single MPLS header with the TO_CONTROLLER label. If the packet is from a node and the node is a direct neighbor, send the packet to the direct neighbor. If the packet is from any other node, the only choice is to drop the packet since the path from the sender is not known.

Figure 20:
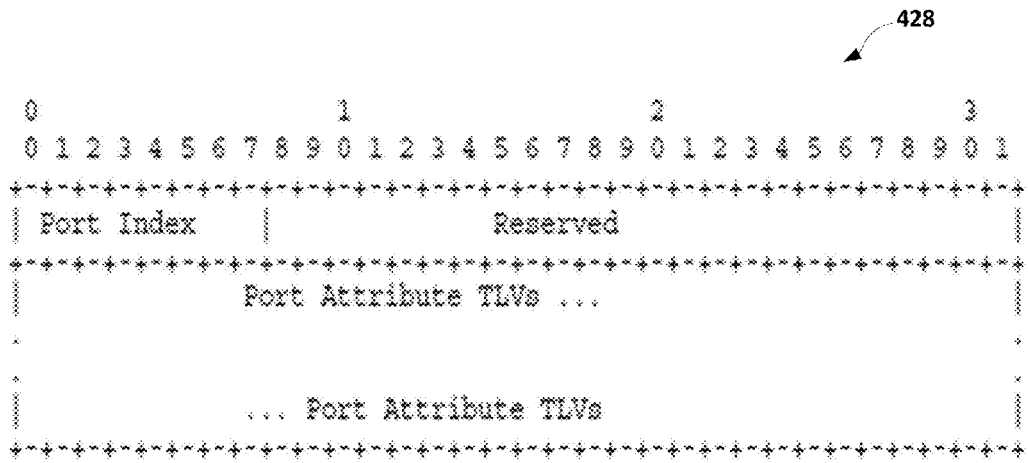
FIG. 20 is a block diagram illustrating an example Port Attributes Indication Message Structure.

An SRT Down Message may include an SRT Down Reason Code field that specifies the reason the SRT went down. Possible choices include:
0: Reserved
1: Neighbor at egress port is down
2: Invalid egress port for this node
4-65535: Reserved FIG. 20 is a block diagram illustrating an example Port Attributes Indication Message Structure 428. The Port Attributes Indication message is sent by a node to describe its port attributes to the controller. Port attributes only describe locally discoverable characteristics of ports such as maximum bandwidth or port type. Logical characteristics of ports such as port coloring or metric values are not something a node describes but could be something associated with the port at the controller via mechanisms such as configuration. Generally port attributes are attributes that effect traffic engineering calculations.

A Port Attributes Indication Message may include a Port Index field that specifies the port index for which the attributes apply. The port index represents the key element for the message. A Port Attributes Indication Message may include a Reserved field. This field is reserved. It is set to zero on transmission and ignored on receipt. A Port Attributes Indication Message may include Port Attribute TLVs field that includes a list of byte packed Port Attribute TLVs. Note that the MPLS-OCC message header length is used to calculate the length of this element. Port Attributes are encoded as TLVs to support extensibility. Port Attribute fields are described using a set of Type/Length/Value triplets as described above. The following Types are used for the Port Attribute TLVs.

1: Port Bandwidth.
2: Shared Resource Group
3: Shared Fate Group
4: Expected Transmission Time
5-65535: Reserved The Port Bandwidth Attribute may include a 64 bit value in bits per second for the port bandwidth. The Shared Resource Group Port attribute may include a structured 64-bit value that this this port to a set of other ports on the same node. The Shared Fate Group Port Attribute may include a 32 bit integer that represents the shared fate group for the specified port. The Expected Transmission Time Port Attribute may include the time expected to transmit a packet of 1K bytes across the port. Time is measured in microseconds and is encoded as a 32 bit unsigned integer.

Figure 21:
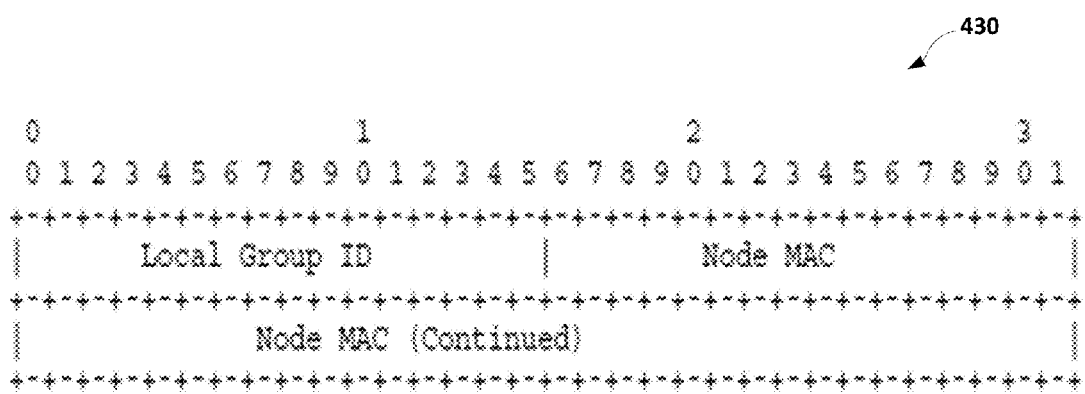
FIG. 21 is a block diagram illustrating an example Shared Resource Group Structure.

FIG. 21 is a block diagram illustrating an example Shared Resource Group Structure 430. The Shared Resource Group Port Attribute may include a structured 64 bit value that ties this port to a set of other ports on the same node. Ports having the same Shared Resource Group ID share bandwidth resources between themselves. This value could be sent via the Hello message to the node on the other end of the link so that the Shared Resource Group is globally understood by the controller. A Local Group ID field specifies a group ID local to the node. A Node MAC field specifies the MAC address of the node generating the group ID. This construct ensures that the group ID is globally unique.

Figure 22:
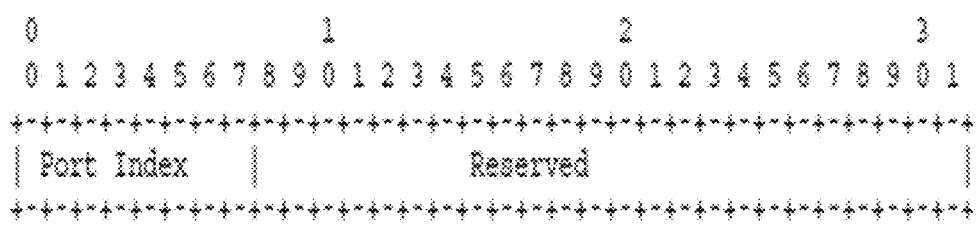
FIG. 22 is a block diagram illustrating an example Port Attributes Confirmation Message Structure.

FIG. 22 is a block diagram illustrating an example Port Attributes Confirmation Message Structure 432. The Port Attributes Confirmation message is sent by a controller to confirm the Port Attributes Indication message. The Port Attributes Confirmation Message may include a Port Index field that specifies the port index for which the attributes apply. The port index represents the key element for the message. The Port Attributes Confirmation Message may include a Reserved field. This field is reserved. It is set to zero on transmission and ignored on receipt.

Figure 23:
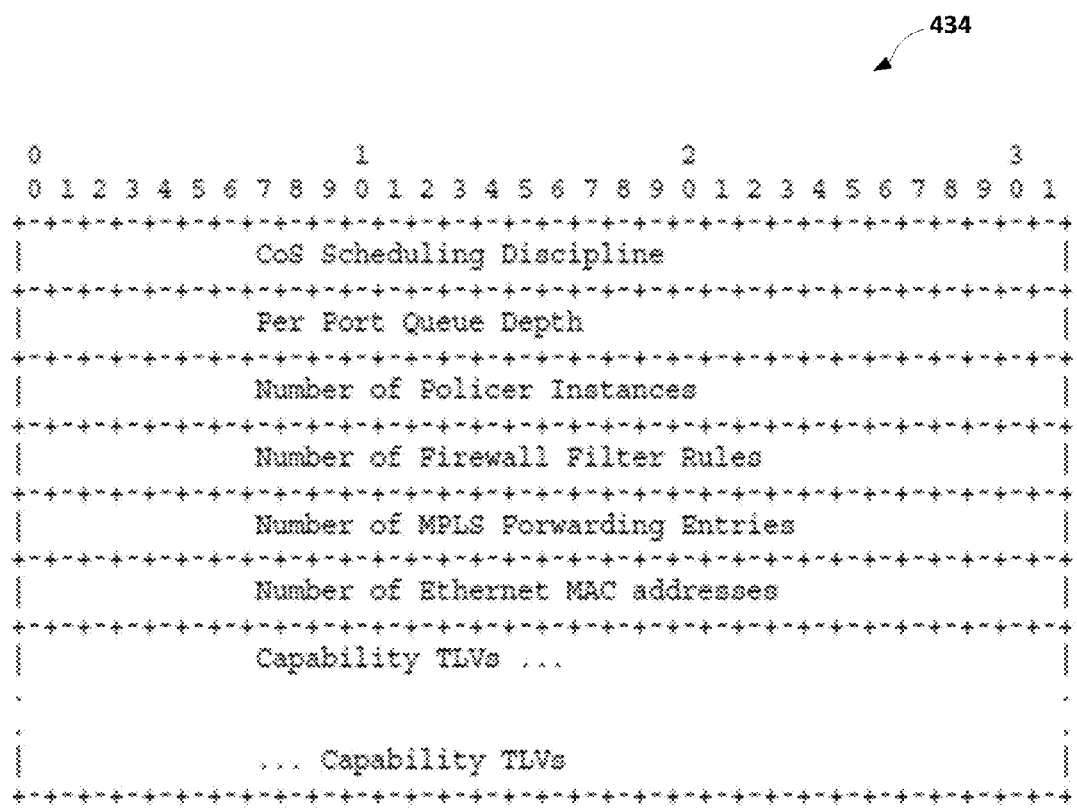
FIG. 23 is a block diagram illustrating an example Capabilities Indication Message Structure.

FIG. 23 is a block diagram illustrating an example Capabilities Indication Message Structure 434. The Capabilities Indication message is used to signal to the controller the current capabilities of the sending node. There is no key element associated with this message since it is global to the node. A CoS Scheduling Discipline field specifies a bit mask of supported CoS Scheduling Disciplines. Possible values include:
0x0001: Deficit Weighted Round Robin.
0x0002: Strict Priority.
0x0004: Strict Priority Restricted.

All other values are reserved and is set to zero on and transmission and ignored on receipt. A Per Port Queue Depth field specifies the number of bytes of memory available for packet queuing per port. A Number of Policer Instances field specifies the number of policer instances that are supported. A Number of Firewall Filter Rules field specifies the number of firewall filter rules supported. A Number of MPLS Forwarding Entries field specifies the number of MPLS forwarding entries supported. A Size of MAC Table field specifies the number of MAC table entries supported. A Max Label Stack Push field specifies the maximum number of labels that may be pushed onto a packet. A Max Label Stack Transit field specifies the maximum number of labels on the label stack that can transit the node.

Capability TLVs are included to allow for variable length capabilities, extensions and vendor specific attributes. The following types are specified.

1: Vendor Name. A UTF-8 non-NULL terminated text string describing the vendor name.
2: Model. A UTF-8 non-NULL terminated text string containing the vendor specific model name or number.
3: Serial Number. A UTF-8 non-NULL terminated text string containing the node's serial number.
4-65535: Reserved The Capabilities Confirmation is sent by the controller to confirm receipt of capabilities from the node. It has no additional content beyond the common headers.

FIG. 24 is a block diagram illustrating an example Services Indication Message Structure 436. The Services Indication message is used to signal to the controller the network services available at the specified node. Generally the Services Indication message is sent from an edge node. The Services Indication message is a byte packed sequence of Service Name, Type, and Affinity. The Service Name is the key element and the key length is specified in the Node Indication Header. A Service Name field specifies the UTF-8 encoded network service name and may be NULL terminated. A key-_len field of Node Indication Header specifies length of string, including a NULL character. The Service Name field is not padded at the end. A Type field specifies the type of service indicated. Service types include:
Subnet (0) An IP subnet.
VPLS (1) A VPLS or E-VPN instance.
L3VPN (2) A layer 3 VPN service.

An Affinity field specifies a relative measure of how strongly the controller should favor the indicating node for the given service against other nodes indicating the same service. The affinity value may be set up by a network management system, which has a global view of the network beyond the OCC subsystem and is used to configure the devices and services in the OCC subsystem part of the network. Services Confirmation message is sent by the controller to confirm receipt of network services from the node. It has no additional content beyond the common headers.

FIG. 25 is a block diagram illustrating an example Endpoint Indication Structure 438. The Endpoint Indication message is sent by a node to the controller to signal an endpoint status change. A Type field specifies the type of endpoint. Types include: Port-based (1): Port-based endpoint. Subscriber MAC is ignored. MAC-based (2): MAC-based endpoint. Subscriber MAC is part of the key.

A Port field specifies the port number. A Subscriber MAC field specifies the optional MAC address of the endpoint. Used when specifying MAC-based endpoints. A Status field specifies the status of the endpoint. The value of the Status field may include: Up (1): Endpoint is up. Down (2): Endpoint is down. The Endpoint Confirmation message is sent by the controller to signal receipt of an Endpoint Indication message from the node.

Figure 26:
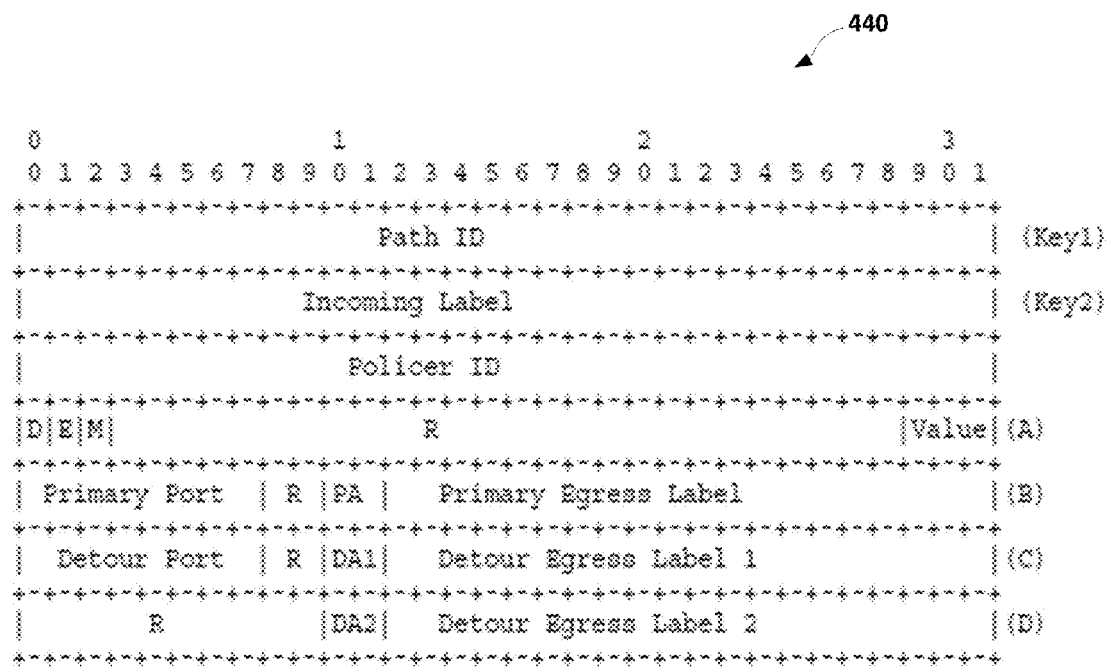
FIG. 26 is a block diagram illustrating an example MPLS FIB Request Message Structure.

FIG. 26 is a block diagram illustrating an example MPLS FIB Request Message Structure 440. The MPLS FIB Request message is generated to download the pre-computed Label Information Base to an individual network node in the OCC domain.

Upon receiving the message, the control plane software on the network node parses the label configuration information and programs the MPLS forwarding table. The key element for the FIB entry is the concatenation of Path ID and Label. On ingress LERs the Incoming Label is always set to 0. On LSRs, the Path ID need not be used to uniquely identify the entry since a given label is never used for more than one path. Note that optional words (A) and (B) (see below) is only required for SET operations. They may be omitted from CLEAR operations. Optional words (C) and (D) are present if required by detour operations (see D and E bit descriptions below). A Path ID field includes a 32-bit identifier for this path and may occupy the first 32 bits of the key for this entry. An Incoming Label field specifies the MPLS label for an incoming packet. The Incoming Label is 0 for the ingress node of the path and may occupy the second 32 bits of the key for this entry.

A Policer ID field specifies the Policer ID to instantiate and apply to traffic using this path. Note that this is generally applied on the ingress LER. A policer ID of zero (0) indicates that no policing is to be done on this LSP.

An MPLS FIB Request Message may include a "D" field. If set, a detour path entry is specified. Specifically, optional word (C) exists in the message. An MPLS FIB Request Message may include an "E" field. If set, the detour path entry includes a second action. Specifically, optional word (D) exists in the message. An MPLS FIB Request Message may include an "M" field that specifies the CoS mode for the detour path. Values for the "M" field may include:
0: Preserve the CoS bits in original packet.
1: Replace the original CoS bits with a new CoS value specified in "Value" field.

An MPLS FIB Request Message may include an "R" field. This field is reserved. It is set to zero on transmission and ignored on receipt. A Value field specifies the new CoS value to be used when the M bit is "1". A Primary Port field specifies the Primary path Port Index local to network node. A PA field specifies the MPLS action to be operated on an incoming packet when it takes the primary path. The actions include:
PUSH (1): Push the primary label to an incoming packet.
SWAP (2): Swap the label in an incoming packet with the primary label.
POP (3): Pop off the top-most label from an incoming packet.

Note that these numerical values are used for the DA1 and DA2 message fields as well.

A Primary Egress Label field specifies the MPLS Label to be pushed or swapped on to the outgoing packet. A Detour Port field specifies the Port Index local to network node for a detour path if present. A DA1 field specifies the first action to be operated on an incoming packet when it takes the detour path. MPLS actions include:
PUSH (1): Push Detour Egress Label 1.
SWAP (2): Swap the outermost label with Detour Egress Label 1.
POP (3): Pop off the outermost label.

A Detour Egress Label 1 field specifies the MPLS Label value used by the label operations specified in DA1. A DA2 field specifies the second action to be operated on an incoming packet when it takes the detour path. MPLS actions include:
PUSH (1): Push Detour Egress Label 2.
SWAP (2): Swap the outermost label with Detour Egress Label 2
POP (3): Pop off the outermost label.

A Detour Egress Label 2 field specifies the MPLS Label value used by the label operations specified in DA2.

Figure 27:
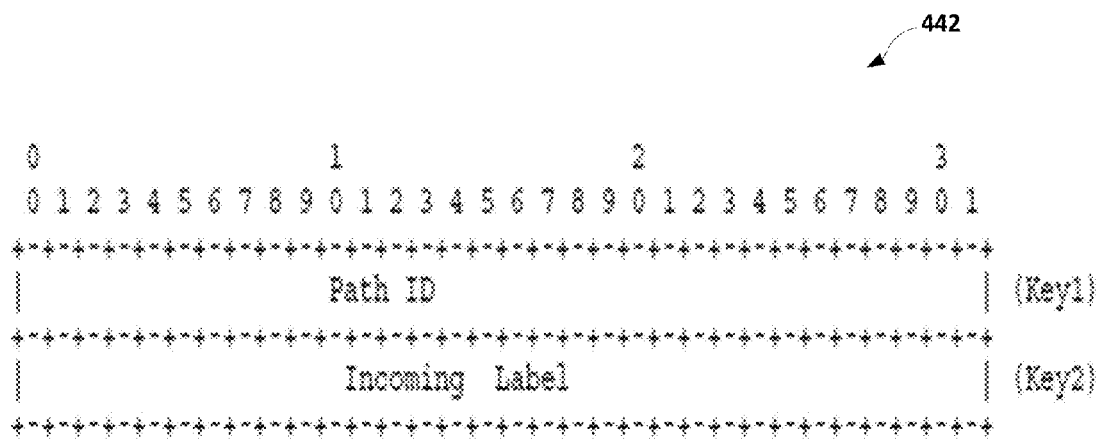
FIG. 27 is a block diagram illustrating an example MPLS FIB Response Message Structure.

FIG. 27 is a block diagram illustrating an example MPLS FIB Response Message Structure 442. The MPLS FIB Response message is sent by a network node to acknowledge back to the controller that the MPLS FIB Request message was received and processed with the indicated status code. The following Status codes may be used in the Node Configuration Header:
0: Success
1: Invalid Primary Egress Port
2: Invalid Primary Label Value
3: Invalid Primary Action
4: Invalid Detour Egress Port
5: Invalid Detour Label Value
6: Invalid Detour Action
7: Invalid Second Detour Egress Port
8: Invalid Second Detour Label Value
9: Invalid Second Detour Action
10: Invalid Incoming Label Value A Path ID field specifies the path identifier from the MPLS FIB Request message and may occupy the first 32 bits of the entry key. An Incoming Label field specifies the Label from the MPLS FIB Request message and may occupy the second 32 bits of the entry key.

Figure 28:
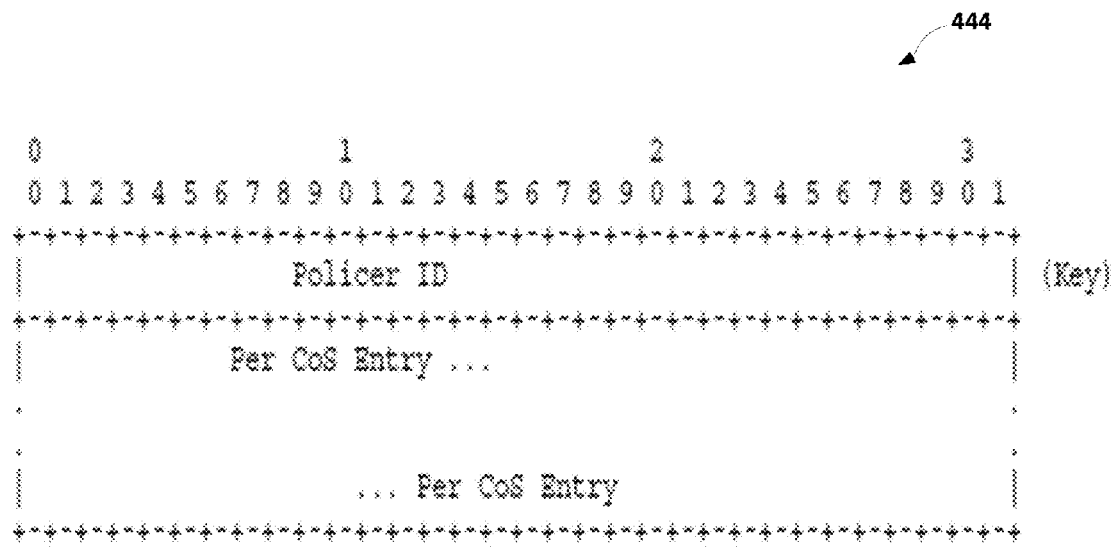
FIG. 28 is a block diagram illustrating an example Policer Request Message Structure.

FIG. 28 is a block diagram illustrating an example Policer Request Message Structure 444. The Policer Request message is used to specify a policer for an individual network node in the OCC domain. It specifies a BW Per CoS where BW is specified in bits per second. The key element for the message is the policer ID. Note that this message only specifies the policer. A policer instance is actually created when the policer is associated with some other object such as a filter or path. If the policer is modified, then all instances derived must be updated.

A Policer ID field specifies a Policer ID that serves as a unique identifier for this policer specification. This is the key element. A Per CoS Entry field indicates the bandwidth to be policed per CoS (see below).

Figure 29:
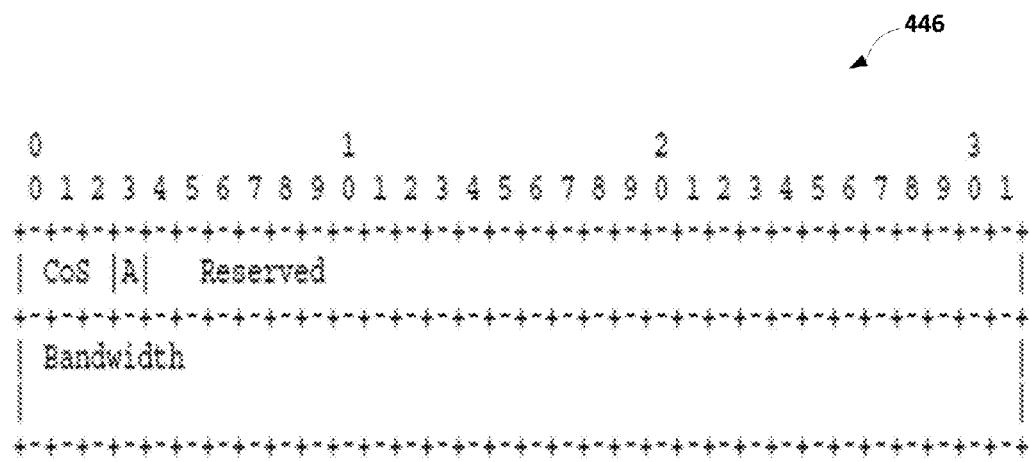
FIG. 29 is a block diagram illustrating an example Per CoS Entry Element Structure.

FIG. 29 is a block diagram illustrating an example Per CoS Entry Element Structure 446. A Per CoS Entry Element may include a CoS field that specifies the Class of Service. Up to 8 classes of service are supported. The class of service is also the same as the EXP bits used on the encapsulated MPLS frames. A Per CoS Entry Element may include an "A" field. If set, CoS is ignored and the policer applies to all CoS. In this case, only one Per CoS Entry may be present in the Policer Request Message. A Per CoS Entry Element may include a Bandwidth field that specifies the bandwidth allowed for the indicated class measured in bits per second. Note that Bandwidth is a 64 bit unsigned integer. A Per CoS Entry Element may include a Reserved field. This field is reserved. It is set to zero on transmission and ignored on receipt.

Figure 30:
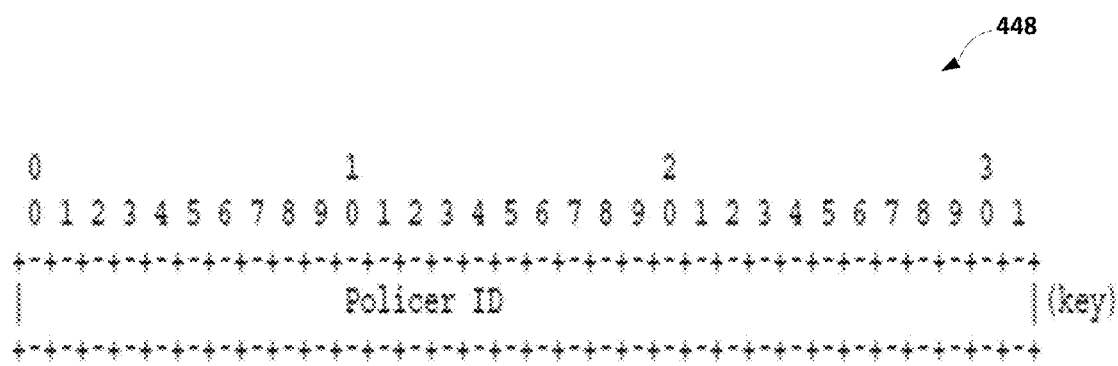
FIG. 30 is a block diagram illustrating an example Policer Response Message Structure.

FIG. 30 is a block diagram illustrating an example Policer Response Message Structure 448. The Policer Response message is sent by a network node to acknowledge back to the controller that the Policer Request message was received and processed with the indicated status code. The following Status codes may be used in the Node Configuration Header:
0: Success
1: Invalid Attribute A Policer ID field specifies the policer ID being acknowledged.

Figure 31:
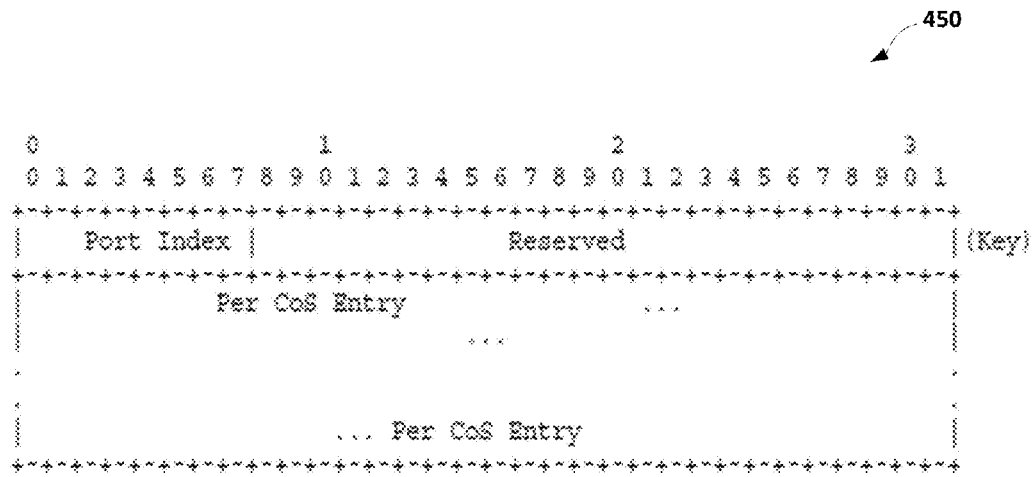
FIG. 31 is a block diagram illustrating an example CoS Scheduler Request Message Structure.

FIG. 31 is a block diagram illustrating an example CoS Scheduler Request Message Structure 450. The CoS Scheduler Request message is used to configure the CoS schedulers for a specific port of an individual network node in the OCC domain. The Port Index is the primary element for the message. An Entries field specifies the number of Per CoS Entries.

A Port Index field specifies the Port Index to which the CoS entries are applied. A CoS Scheduler Request Message may include a Reserved field. This field is reserved. It is set to zero on transmission and ignored on receipt.

Figure 32:
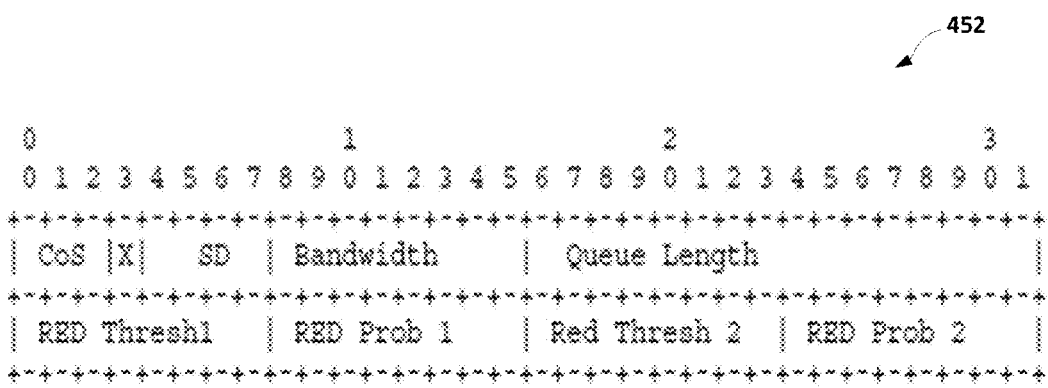
FIG. 32 is a block diagram illustrating an example Per CoS Scheduler Entry Structure.

FIG. 32 is a block diagram illustrating an example Per CoS Scheduler Entry Structure 452. The Per CoS Scheduler Entry indicates the Per CoS Scheduling parameters. If there is no Per CoS Entry for a given class of service then all packets matching that class of service are dropped.

A Per CoS Scheduler Entry may include an CoS field that specifies the Class of Service. Up to 8 classes of service are supported. The class of service is also the same as the EXP bits used on the encapsulated MPLS frames. A Per CoS Scheduler Entry may include an "X" field. If set, the CoS should be given minimal service. Only if there is no queued data for any other CoS is the packet transmitted. Otherwise the packet is dropped. When X is set, the remaining entries in the CoS Scheduler Entry are ignored. If X is cleared, the CoS is scheduled as specified in the remainder of the CoS Scheduler Entry. A Per CoS Scheduler Entry may include an SD field that specifies the Scheduling Discipline to be applied to this class of service. The following Scheduling Disciplines may be specified:

0: Deficit Weighted Round Robin (DWRR). This CoS is scheduled according to its Bandwidth weight. The DWRR scheduler round robins across all DWRR CoS according to the Bandwidth Weight. Classes may go into deficit if excess bandwidth exists.

1: Strict Priority. When Strict Priority is selected, the CoS is always scheduled whenever a packet of that class exists. When strict priority is used, the Bandwidth for the class is ignored and other classes are subjected to starvation or may not be serviceable according to their bandwidth allocation.

2: Strict Priority Restricted. Strict Priority Restricted schedules any packets of this class immediately so long as the bandwidth allocation has not been exceeded. Once bandwidth has been exceeded the class acts as any other DWRR class.

3-15: Reserved.

Note that scheduling behaviors among implementations may vary under certain circumstances. The following behaviors are unspecified: The behavior of a DWRR scheduler when a subset of the classes have exceeded their round robin allotment yet excess bandwidth capacity exists. Schedulers should schedule in proportion to the respective weights of the classes.

A Per CoS Scheduler Entry may include a Bandwidth field that specifies the Bandwidth for the CoS. The Bandwidth is specified as a percentage of the total available bandwidth of the port where 255 represents 100%. The sum of all CoS Scheduler Entry bandwidth values should equal 255. The bandwidth specified may be 0, indicating that the CoS is only scheduled when all other non-zero bandwidth classes have been scheduled. If all bandwidth allocations do not add up to 255, the implementation should normalize.

A Per CoS Scheduler Entry may include a Queue Length field that specifies the length of the queue specified in milliseconds. The implementation is expected to convert this number to a byte value based on the port bandwidth. If queue buffer resources cannot be allocated for all CoS then the scheduler should allocate according to the relative proportion of the Queue Lengths specified for all queues.

A RED Thresh 1 field specifies the first RED threshold. This is the percentage of queue full for the specified QoS. The value is specified as an 8 bit integer where 0 indicated 0% full and 255 indicates 100% full. RED Thresh 1 must be less than RED Thresh 2. When the queue length is greater than RED Thresh 1 but less than RED Thresh 2 (if specified) the packet is dropped with probability RED Prob 1.

A RED Prob 1 field specifies the drop probability for a packet when the queue depth has reached RED Thresh 1. This probability is specified as an integer from 0 to 255 where 0 represents 0% probability and 255 represents 100% probability. It is assumed that the drop probability is 0% when the current queue length is less than RED Thresh 1. This specification does not specify if the RED algorithm should use head, tail or random drop.

A RED Thresh 2 field specifies the second RED threshold. If unused it is set to 0. Otherwise it must be greater than RED Thresh 1. When the queue depth is greater than RED Thresh 2, packets are dropped with probability RED Prob 2. RED Thresh 2 follows the same encoding scheme as RED Thresh 1.

A RED Prob 2 field specifies the drop probability for a packet exceeding RED Thresh 2. RED Prob 2 follows the same encoding scheme as RED Prob 1.

Figure 33:
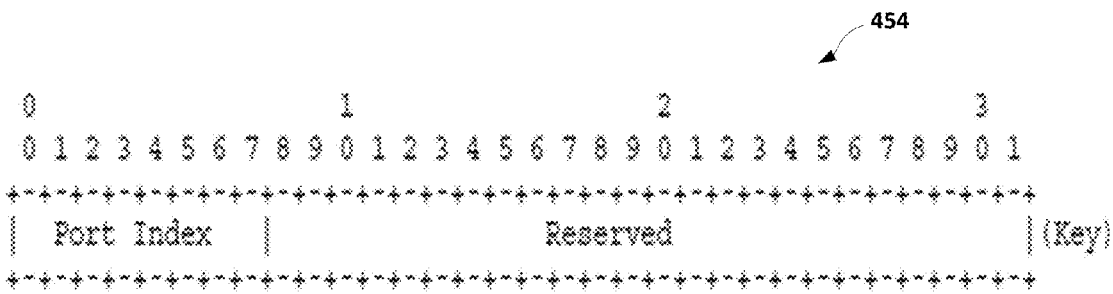
FIG. 33 is a block diagram illustrating an example CoS Scheduler Response Message Structure.

FIG. 33 is a block diagram illustrating an example CoS Scheduler Response Message Structure 454. The CoS Scheduler Response message is sent by a network node to acknowledge back to the controller that the CoS Scheduler Request message was received and processed with the indicated status code. The following Status codes may be used in the Node Configuration Header:

0: Success

1: Invalid Attribute.

A Cos Scheduler Response Message may include a Port Index field that specifies the Port Index from the original request. A Cos Scheduler Response Message may include a Reserved field. This field is reserved. It is set to zero on transmission and ignored on receipt.

Figure 34:
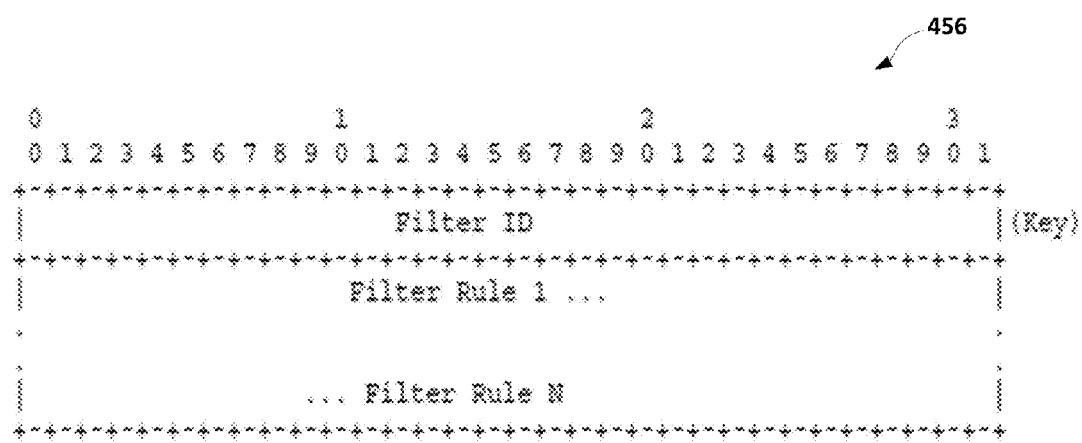
FIG. 34 is a block diagram illustrating an example Filter Request Message Structure.

FIG. 34 is a block diagram illustrating an example Filter Request Message Structure 456. A Filter Request message specifies a set of packet matching filter rules and actions to be taken when a rule is matched, for an individual network node in the OCC domain. Rules are specified in order of priority.

A Filter ID field specifies a unique 32 bit identifier for the filter. The Filter ID is the key element. A Filter Request Message may include "N" Filter Rules, where "N" is any positive integer. Filter Rules 1-N include a priority ordered list of Filter rules. Filter rules are byte packed.

Figure 35:
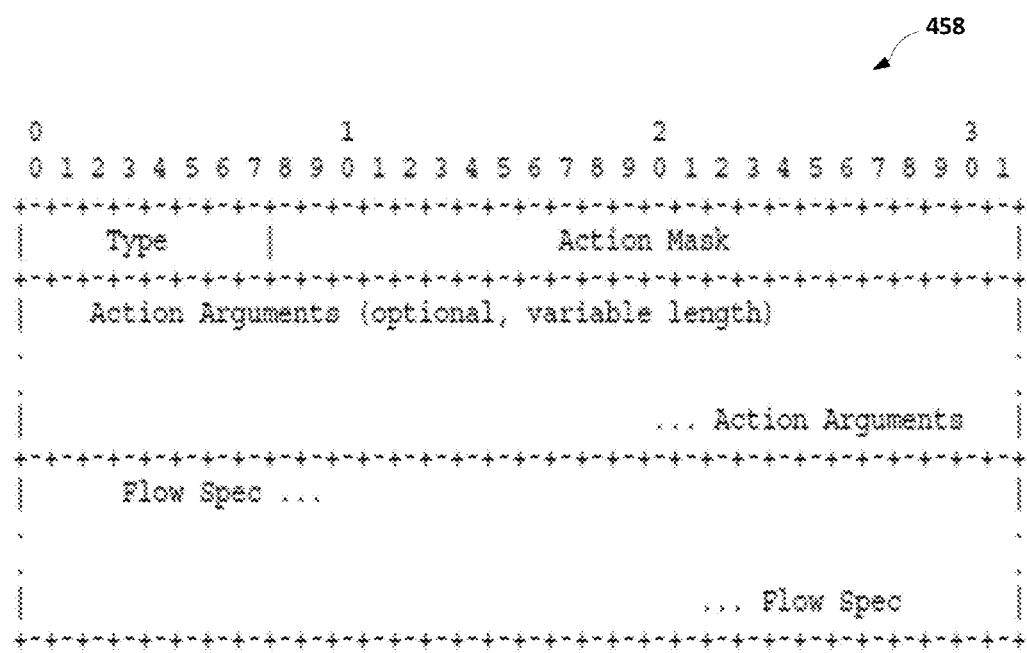
FIG. 35 is a block diagram illustrating an example Filter Rule Structure.

FIG. 35 is a block diagram illustrating an example Filter Rule Structure 458. A Filter Rule Structure may include fields for Type, Action Mask, Action Arguments, and Flow Spec.

A Type field specifies the filter type, which may be defined as follows:

0: IPv4: indicating that the Destination and Source Prefixes as specified in the Flow Spec are to be interpreted as IPv4 address.

1: IPv6: indicating as above for IPv6.

2: MAC: indicating as above for MAC addresses. When MAC addresses are specified, the IP Protocol is instead interpreted as the Ether Type.

3-255: Reserved.

An Action Mask field specifies an Action Mask where bits are defined as follows:

0x01 (Drop): Indicates that the packet is to be dropped. All other actions may be ignored when Drop is set.

0x02 (Forward): Indicates that the packet is to be forwarded normally.

0x04 (Set CoS): Indicates that the packet's Class of Service should be modified as indicated in the Action Argument. The Class of Service argument is a single byte of which only the three least significant bits are used. This action only sets the class of service for the packet, which is carried in the MPLS header EXP bits.

0x08 (Set DSCP): Indicates that the packet's DSCP field should be modified as indicated in the Action Argument. The DSCP argument is a single byte that is copied into the DSCP field of the IP header. This action is only valid for IPv4 and IPv6 type Filter Rules.

0x10 (Police): Indicates that the packet is to be policed by an instance of the Policer ID specified as an Action Argument. The Policer ID is encoded as a 32 bit identifier as specified in the Policer message.

0x20 (Redirect): Indicates that the packet is to be redirected to the specified next-hop. The Redirect Argument is a variable length argument.

An Action Arguments field includes a variable length collection of arguments as specified in the Action Mask descriptions. Individual arguments are byte packed and need not end on a 32 bit boundary. In other words, Flow Spec may not start on a 32 bit boundary.

A Flow Spec field includes a flow-spec as defined in P. Marques, "Dissemination of Flow Specification Rules," Network Working Group RFC 5575, August 2009, the entire contents of which are incorporated by reference herein. Note that the flow spec is not encoded as a NLRI with the NLRI specific lengthen coding. Only the "NLRI value" from the Flow Specification NLRI is encoded in the Flow Spec. The length value is not required since the flow-spec entry's length is implicit in its encoding.

Figure 36:
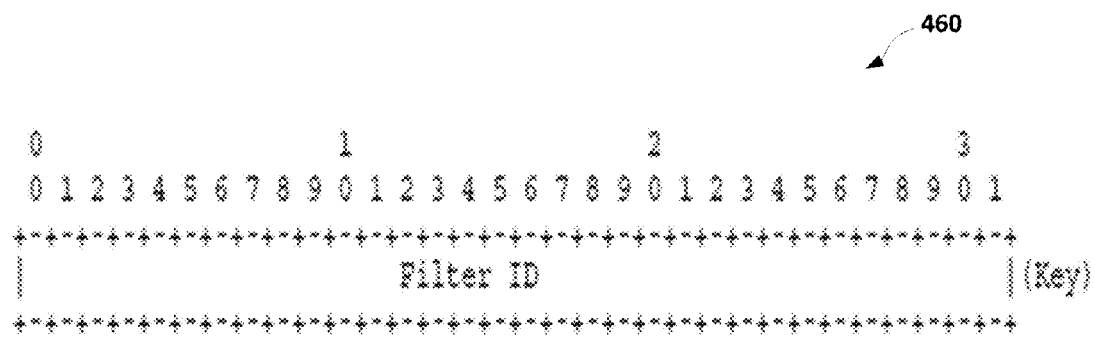
FIG. 36 is a block diagram illustrating an example Filter Response Message Structure.

FIG. 36 is a block diagram illustrating an example Filter Response Message Structure 460. The Filter Response message is sent by a network node to acknowledge back to the controller that the Filter Request message was received and processed. A Filter ID field specifies a unique 32 bit identifier for the filter.

Figure 37:
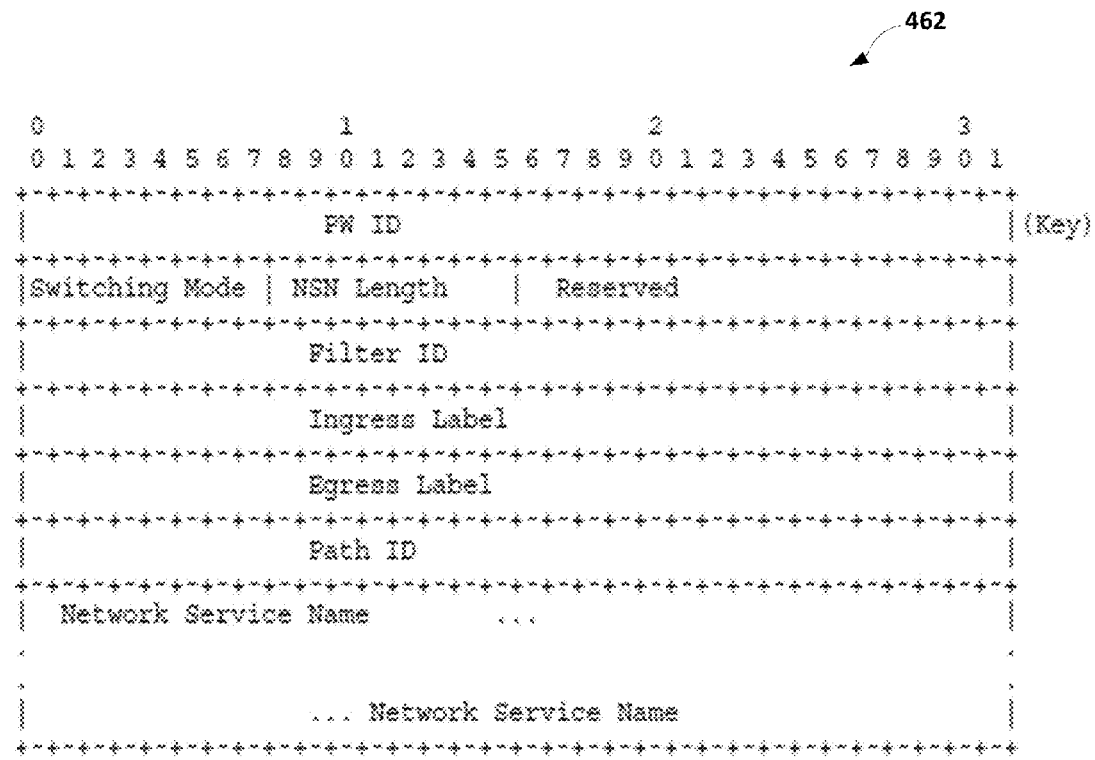
FIG. 37 is a block diagram illustrating an example Pseudo Wire Request Message Structure.

FIG. 37 is a block diagram illustrating an example Pseudo Wire Request Message Structure 462. The Pseudo Wire Request message is used to create a pseudo wire on the targeted node. The PW ID is the primary key for message. A PW ID field specifies the Pseudo Wire ID and may include the key for this message. A Switching Mode field may include the following values: Switch (0): Indicates that the PW is to act as a normal L2 switching port. This implies that unknowns may be flooded to the PW and MAC addresses are to be learned on the PW. Authorized (1): Indicates that the PW is to handle only MAC addresses that have been associated with the PW via a MAC FIB Request message. Packets with SMAC addresses from the PW that do not match a MAC FIB entry must be dropped. Unknowns are never flooded to this PW as all MAC addresses reachable via the PW are known.

An NSN Length field specifies the length in octets of the Network Service Name including the NULL termination character. A Pseudo Wire Request Message may include a Reserved field. This field is reserved. It is set to zero on transmission and ignored on receipt. A Filter ID field specifies an optional filter ID to be associated with all packets entering the PW, and is ignored if set to 0. An Ingress Label field specifies the service label for packets received from the PW. This is the local label. An Egress Label field specifies the service label for packets transmitted to the PW. This is the remote label. A Path ID field specifies the egress Path carrying the PW. A Network Service Name field specifies the network service to be carried via this PW. The name is a UTF-8 string of bytes terminated with the NULL (0) byte.

Figure 38:
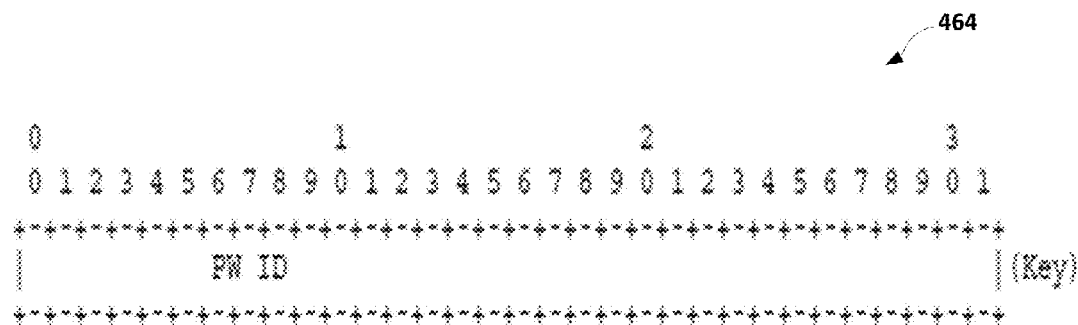
FIG. 38 is a block diagram illustrating an example Pseudo Wire Response Message Structure.

FIG. 38 is a block diagram illustrating an example Pseudo Wire Response Message Structure 464. The Pseudo Wire Response message is sent by a network node to acknowledge back to the controller that the Pseudo Wire Request message was received and processed with the indicated status code. The following Status codes may be used in the Node Configuration Header:
0: Success.
1: Invalid Filter ID.
2: Invalid Path ID.
3: Invalid Switching Mode.
4: Parse Error.

A PW ID field specifies a unique identifier from the corresponding Pseudo Wire Request.

Figure 39:
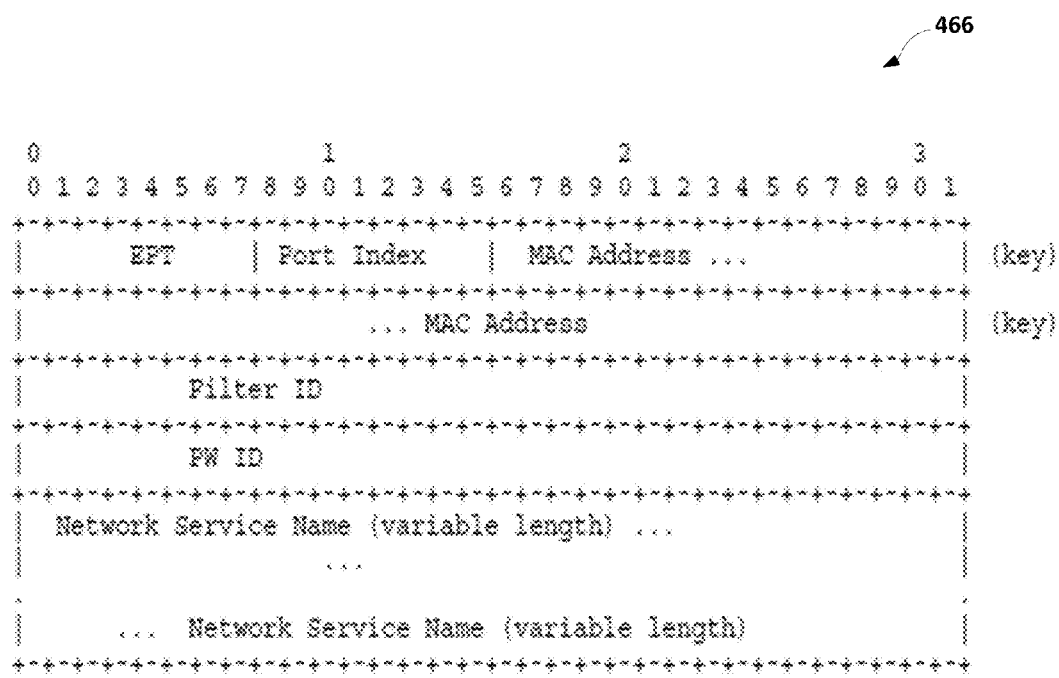
FIG. 39 is a block diagram illustrating an example Direct Switch Request Message Structure.

FIG. 39 is a block diagram illustrating an example Direct Switch Request Message Structure 466. The Direct Switch Request Message is used by the controller to map all the traffic from an endpoint in network node to a specific PW. An endpoint is defined as either a port-index or a (port-index, MAC) tuple. When the endpoint is defined as a port-index, all traffic from the PW is mapped directly to the port. When the endpoint is defined as a (port-index, MAC) tuple, all traffic from the PW matching the MAC is mapped to the specified port-index. An optional Filter ID may be specified with the message to filter the traffic from the end-point before transmitting it via the PW. It is ignored if set to 0.

An Endpoint Type (EPT) field specifies an endpoint type. The endpoint type is chosen from the following values:
Access Port (0): The endpoint is specified by an Access Port index on the access node. When this type is specified, the MAC Address element is ignored. All packets are mapped directly from the PW to the port and vice versa. When this type is specified, the key to the object is {EPT, Port Index}.
Access (Port, MAC) (1): The endpoint is specified as an Access Port and MAC address. When this type is specified, all packets from the (port, MAC) are mapped directly to the PW and all packets from the PW having DMAC==MAC Address are mapped directly to the Port Index. When this type is specified, the key to the object is {EPT, Port Index, MAC Address}.

A Port Index field specifies the Port Index to be mapped. A MAC Address field specifies the MAC address of the endpoint when EPT is set to Access (Port, MAC). Otherwise this element is ignored and must be set to 0. A Filter ID field specifies an optional Filter to be applied to packets from the endpoint, and is ignored if set to 0. A PW ID field specifies the PW ID to which all packets from the endpoint are to be transmitted. All packets from the PW are to be transmitted to the port when EPT is set to Access Port or when EPT is set to Access (Port, MAC) packets whose DMAC matches MAC address are sent to the port. A Network Service Name field specifies the UTF-8 encoded Network Service Name. The string is terminated with the 0 byte. Its length can also be computed from the total message length found in the OCC message header.

Figure 40:
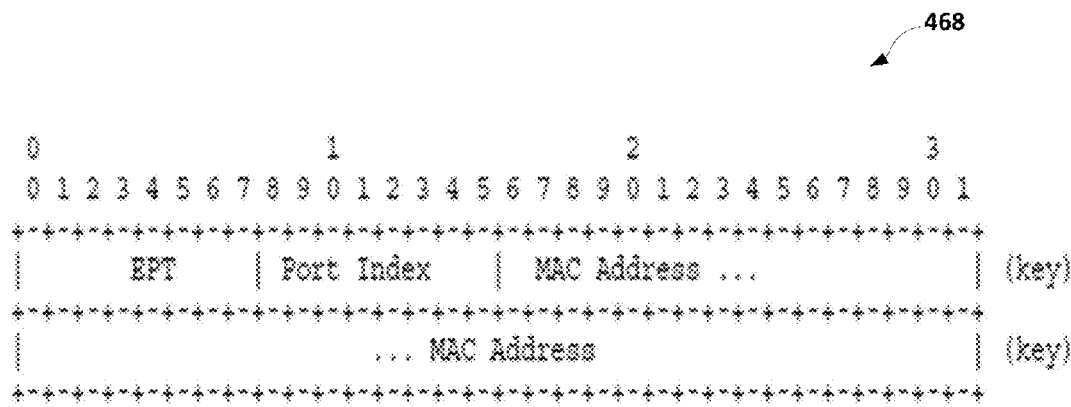
FIG. 40 is a block diagram illustrating an example Direct Switch Response Message Structure.

FIG. 40 is a block diagram illustrating an example Direct Switch Response Message Structure 468. The Direct Switch Response message is sent by a network node to acknowledge back to the controller that the Direct Switch Request message was received and processed with the indicated status code. The following Status codes may be used in the Node Configuration Header:
0: Success.
1: Invalid Filter ID.
2: Invalid PW ID.
3: Invalid EPT.
4: Invalid Port Index.
5: Parse Error.

An Endpoint Type (EPT) field includes the Endpoint Type as specified in the request. A Port Index field includes the Port Index as specified in the request. A MAC Address field includes the MAC Address as specified in the request.

Figure 41:
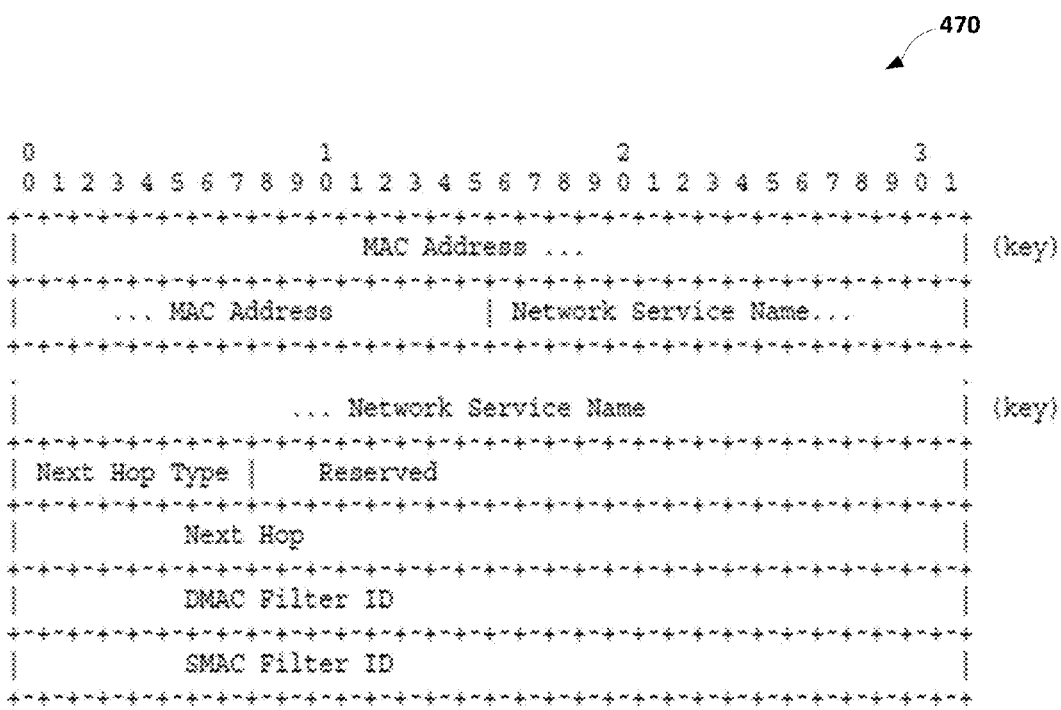
FIG. 41 is a block diagram illustrating an example MAC FIB Request Message Structure.

FIG. 41 is a block diagram illustrating an example MAC FIB Request Message Structure 470. The MAC FIB Request message is used by the controller to add a MAC entry into an Ethernet Switching table a network node. The specific switching table to be used is specified by the Network Service Name. Associated with the MAC entry may be optional filters associated with the MAC address as it passes through the FIB. Such filters may be associated with the DMAC or the SMAC.

The key to the MAC FIB Request Message is the concatenation of the MAC Address and the Network Service Name. A MAC Address field includes the MAC Address to be added to the FIB. Packets arriving at the Network Service whose DMAC matches this MAC address are to be transmitted via the specified Next Hop. The MAC Address is a key element. A Network Service Name field includes the Network Service Name. The Network Service Name is typically a VLAN or Bridge Domain to which this forwarding entry is to be associated. The length of the Network Service Name may be computed from the Key Length element of the Node Configuration Message header minus the length of the MAC Address (6 bytes). The Network Service Name is terminated with a 0 byte. The Network Service Name element is not padded to a word boundary. A Next Hop Type field includes the Next Hop Type, which may be chosen from the following values: Access Port (0), and Pseudo Wire ID (1). The Access Port and Pseudo Wire values are described in more detail in FIGS. 39 and 40, respectively.

A MAC FIB Request Message may include a Reserved field. This field is reserved. It is set to zero on transmission and ignored on receipt. A Next Hop field may include a Port Index or PW ID as defined by Next Hop Type. See Next Hop Type for type-specific encoding. A DMAC Filter ID field specifies the filter to be associated with all packets whose DMAC matches the MAC Address. This is an optional element and is ignored if set to 0. A SMAC Filter ID field specifies the filter to be associated with all packets whose SMAC matches MAC Address. This is an optional element and is ignored if set to 0.

Figure 42:
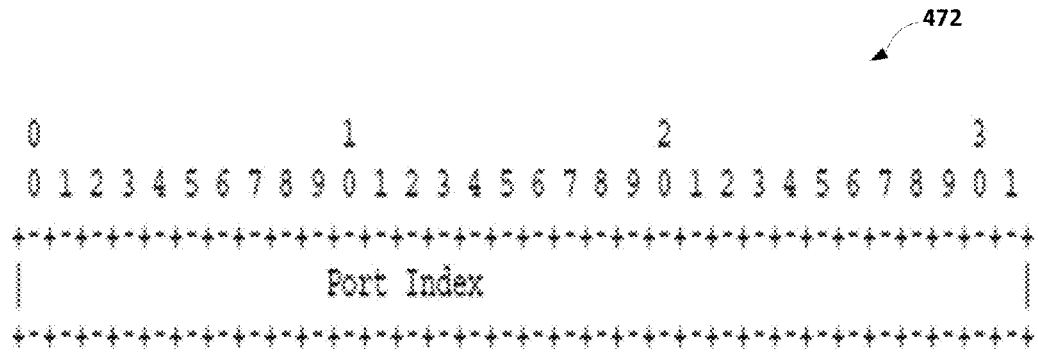
FIG. 42 is a block diagram illustrating an example Next Hop Port Descriptor.

FIG. 42 is a block diagram illustrating an example Next Hop Port Descriptor 472. The Next Hop is specified by an Access Port Index on the access node. The Next Hop element includes a Port Index field which specifies the Port Index where the MAC is located. In some examples, the Port Index may include 32 bits rather than 8 to keep the implemenation simpler.

Figure 43:
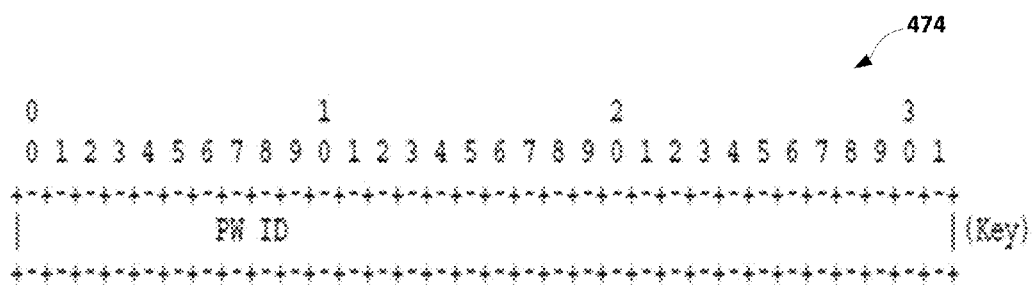
FIG. 43 is a block diagram illustrating an example Next Hop Pseudo Wire (PW) Descriptor.

FIG. 43 is a block diagram illustrating an example Next Hop Pseudo Wire (PW) Descriptor 474. A Next Hop PW Descriptor includes a PW ID field that specifies the endpoint as a Pseudo Wire ID.

Figure 44:
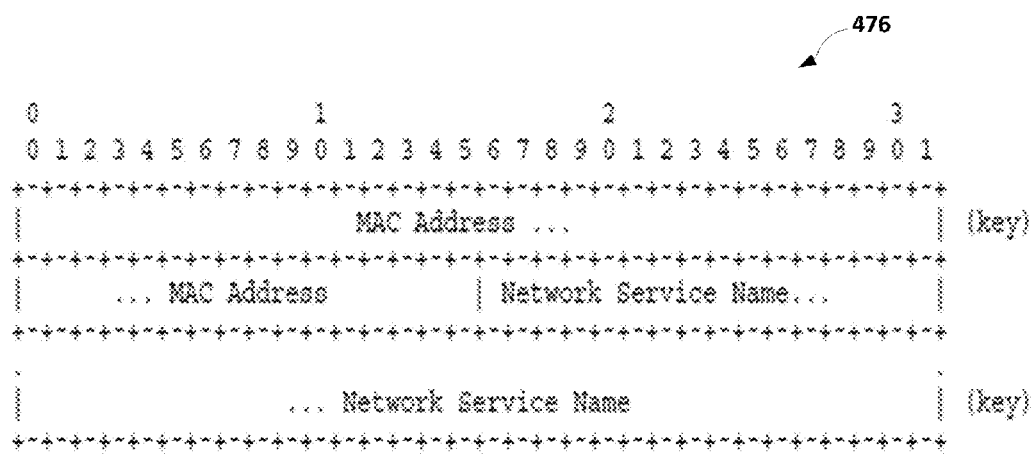
FIG. 44 is a block diagram illustrating an example MAC FIB Response Message Structure.

FIG. 44 is a block diagram illustrating an example MAC FIB Response Message Structure 476. The MAC FIB Response message is sent by a network node to acknowledge back to the controller that the MAC FIB Request message was received and processed with the indicated status code.

The following Status codes may be used in the Node Configuration Header:
0: Success.
1: Invalid Filter ID.
2: Invalid PW ID.
3: Invalid Next Hop Type.
4: Invalid Port Index.
5: Parse Error.

A MAC FIB Response Message may include a MAC Address field that specifies the MAC Address from the corresponding MAC FIB Request. A MAC FIB Response Message may include a Network Service Name field that specifies the Network Service name from the corresponding MAC FIB Request. The protocol may also include a message for a node to signal to a controller that the node is seeing multiple neighbors on a port. Multiple neighbors are illegal since we are assuming P2P ports.

Generally speaking, many Ethernet based protocols assume an Ethernet payload MTU of 1500 bytes. However, some MPLS control packets may exceed this MTU. For example, the Discovery message may include up to 256 neighbors and 64 intermediate nodes resulting in an Ethernet payload of 2576 bytes. However, most modern systems support Ethernet Jumbo frames (Ethernet MTU is 9216). Therefore, in order to support a network of maximum scale, the Ethernet interfaces should support Jumbo frames of at least 2576 payload bytes. 802.11 links have an MTU of 7981, which is sufficient for MPLS-OCC as well.

Other MPLS-OCC messages may grow arbitrarily large, for example, the Filter Request message. Since this message is essentially unbounded in size, MPLS-OCC must include either a streaming mechanism or a fragmentation and reassembly mechanism. Rather than specifying these mechanisms, MPLS-OCC should use existing mechanisms that already exist, for example TCP/IP. Section 6 discusses a general solution to this problem.

MPLS-OCC uses three control channels. (1) Physical Link: A Physical Link message channel is a physical Ethernet Link between the sending and receiving nodes. The message is carried in an Ethernet frame with the MPLS-OCC Ether type. The Hello, Hello Reply and Discover messages are direct link Messages. (2) SRT channel: An SRT message channel is the channel used for the basic control communication between the controller and the node. Messages from the controller to the node use the MPLS label stack that describes the source routed path to the node. Messages from the node to the controller use the TO_CONTROLLER label to traverse the path discovered via the Hello messages. The SRT channel is used for all messages required to maintain the SRT and build the data plane which include Discover Reply, Keepalive, Keepalive Reply, SRT Down, MPLS FIB Request/Response, Policer Request/Response, CoS Request/Response, Filter Request/Response, Pseudo Wire Request/Response, Direct Switch Request/Response and MAC FIB Request/Response (for node data plane only).

(3) TCP/IP A TCP/IP channel may be used for any other messages or any SRT messages as seen fit by the implementation. Note that implementation must fall back to the SRT channel if the TCP/IP channel goes down. TCP Keepalives should be used on the TCP channel. The TCP channel should never be used for Discover, Hello, Keepalive and SRT Down. The TCP channel should be used with care for the MPLS FIB Request, Policer Request, CoS Request, Pseudo Wire Request and MAC FIB Request as these messages are used to actually build the Pseudo Wire over which the TCP/IP channel runs. Generally speaking, the TCP/IP channel is intended to be used for messages associated with endpoint authorization.

TCP/IP Channel Establishment is now described. In some examples, the MPLS-OCC may be run over a TCP/IP channel, as TCP/IP solves the general problems of fragmentation and reassembly and flow control. In order to establish the TCP/IP channel, the node must be connected to an IP network and acquire an IP address over that network. A node, therefore, may be treated as an endpoint with the special property that this endpoint is actually the control plane of the node itself. When the controller sees a new node the controller may give the node connectivity to an IP network by creating a pair of LSPs between the node and the edge node connected to the desired IP network (typically the management network). Secondly, the controller creates a PW between the node's control plane and the edge node's network service.

A Direct Switch Request message with an endpoint of type Port and a port index of 0xFF indicates to the node that this Direct Switch Request message is to be used to connect the node to an IP network. The node may then attempt to allocate an IPv4 address and/or an IPv6 address via DHCP, DHCPv6 or IPv6 AD mechanisms.

Once the node allocates the IP address the node may construct an IP host stack over that interface. It may then connect to the controller via the address specified in the Discover Reply message to create a TCP/IP channel with the controller.

Once the channel is created, MPLSOCC control messages may be received over that channel.

MPLS-OCC messages sent over the TCP/IP stream include the OCC Message Header followed by the OCC Message Payload. The OCC Message header may be used by socket applications to read a known quantity of bytes from the message stream and determine the number of bytes in the entire message, from which it can then read that number of bytes from the stream.

Figure 45:
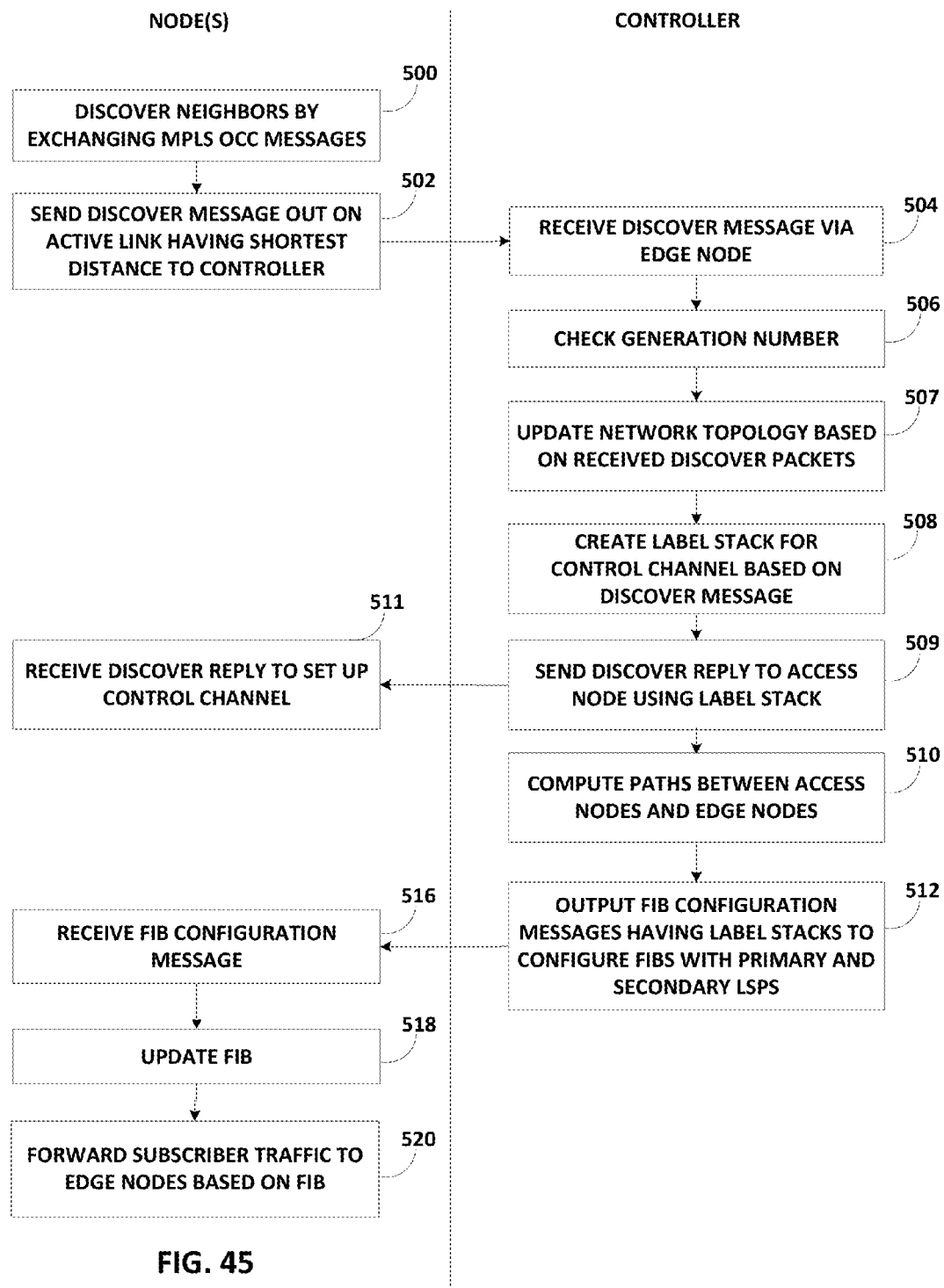
FIG. 45 is a flowchart illustrating example operation of network devices in accordance with the techniques of this disclosure.

FIG. 45 is a flowchart illustrating example operation of network devices in accordance with the techniques of this disclosure. In the example of FIG. 45, a control channel and a data channel between a network node and the controller is established. When a network node (AG or AX) is connected to the network for the first time, the network node discovers its neighbors using the messages described above for the MPLS-OCC protocol (500) and reports this information to the controller. The mechanism of connecting to the controller involves a discovery process, in which the Discover message is sent out on the active link with the shortest distance to the Controller (504). The network node receiving the Discover message then forwards the Discover message from the initiating node to the Edge Node after updating the intermediate node list, and the Edge Node in turn sends the Discover message to the Controller over a UDP connection. The controller receives the Discover message over the UDP connection (504). The information sent to the controller by the initiating node includes the list of its neighbors as well as the set of interfaces and intermediate nodes that the Discover message traversed on the path to the Edge Node.

In some examples, the Discover message specifies a generation number. Once the Controller receives the Discover message, the Controller can compare the generation number specified by the Discover message to a current generation number received from the access node (506), and update the stored network topology information if the generation number specified by the discover message is greater than or equal to the current generation number (507). If the controller determines that the generation number specified by the Discover message is less than the current generation number, the Controller may discard the Discover message.

The Controller, upon receiving this list of intermediate nodes and interfaces, is able to reverse the path traversed by the Discover message to reach the initiating network node using a source-routed mechanism. In this manner, the initiating network node is able to connect to the Controller and set up a bidirectional control channel for sending control messages to the access node. For example, the Controller may reverse the intermediate node list in the received packet to create a stack of labels which create the control channel (508). The labels are a direct mapping from label value to port number and so the intermediate nodes may or may not be configured to handle the label, i.e., depending on their capabilities the intermediate nodes may be able to determine the output port by looking at the label value, or their FIB may be configured to forward. The controller sends a discover reply message to the access node, where the discover reply message bears the label stack determined by the controller (509), and the access node receives the discover reply message via the edge node to complete the control channel between the controller and the access node (511).

As each connected node reports its neighbors to the Controller, the Controller is able to discover the topology of the entire network. Once the topology is known, the Controller may, in some examples, compute data channel paths between each Access Node and each Edge Node based on the capacity available in the network, the load in the network, the QoS required for the traffic to/from the Endpoints connected to the Access Node and the overall policy configured for subscribers (510). The paths are described as LSPs between the Access Nodes and the Edge Nodes; the traffic from each endpoint connected to the access node is carried over a Pseudo-Wire within this LSP. In addition to the primary paths, the controller may also compute detour paths.

Once the paths and the detours are computed, the Controller outputs FIB configuration messages to configure the forwarding tables (FIBs) in the edge nodes, aggregation nodes, and access nodes with the appropriate ingress to egress label mapping for both upstream and downstream directions, so that traffic forwarding is enabled (512). In addition to the primary forwarding entries, the controller configures the secondary forwarding entries as well so that switchover, in case of link or node failure, can happen without any Controller involvement. The controller may output the FIB configuration messages with a label stack determined by the controller based on the intermediate node list of a received Discover message. When a node receives the FIB configuration message from the controller (516), the node updates its FIB based on the message (518) and forwards subscriber traffic to edge nodes based on the FIB (e.g., via pseudo wires and LSPs configured by the FIB configuration messages from the controller).

The nodes and controller can adapt to changes in topology. Once the node has joined the network and is forwarding traffic, the node continues to send periodic messages to its neighbors. If a link or node fails, that information is discovered via this mechanism. Each of the nodes around the failure independently and locally determines this change, and switches the impacted LSPs to their pre-configured detours. While the data-plane continues its operation uninterrupted, each node immediately exchanges messages with its neighbors to check which links and nodes are active. Each node then reports this information via another Discover message, which is sent to the neighboring node with the shortest path to the Controller. The neighboring node with the shortest path to the Controller updates and forwards this Discover message to the Controller, which is thus notified of the topology change. The Controller re-computes the topology and the paths. Finally, the Controller configures the required changes, if any, into the relevant nodes.

The path is then repaired in a make-before-break fashion at the node adjacent to the failure, and the old portion of the path is removed. Note that if a detour becomes unused, it should not be deleted until all the paths that rely on it have been re-assigned.

The nodes and controller can also adapt to changes in link capacity. For example, the Controller may compute and configure paths (LSPs) based on the bandwidth required by that path (total of all the pseudo-wires carried over it). If for some reason, a link capacity on that path changes (e.g., fading due to rain on a wireless backhaul link), this information is conveyed to the Controller, which then re-computes an alternate path for the traffic and re-configures the impacted nodes to switch the traffic over in a make-before-break fashion.

Figure 46:
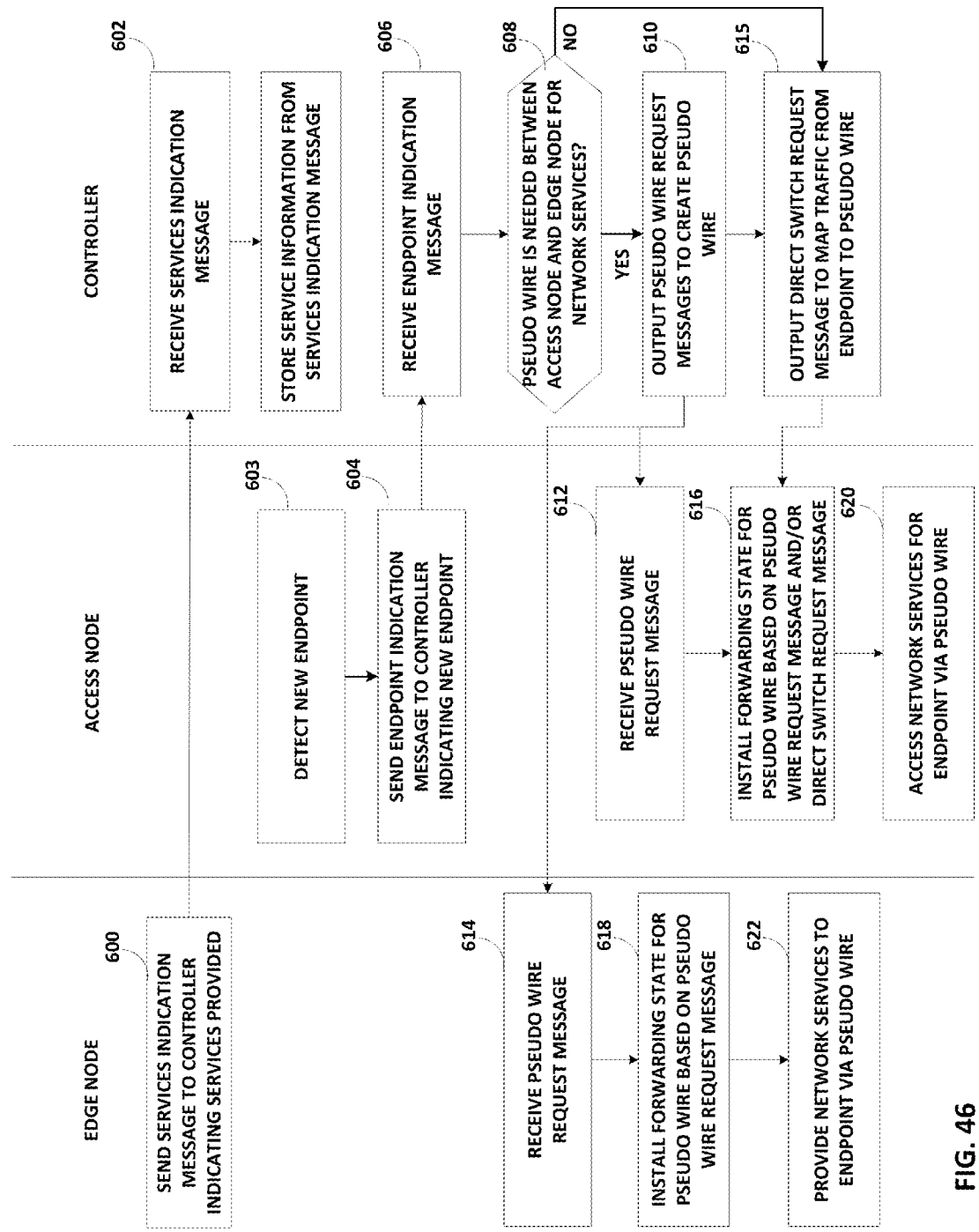
FIG. 46 is a flowchart illustrating example operation of network devices in accordance with the techniques of this disclosure.

FIG. 46 is a flowchart illustrating example operation of network devices in accordance with the techniques of this disclosure. In the example of FIG. 46, a network node (e.g., an edge node) can send a services indication message to the controller, where the services indication messages indicates one or more network services provided by the edge node (600). Details of an example services indication message are described above. The controller receives the services indication message (602). An access node can detect that an endpoint has joined the network (603), and in response, sends an endpoint indication message to the controller (604). Details of an example endpoint indication message are described above. The controller receives the endpoint indication message (606). The controller may determine that a pseudo wire is needed between the access node and the edge node to provide to the endpoint a network service of the one or more network services (YES branch of 608). In response, the controller may output one or more pseudo wire request messages to the access node and/or the edge node to install forwarding state for creating the necessary pseudo wire between the access node and the edge node (610). Details of an example pseudo wire request message are described above. The access node and edge node receive the pseudo wire request messages and install forwarding state based on them (612, 614). When a pseudo wire is in place, the controller can output a direct switch request message to configure the access node to map traffic received from the endpoint to the pseudo wire (615). Details of an example direct switch request message are described above. The access node receives the direct switch request message and installs forwarding state to map traffic from the endpoint to the pseudo wire according to the direct switch request message. The access node can then access network services for the endpoint via the pseudo write (620), and the edge node can provide the network services to the endpoint via the pseudo wire (622).

As described herein, the forwarding plane of network devices such as access nodes and aggregation nodes (e.g., data plane 301 of FIG. 5) is based on MPLS. MPLS is chosen for various reasons, including that MPLS is well supported in existing switching ASICs of certain network devices, MPLS is a high performance forwarding paradigm that requires minimal processing yet achieves a high degree of service enablement, and MPLS has good support for fast-reroute processing.

The systems described herein leverage the MPLS concept of pseudo wires (PW). PWs are used to virtualize physical ports. A PW is used to connect an Endpoint to a Network Service such that the Endpoint appears as if it is directly connected to the Edge Node. There are some variations to this that are described in the following sections. A PW is bidirectional and is therefore comprised of a pair of Transport LSPs. Multiple PWs can be carried by the same pair of Transport LSPs. At the Edge Node, a PW is mapped to a Bridge Domain analogously to how a physical interface may be mapped to a Bridge Domain. The Bridge Domain supports the Network Service defined on the Edge Node. The FIB in the Edge Node is populated by learning MAC addresses on the PW. The PW appears as a LAN segment to the Bridge.

When a packet is transmitted via a PW, the Edge Node constructs an encapsulation for the packet that includes the PW label, the LSP transport label and finally the Ethernet header with the MPLS Ethertype. The packet is then transmitted out the interface associated with the Transport LSP. Note that the Transport LSP will not be present if the Path for the Transport LSP includes no intermediate links between the ingress node and egress node. When packet is encapsulated, the CoS bits in the EXP header for both the transport and PW label are set.

All intermediate nodes between the ingress and egress node for the Transport LSP perform basic label swapping and forwarding based on the FIB programming received from the central controller in accordance with the MPLS-OCC protocol. The penultimate hop node just does a label POP, exposing the PW label and forwards the packet to the egress node. The egress node receives the packet with the PW label exposed. This label is used to identify the PW and to switch the packet in the correct Bridge Domain (for an Edge Node) or to transmit the packer directly out a physical port (Access Node).

The ingress node and all transit nodes in the path may have detours provisioned by the central controller to handle the case where a node or link goes down. The nodes in the path can detect a link or node failure locally and select the detour without any controller interaction. This forms the foundation for the data plane high availability (HA) employed by this architecture.

There are two different models that can be used to achieve network integration. In the first model, network integration is performed directly on the PE router. This is referred to herein as the "Direct Integration" model. In the second model, the network integration is performed through VLANs that connect the PE router to the MPLS-OCC Edge Node (EN). This is referred to herein as the "Edge Node Layer 2" (ENL2) model. Each model is addressed and compared in the following sections.

Figure 47:
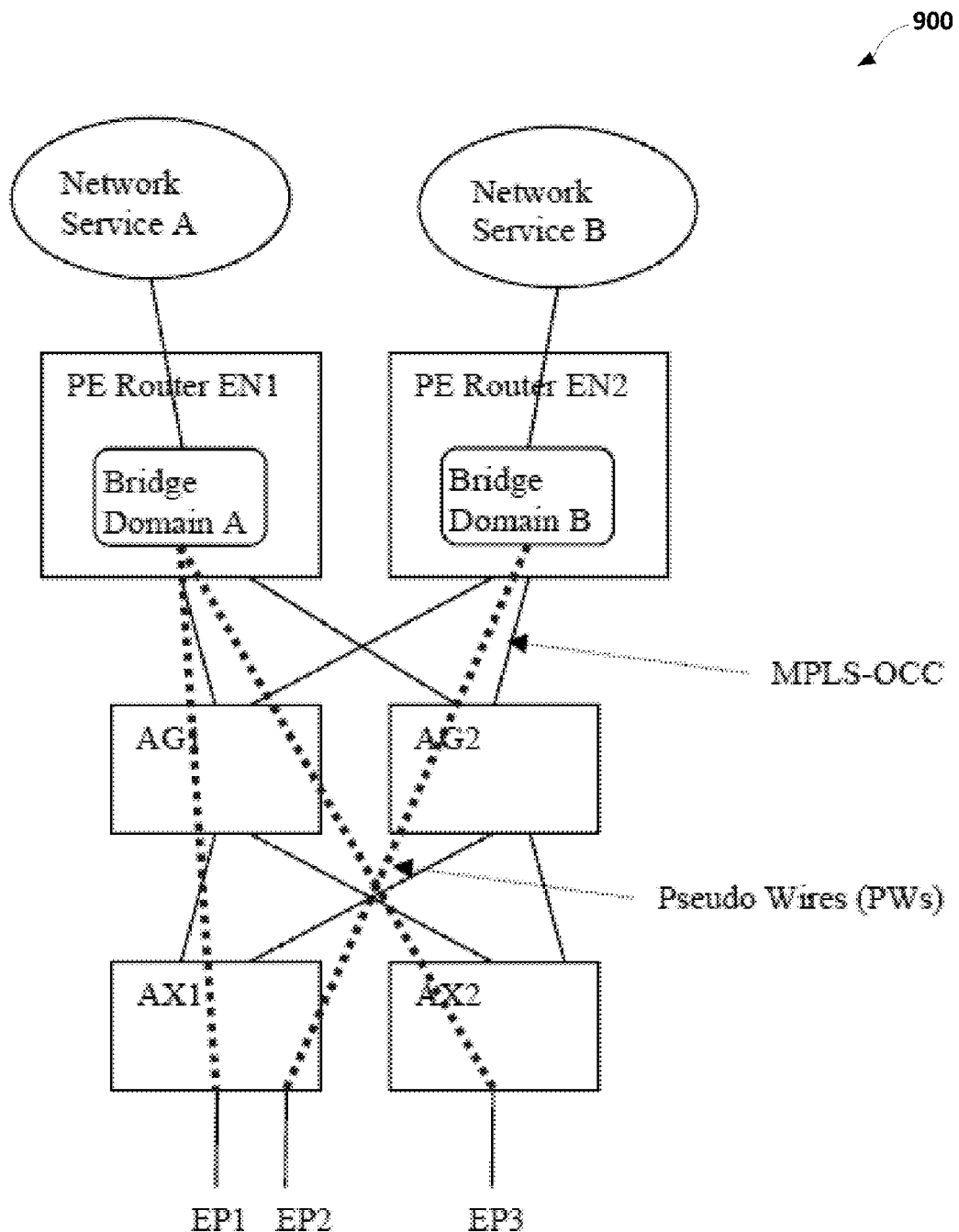
FIG. 47 is a block diagram illustrating an example network system 900 consistent with the Direct Integration Model, according to one or more aspects of the techniques of this disclosure.

FIG. 47 is a block diagram illustrating an example network system 900 consistent with the Direct Integration Model, according to one or more aspects of the techniques of this disclosure. In the Direct integration model, a set of VLANs or Bridge Domains are created that serve as the entry points into the Network Services. For example, if a basic Ethernet service is required, this service is configured on an Integrated Routing and Bridging (IRB) interface, over which a set of services could be configured. This interface may, in some examples, appear as any other interface to the PE router.

Services are configured as follows: VPLS/E-VPN—The logical interface is configured over a Bridge Domain that may include other physical ports and tags to map them to the domain. This logical interface is then configured so that its availability may be signaled to other PE routers in the provider network. When a PW is created and added to the Bridge Domain by MPLS-OCC, packets are switched to and from the PW according to MAC learning or MAC authorization. See PW switching model below.

L3VPN—Similar to VPLS, a Bridge Domain is created to which MPLS-OCC adds PWs. A routing protocol may be configured over the corresponding IRB interface to get routes from CE networks into the L3VPN instance. The interface is also configured as a member of the correct routing instance so its routes maybe carried across the provider core via BGP.

Basic Ethernet Service—In this case again a Bridge Domain is created with a corresponding IRB interface on which a subnet and mask may be configured. The interface may be included in some routing instance. PWs are then added to the Bridge Domain as sessions come up. PE routers may run VRRP between them.

In summary, all services models involve the creation of a Bridge Domain over which the service and associations protocols are configured as is done today. MPLS-OCC then requests the PWs that are added and removed from the various Bridge Domains as required by active sessions in the system. Note that in the direct integration model, Bridge Domains may have no physical or logical ports in their configuration.

FIG. 47 shows how the PWs carrying traffic from Endpoints (EP) 1, 2, and 3 are mapped to the Network Services via the Bridge Domains configured on the PE routers. The actual MPLS-OCC ports connecting the ENs to the AGs are not mapped directly to the Bridge Domains interfaces, but rather the PWs are mapped dynamically to these domains when the Endpoints come up and their authorization policy is established.

In the Direct integration model, the MPLS-OCC protocol is running directly on an edge node's routing engine. The MPLS-OCC protocol is also executing over some subset of the edge node's interfaces. These interfaces should only have the MPLS-OCC protocol and MPLS configured on them. They should not be made members of any Bridge Domain or be given any IP address configuration. They must be able to forward MPLS-OCC control packets to the Controller via an IP/UDP encapsulation into a particular routing instance. They must also be able to accept packets from an IP/UDP encapsulation and send them out one of the MPLS-OCC ports or up to the control plane. The MPLS-OCC forwarding daemon runs on the routing engine and can send and receive MPLS-OCC control packets to and from the forwarding element. Note that MPLS-OCC control packets sent through the edge node must not be sent to the routing engine for processing, as system performance will suffer. MPLS packets are also sent and received over the MPLS-OCC interfaces. The edge node can demultiplex MPLS packets to the correct PWs and then de-capsulate and L2 switch their payloads in the appropriate Bridge Domain.

When a subscriber comes up, the Controller (not shown in FIG. 47) must be able to identify the Bridge Domain to which the subscriber must be admitted. The policy associated with the subscriber therefore includes the Bridge Domain name to which the subscriber must be admitted. The MPLS-OCC client daemon running on the edge node therefore signals the Bridge Domain names to the Controller.

Figure 48:
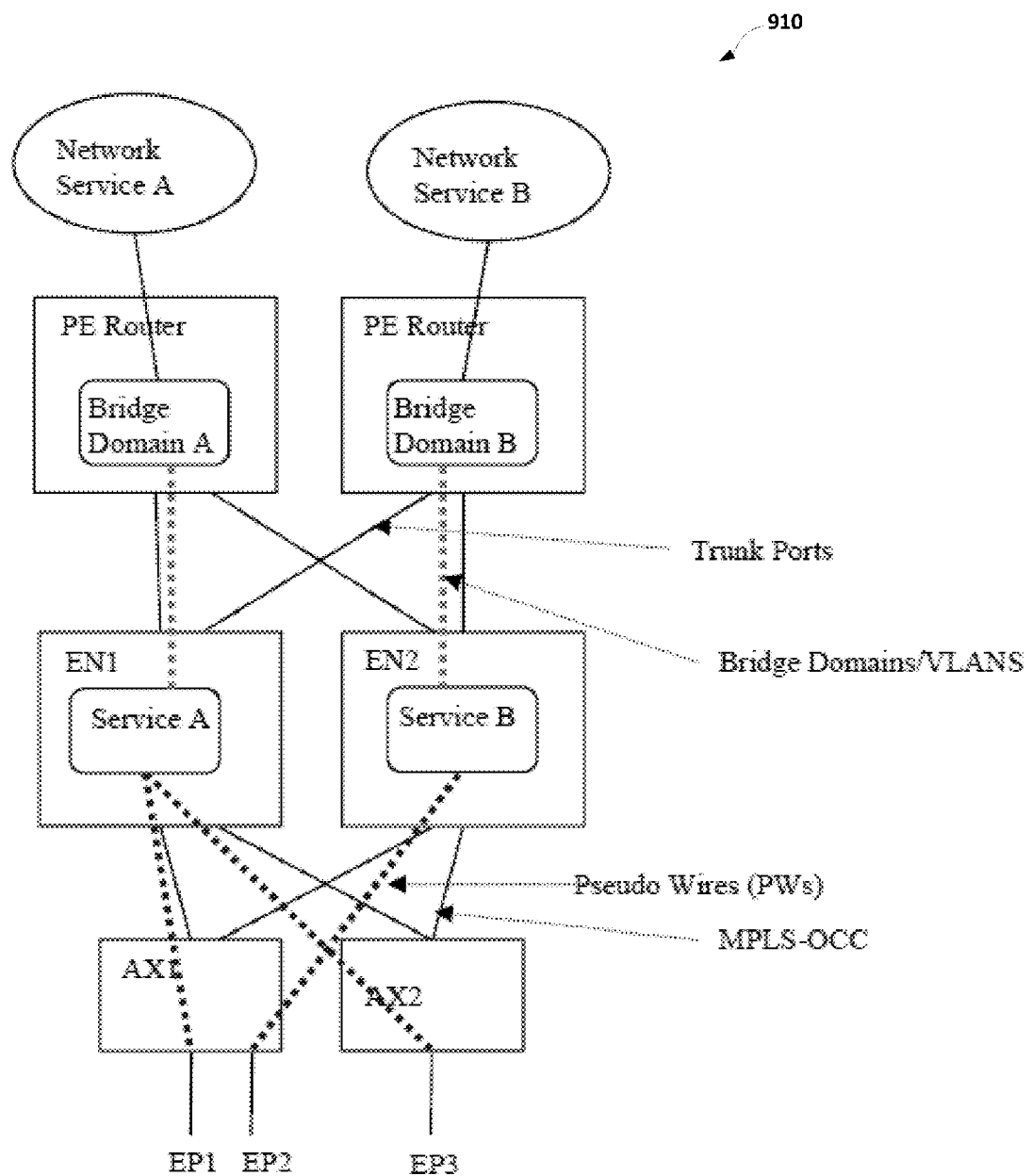
FIG. 48 is a block diagram illustrating an example network system 910 consistent with the Edge Node Layer 2 Model, according to one or more aspects of the techniques of this disclosure.

FIG. 48 is a block diagram illustrating an example network system 910 consistent with the Edge Node Layer 2 Model, according to one or more aspects of the techniques of this disclosure. In the Edge Node Layer 2 model, Edge Nodes are not Edge Routers or PE routers. Instead they are simple L2 switches that map PWs to Bridge Domains. On the PE router, a set of Bridge Domains is configured. Some or all of the physical ports comprising these Bridge Domains are connected to the ENs. If more than one physical port is connected to a given EN, it may be in a member of an aggregated Ethernet.

In the Edge Node Layer 2 Model there are a few issues that must be addressed. The EN must discover which ports are connected to other MPLS-OCC nodes and which ports are connected to the PE routers. MPLS-OCC Hello messages are used to discover ports connecting to other MPLS-OCC nodes. Link Layer Discovery Protocol (LLDP) is used to discover which ports are connected to the PE router thereby implying the LLDP must be configured on the PE router ports facing the ENs.

LLDP is also used to discover the VLAN names and IDs that are reachable via the ports connecting the EN to the PE. The VLAN name then serves as the service identifier that the EN uses to map PWs to VLANs based on session authorization records. LLDP is also used to determine the management VLAN from which the EN allocates an IP address via DHCP. Aggregated Ethernets are discovered via Link Aggregation Control Protocol (LACP) (802.1AX).

Once the VLAN connectivity has been established between the EN and the PE router, an IP address is allocated to the EN via DHCP. The DHCP server is assumed to run anywhere in the management network. The DHCP server indicates to the EN the DNS name or IP address of the Controller(s) via the traditional Option 43. Once this discovery phase has been completed, the EN is now able to operate as an MPLS-OCC Edge Node and the remainder of the MPLS-OCC network and protocol can operate.

STP may be executed on the ENs to ensure loop free operation between the ENs and the PEs. However, STP can be eliminated if certain topologies are excluded. Specifically, an EN may connect to one and only one PE. This, however, does not limit resiliency as the EN can be seen as an extension of the PE.

When sessions are authorized, the EN maps session to VLANs in a manner analogous to the way sessions are mapped to Bridge Domains in the Direct Integration Model. Therefore ENs are required to support per subscriber packet filtering, fine grained policing and per LSP policing.

Advantages of Edge Node Layer-2 Model include the fact that specific code may not be required, assuming the edge node adequately supports LLDP and LACP. In addition, this model can interwork with any PE router from any vendor supporting LLDP and LACP. Disadvantages of Edge Node Layer-2 Model may be that it requires that the EN, which looks more like an Aggregation switch, support LER functions, fine grained filtering and policing as well as LSP policing in the forwarding plane. Hence, commodity hardware may not be up to the task. This model also requires the implementation of LLDP, LACP and potentially STP on the EN. If STP is used some ports may be put into the STP blocking state. Link failure detection time is depends on non-MPLS-OCC mechanisms existing between PE and EN, which might include STP that has slow recovery properties. The Edge Node Layer-2 Model eliminates MPLS-OCCs ability to control the downstream interface schedulers on the PE router. Note that an Edge Node in the Edge Node Layer 2 model can appear as a line card in a PE router. The Edge Node could present a single physical interface to the PE router.

For the following description, it is assumed that the direct integration model is followed. That said, the differences between the two models are not apparent in most of what follows. The Controller must be told by the Edge Node the set of Network Services the Edge Node supports. This is done by the Edge Node sending a Service Indication message to the controller. The Service Indication message includes the names of all the Bridge Domains configured on the Edge Node to which PWs may be included. Therefore the service is defined as an L2 Bridge Domain which is mapped, possibly at L3, to some other Network Service. Multiple Edge Nodes may support the same service; in fact every service should be supported by at least two Edge Nodes to support resiliency in case one Edge Node goes down.

Downstream traffic may arrive at either Edge Node if each Edge Node is advertising same cost routes for the subnet associated with the Edge Node (EN). However, since we would like to apply per subscriber policing at the EN for downstream traffic, all the traffic for a specific subscriber must traverse one of the ENs. Therefore one of two techniques must be available to steer traffic to the correct EN when traffic is forwarded to the EN at L3.

The first technique is to use VLAN anchoring where the EN anchoring the VLAN advertises the route to the VLAN subnet with a higher priority. This technique may have more efficient forwarding properties and may distribute load well if there are many services that can be distributed across the ENs. Drawback may include implementation complexity and failover speed. However, fast L3 failover mechanisms can be employed where appropriate.

The second technique is to have the ENs directly connected at L2 and by MAC learning, force all packets to the EN hosting the PW to the AX requiring the service. This is the simplest implementation but would result in half the downstream traffic traversing the links between the ENs. It also has the nice property that sessions could be individually distributed across the ENs. For VPLS or E-VPN, multiple ENs being members of the same VLAN can load share on a per MAC basis. MAC learning attracts packets to the right EN, so there is no issue with policing since MAC addresses are essentially fully qualified routes in this context.

Figure 49:
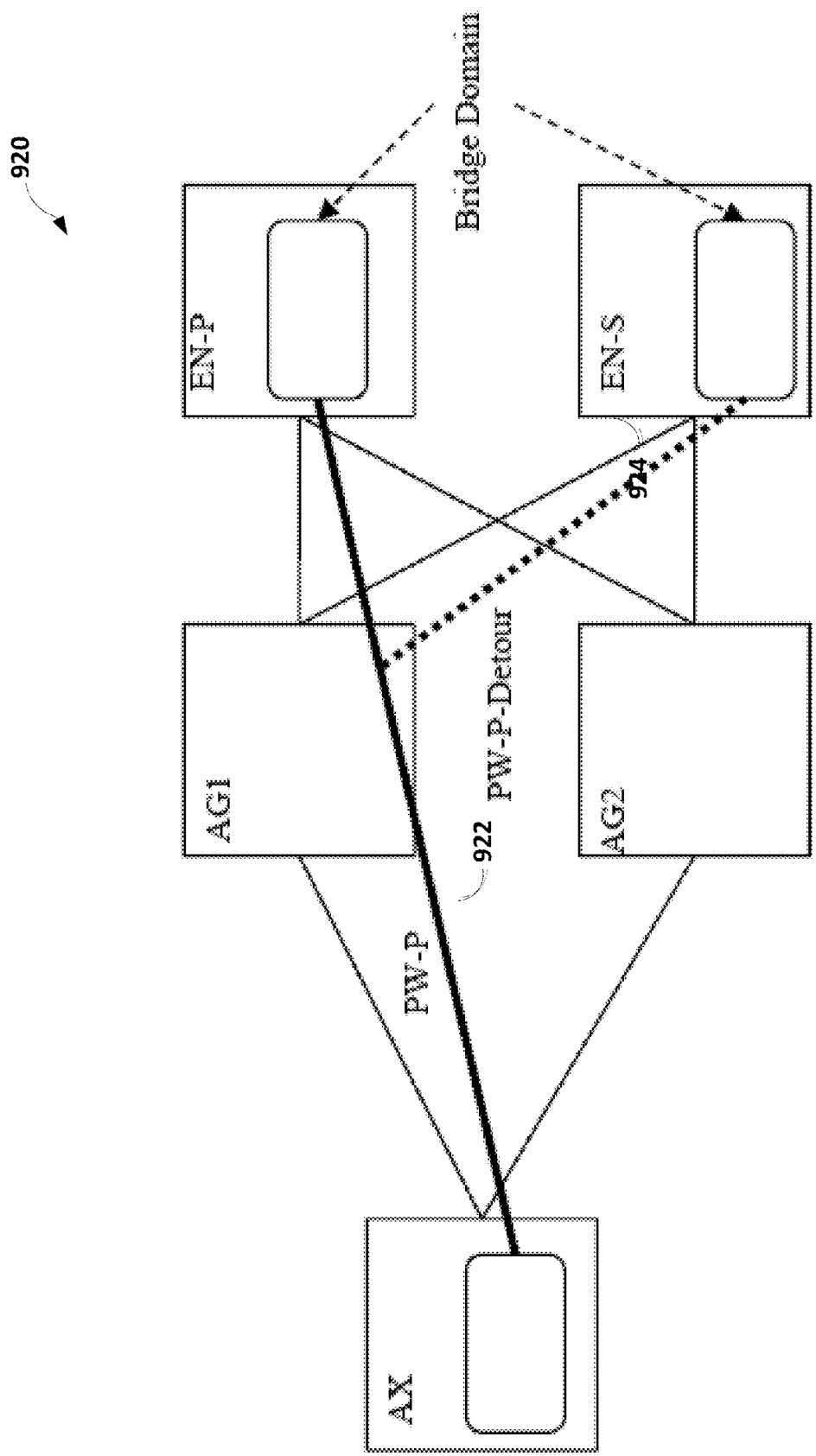
FIG. 49 is a block diagram illustrating an example network 920 that includes a primary edge node (EN-P) and a secondary edge node (EN-S).

FIG. 49 is a block diagram illustrating an example network system 920 that includes a primary edge node (EN-P) and a secondary edge node (EN-S). EN Resiliency and Opportunities for Node Protection and Resilient pseudo wires: The next issue concerns resiliency of the ENs. When an EN goes down, the other EN must be able to take over for it using the fast detour techniques used elsewhere in the MPLS system. However, the techniques used elsewhere may not provide for node protection at the ingress or egress of the LSP, only link protection is used at LSP egress. However, since ENs providing specific Network Services are typically deployed in pairs, it is possible to define an LSP with a primary and secondary egress and ingress nodes.

When the penultimate hop (PH) node detects that the next hop link for some LSP goes down, the PH can detour the traffic to the secondary EN. This technique will work regardless of whether the Primary EN (EN-P) went down or if just the link between the PH node and EN-P went down as it is assumed that the Secondary EN (EN-S) can route or forward the packet appropriately. If possible, the Primary and Secondary EN nodes would use the same service label for the same service. In such a case, the required forwarding operations at the PH node are the same as those supported with the existing detour schemes. However, if the labels cannot be guaranteed to be the same, then the PH node must pop the LSP label, swap the service label and then optionally push a detour LSP label. Support for this sequence of operations must be investigated. The speed of convergence for downstream traffic is dependent on the convergence characteristics of the northbound protocols.

FIG. 49 illustrates a Primary PW (PW-P) 922 between AX and EN-P. EN-P and EN-S are members of the same Bridge Domain. When the link from AG1 to EN-P goes down, AG1 fast-detours to EN-S where, if the DMAC is known it is sent to its destination, otherwise it is flooded. EN-S is also now informed that PW-P-Detour (detour pseudo wire) 924 is active and begins to forward packets toward AX via PW-P-Detour 924. However, AX is not informed that PW-P 922 is in detour state and will continue to use PW-P 922 until the controller tears it down.

At the PW ingress, the path carrying traffic from EN-P to AX can be specified with a secondary ingress node. This secondary ingress node can effectively be thought of as an ingress detour. If EN-P goes down, EN-S can send traffic to AG1 (or some other convenient rendezvous point) using the label of the LSP carrying PW-P. Since the PCE of the central controller knows that this path is a detour, the path can be constructed using detour policy, which may be less stringent than primary policy. Secondly, since the path follows the original path from the rendezvous to the ingress, the path is following the original traffic engineered path. Without the secondary Ingress Node concept, a secondary LSP would be constructed independent of the primary, which could result in unnecessary allocation of resources to carry the secondary.

The following section details how the resilient egress PW is used to support the L2 services provided by the architecture. This section provides a detailed analysis of the supported Network Services, Endpoint connectivity topology, session models and local switching requirements under the assumption of service resiliency. From this analysis a few basic patterns emerge that can be used to realize the full set of requirements. There are several variables that affect how to construct the forwarding model. The variables are as follows in TABLE 2:

TABLE 2

| | |
|---|---|
| Network Service | VPLS/E-VPN |
| | L2 Subnet |
| | L3VPN |
| Endpoint Connectivity | Single Connect: The Endpoint maintains a single connection to the network. |
| | Dual Connect: The Endpoint is dually connected to the network. |
| Session Model | Port Based: A session is identified by the its physical port connectivity |
| | MAC Based: A session is identified by its MAC address. |
| Local Switching | Enabled/Disabled |

This results in potentially twenty-four different combinations of connectivity. However, several are overlapping. We explore each scenario to identify the overlapping situation. Note that in all cases we assume that EN redundancy exists. Lack of EN redundancy is a degenerate case of EN redundancy. Also note that this architecture maintains a loop-free property within the MPLS-OCC nodes. However, Endpoints and Network Services may be connected in such a way that loops are created via the MPLS-OCC/PW cloud. It is assumed that under these situations, a loop avoidance protocol such as STP is run transparently over the MPLS-OCC/PW cloud.

Figure 50:
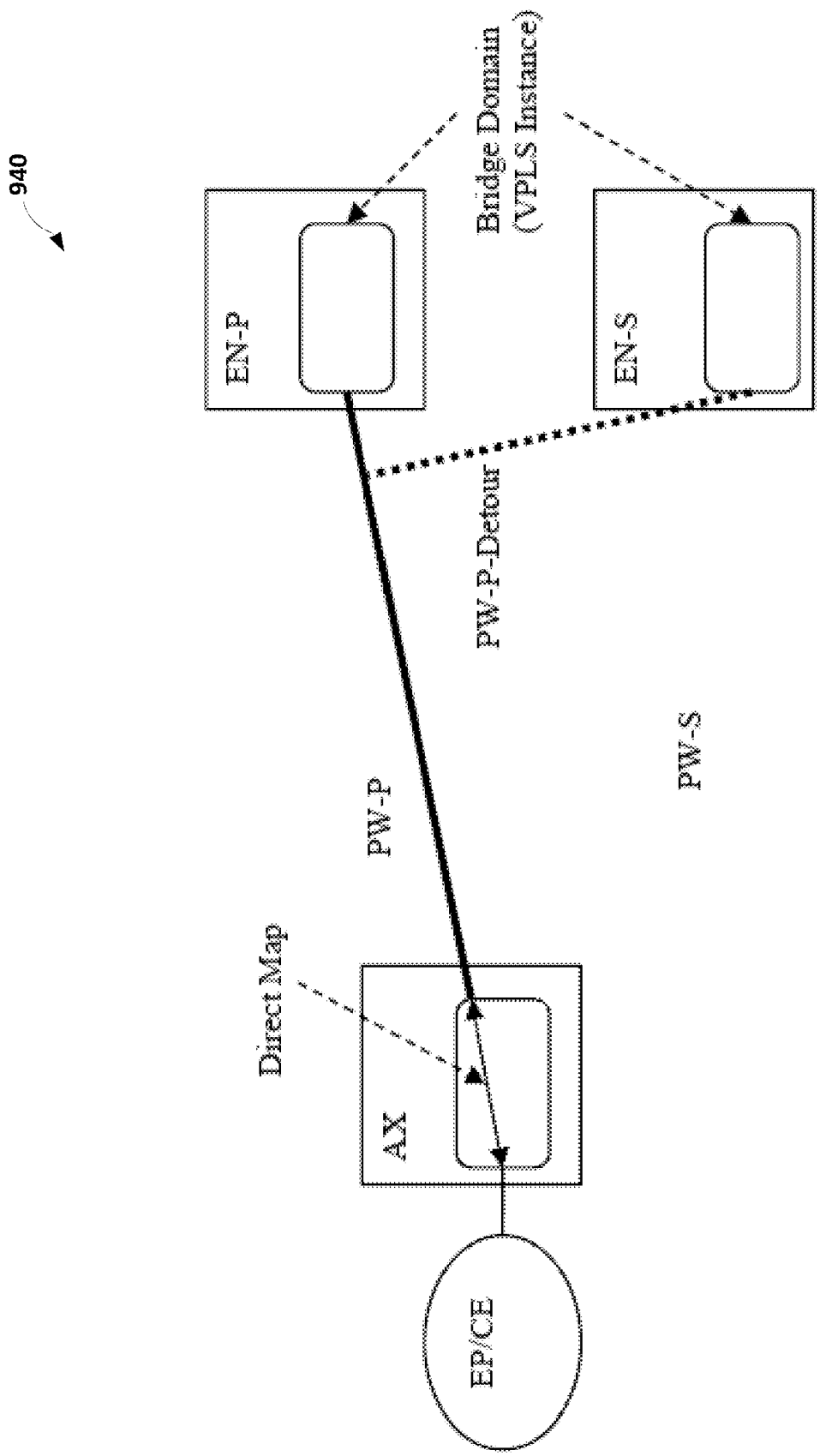
FIG. 50 is a block diagram illustrating an example network system that shows a forwarding model for a Virtual Private LAN Switching (VPLS), single connect, port-based session.

FIG. 50 is a block diagram illustrating an example network system 940 that shows a forwarding model for Virtual Private LAN Switching (VPLS), single connect, port-based session. As shown in FIG. 50, in this forwarding model access node switching is done such that all packets from the access port are mapped directly to PW-P, and vice versa. EN-P Switching is done by the controller adding a PW to the Bridge Domain associated with the VPLS instance where normal L2 forwarding applies, including broadcasting and flooding over the PW. If EN-P or the link between the PH LSR and EN-P goes down, packets are immediately switched to EN-S where normal L2 forwarding applies.

For EN-S Switching, PW-P-Detour remains inactive until EN-S discovers that EN-P is down. PW-P-Detour must remain inactive; otherwise flooded packets from the VPLS will get duplicated at the AX. PW-S becomes active when a packet is received over PW-S. The following procedure is followed: (1) EN-S receives a packet over PW-P-Detour for which it knows it is the Secondary. The SMAC, call it MAC1, is learned over PW-P-Detour and the packet is forwarded, and potentially flooded in the VPLS. The packet t is not flooded over PW-P-Detour. EN-S now attracts packets for MAC1. (2) When a packet for MAC1 arrives at EN-S, the packet is forwarded via PW-P-Detour. (3) The packet then arrives at AX. The PW label is the same as if it came from PW-P so AX cannot know that PW-P is actually down. This is of no consequence as the detour remains active until the path carrying the PW is repaired. (4) If there are packets destined to MAC1 sent to EN-P, they will be lost in the network unless the PH router employs the same type of resilient PWs that the MPLS-OCC cloud employs. Note that EN-P may still be up. Only the interface between the next-hop node and EN-P went down. In this case any packets arriving at EN-P can take a detour around the primary next-hop node.

Figure 51:
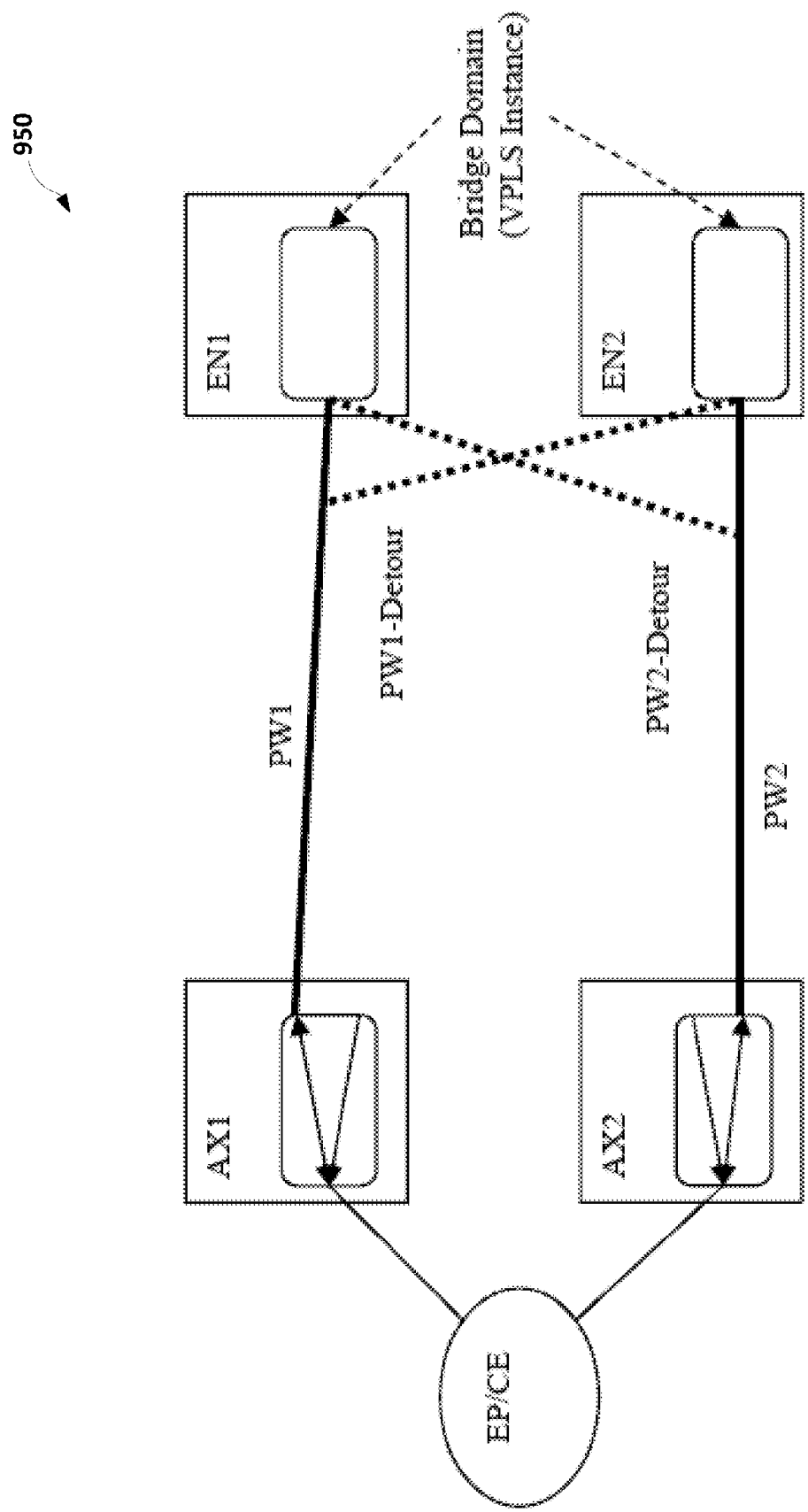
FIG. 51 is a block diagram illustrating an example network system that shows a forwarding model for a VPLS, dual connect, port-based session.

FIG. 51 is a block diagram illustrating an example network system 950 that shows a forwarding model for VPLS, dual connect, port-based session. EP may be dually connected to the same AX or two different AXs without loss of generality. PW1 and PW2 may be connected to the same or different ENs without loss of generality. There is a loop in the network but it is outside the MPLS-OCC domain and therefore must be resolved via outside mechanisms such as STP. Otherwise, since PW1 and PW2 are completely independent entities from the perspective of state, their operation is identical to the Single Connect scenario, as described with respect to FIG. 50.

Figure 52:
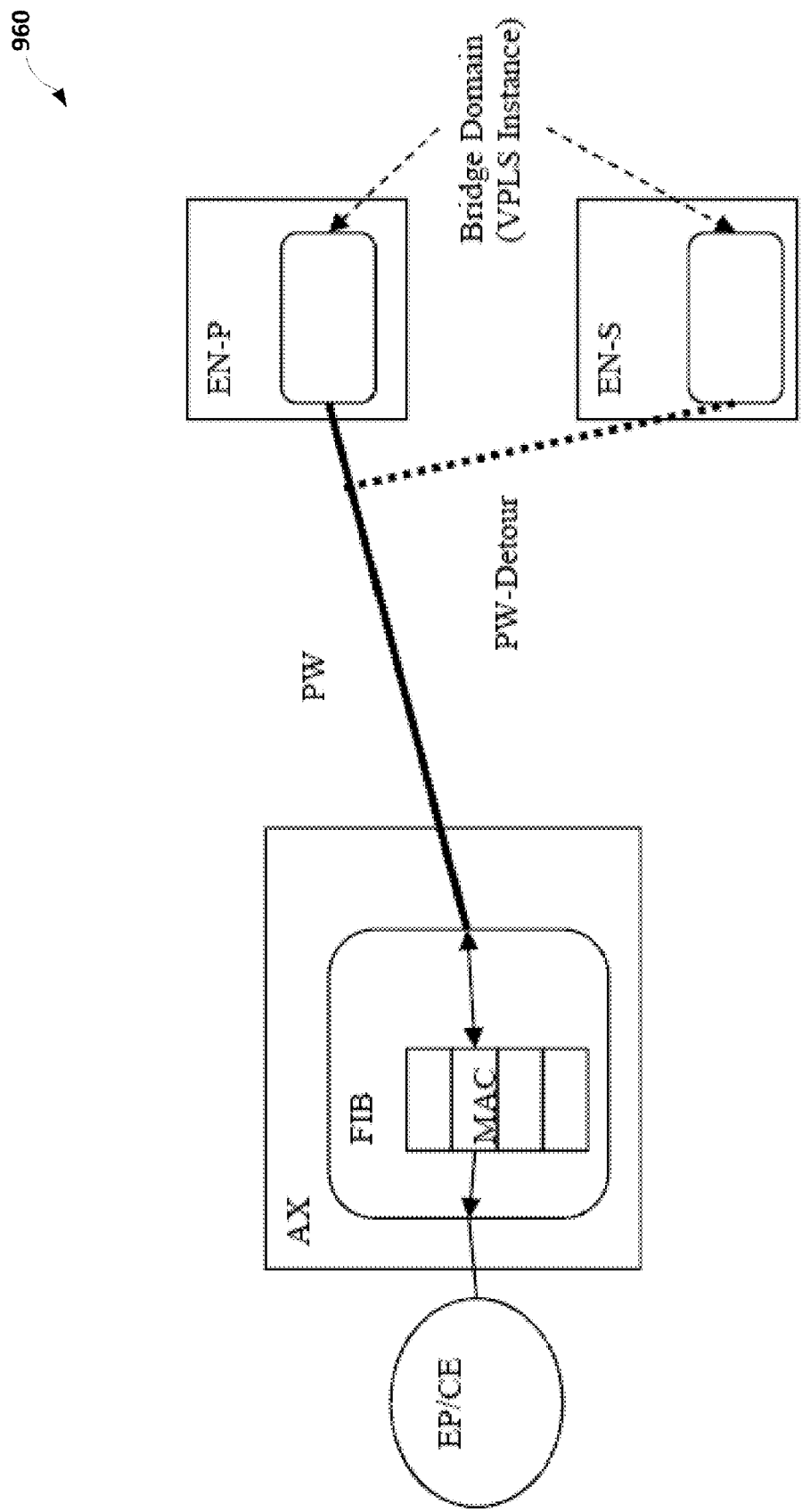
FIG. 52 is a block diagram illustrating an example network that shows a forwarding model for VPLS, single/dual connect, MAC-based session.

FIG. 52 is a block diagram illustrating an example network system 960 that shows a forwarding model for VPLS, single/dual connect, MAC-based session. The basic architecture for VPLS, Single/Dual Connect, Port Based still applies with the following exceptions: (1) MAC addresses are not learned on the ENs, but are placed on the PWs by the Controller. Such placement is made on both EN-P and EN-S. (2) The AXs maintain a forwarding table that maps SMACs to uplink PWs and DMACs to downlink subscriber ports. (3) There is a resiliency optimization that can be made due to explicit MAC authorization state. Specifically, when EN2 detects that is has become primary for the PW, it can generate a packet of learning for all MACs. This implies that when MACs are authorized, they are added to both the primary and secondary PWs.

Figure 53:
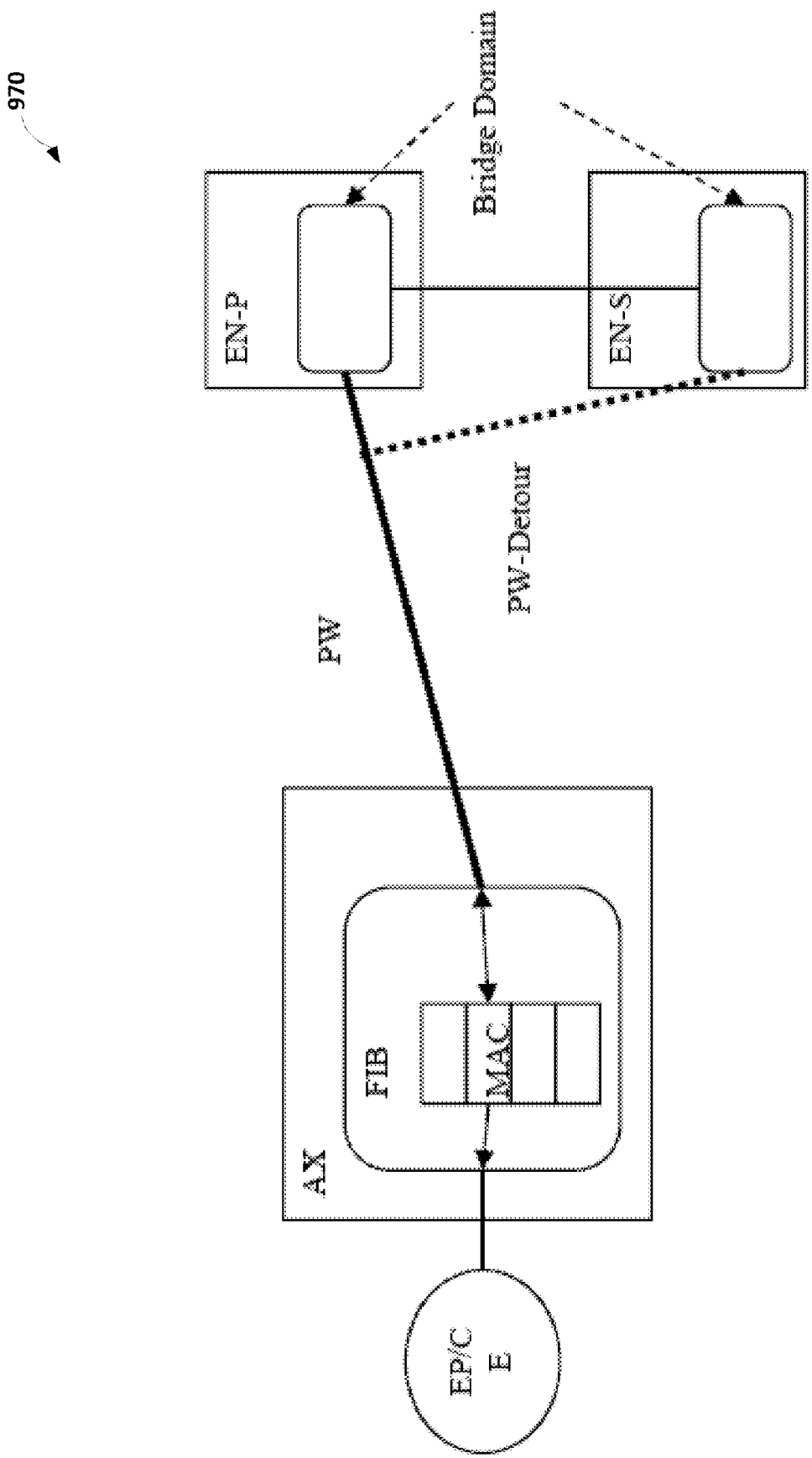
FIG. 53 is a block diagram illustrating an example network system that shows a layer two (L2) subnet arrangement.

FIG. 53 is a block diagram illustrating an example network system 970 that shows a layer two (L2) subnet arrangement. The L2 Subnet scenarios are the same as the VPLS scenarios. The primary difference is that the ENs are the default gateways in the subnet. It is assumed that they are running virtual router redundancy protocol (VRRP) between themselves. The PW-Detour remains inactive until either a packet is received at EN-S via PW-Detour or VRRP timeouts indicate the PW-S should become active.

Packets for EPs may arrive at either EN-P or EN-S. Since PW is attracting packets to EN-P, it is assumed that if a packet for some MAC at EP arrives at EN-S it is transmitted to EN-P via the non-MPLS-OCC link that completes the subnet between EN-P and EN-S. Of course, if layer three (L3) routing is attracting packets to EN-P for the subnet, then the cross traffic between EN-S and EN-P is eliminated.

Figure 54:
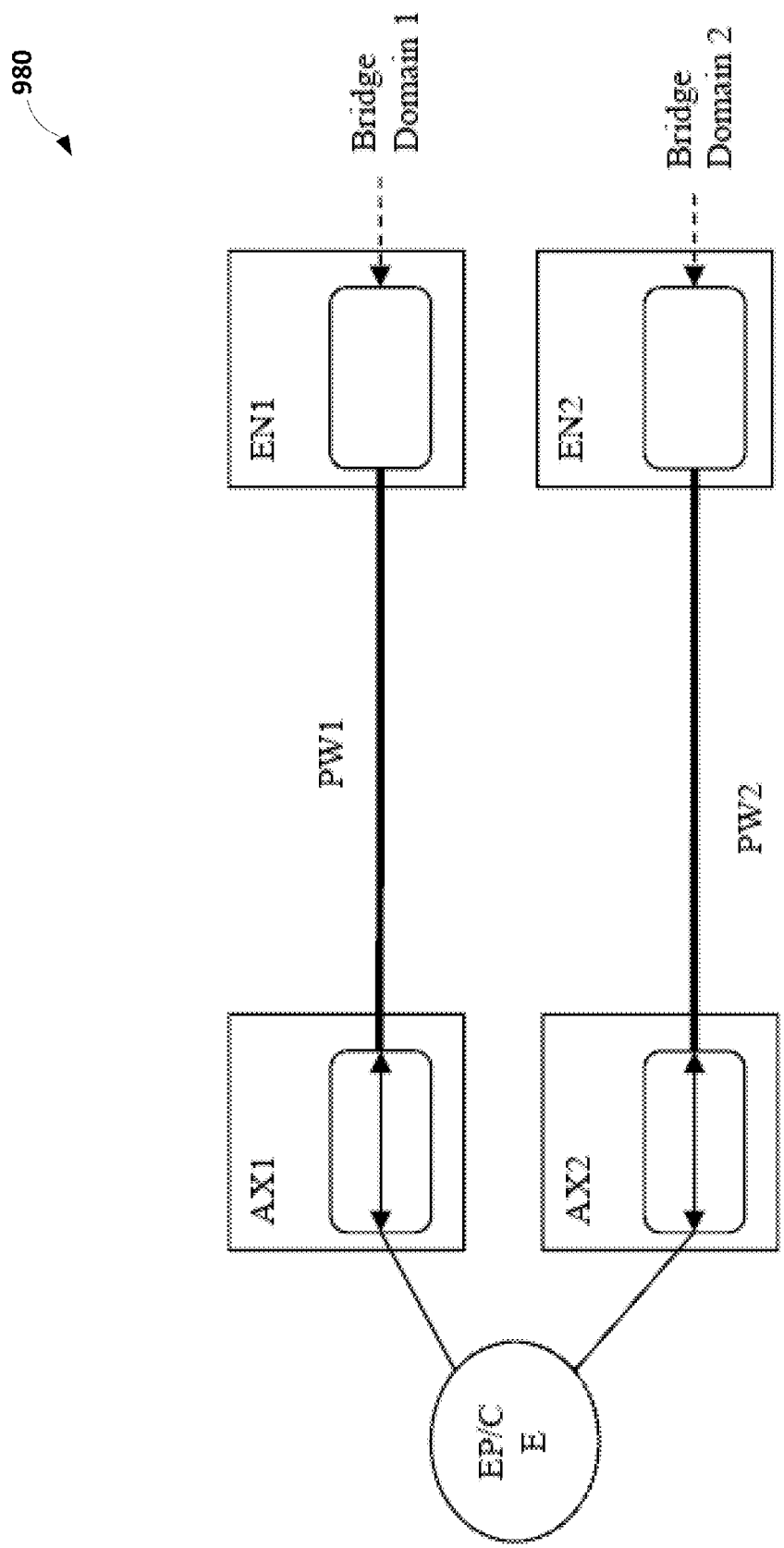
FIG. 54 is a block diagram illustrating an example network system that shows an L3 virtual private network (VPN) arrangement.

FIG. 54 is a block diagram illustrating an example network system 980 that shows an L3 virtual private network (VPN) arrangement. Since L3 VPN is an L3 service, it is assumed that EN-P and EN-S do not share the same Bridge Domain for the same service. As the above drawing shows, different customer edge (CE) ports are mapped to different Bridge Domains on different ENs to support resiliency. The PWs are carried over LSPs that may have nodes with detours but there is no egress node protection as is possible with the previous L2 scenarios described. Failover is then a function of the L3 routing protocols. Finally, note that L3 VPN could be configured to have EN1 and EN2 on the same Bridge Domain and even support a dual connection from the CE. However, the CE would have to be configured to know that both ports are on the same Bridge Domain and that there are multiple routers on the subnet. In addition, there would not be any benefit from a common subnet between the EP and the ENs since each is considered a unique routing adjacency so the L3 state would still have to be updated before the network healed as EN1 and EN2 would use different MAC addresses. Note that a resiliency model similar to the VPLS model could be supported if L3 rather than L2 packets were encapsulated in the PW.

Figure 55:
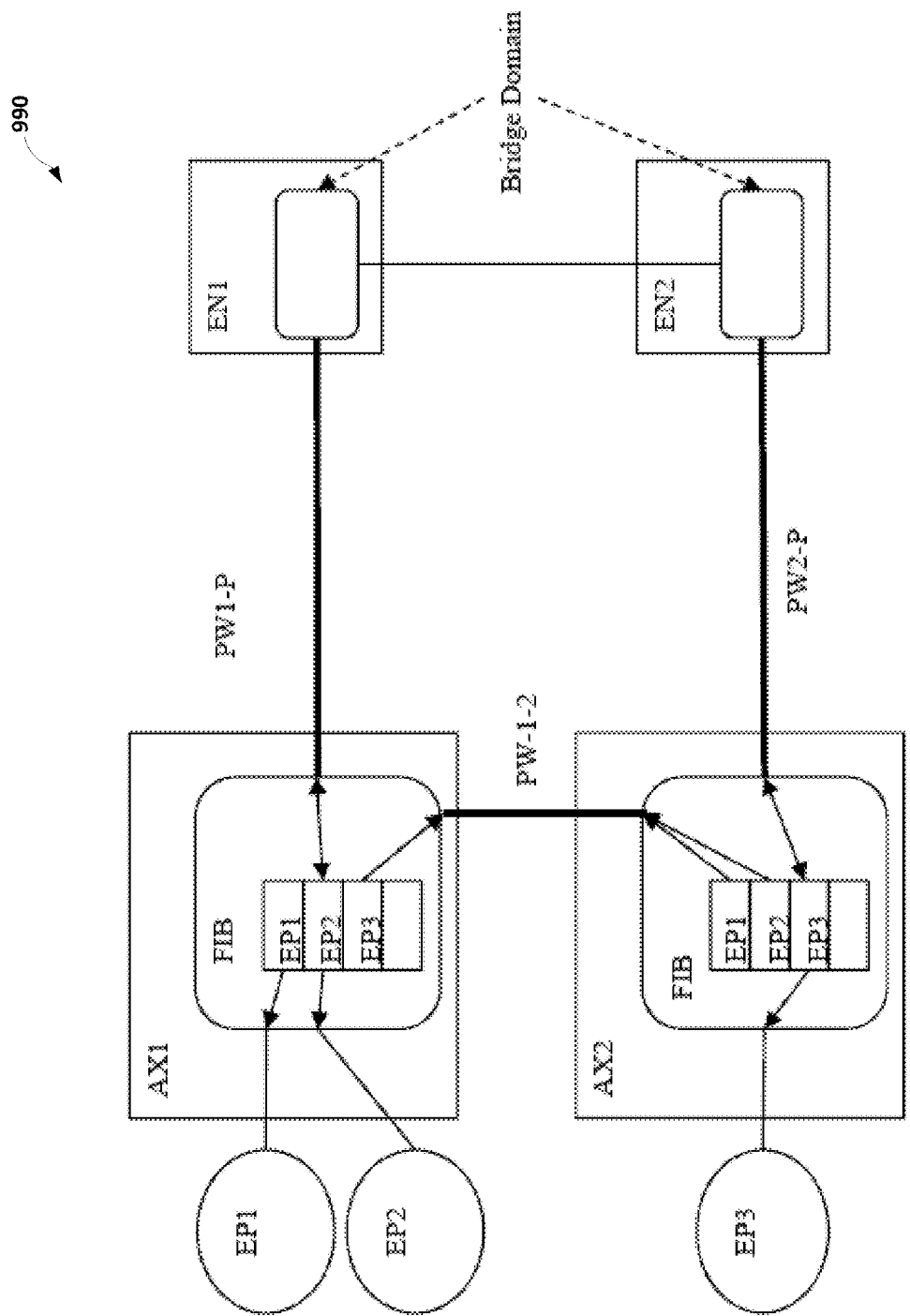
FIG. 55 is a block diagram illustrating an example network system that shows a forwarding model for local switching.

FIG. 55 is a block diagram illustrating an example network system 990 that shows a forwarding model for local switching. Local Switching, also known as X2 interface support, is supported under the following restrictions: Session Model must be MAC Based so that MAC location can be tracked and FIBs set directly. If we did not keep track of the location of all the MACs then the system would have to flood unknowns and flooding is not acceptable given that loops are created.

When it is determined that two Endpoints may local switch between themselves, the controller sets up a PW between the AXs hosting the Endpoints by sending messages to the AXs, and the controller installs the MAC addresses reachable via PW in the corresponding FIB tables. When local switching is enabled, packets from EPs are switched to the default PW unless there exists a MAC address in the FIB matching the DMAC of the request. If the DMAC matches a FIB entry, the packet is switched via the PW pointed to by the MAC address. Unknowns, broadcast and multicast are always sent to the EN via PW1-P. When a packet is received from the local switching PW (LSPW), it is only switched to an EP if there exists an entry for it in its FIB and this entry must be a locally attached Endpoint. Unknowns from LSPWs are never passed to the EN. The set of endpoints between which local switching is enabled may be determined by: (1) Static policy associated with the endpoints. For example they may be made members of a local switching group. (2) Analytics of traffic switching between two MPLS-OCC PWs in the same bridge group. (3) Analysis of Address Resolution Protocol (ARP) and Internet Protocol version six (IPv6) Neighbor Discovery between EPs. Analysis of ARP in combination with policy may prove to be the most effective mechanism.

Figure 56:
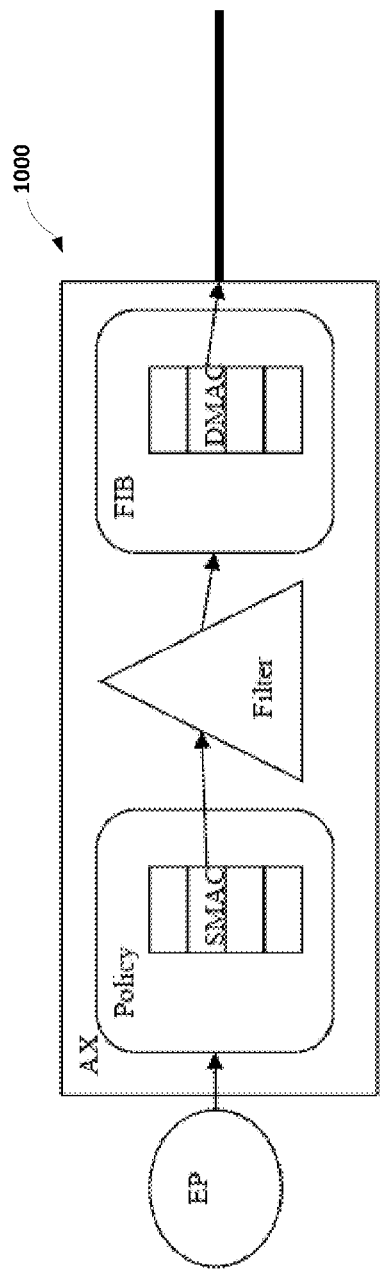
FIG. 56 is a block diagram illustrating an example network system that shows per subscriber (endpoint) packet policy and next-hop chaining at the Access node for Uplink.

FIG. 56 is a block diagram illustrating an example network system 1000 that shows per subscriber (endpoint) packet policy and next-hop chaining at the Access node for Uplink. Per subscriber packet policy is basically a firewall filter that is inserted in the packet processing path for some subscriber. A filter rule contains packet matching tuples with actions for policing, dropping, marking or forwarding. Policers may also mark, drop or forward. A subscriber can be identified by either a MAC address or a physical port location. For an Access Node, the general next-hop chain for subscriber packet policy is shown in FIG. 56. FIG. 56 shows the forwarding blocks used when the subscriber is identified per MAC and there is FIB switching at the AX. In the specific case of port based policy, the Policy block would not exist and the next hop chain associated with the ingress port would point directly to the (optional) Filter block. In the case of direct mapping (no FIB switching) the next-hop chain excludes the FIB element next-hop. The general next hop chain is encoded as follows:

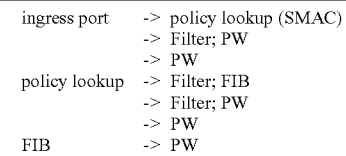

The policy associated with the Endpoint therefore defines the next-hop chain associated with the Endpoint. The next-hop chain could be as simple as a single PW for port based sessions with no packet policy or as complex as MAC based sessions with filtering and local switching via a FIB. Any next-hop in the chain may modify the next-hop chain by pushing new elements on the chain or by replacing the entire chain as would be done by a Policy block or a FIB.

On downlink, the process is similar but there is no filter block as it is assumed that filtering has already been done on the EN.

Figure 57:
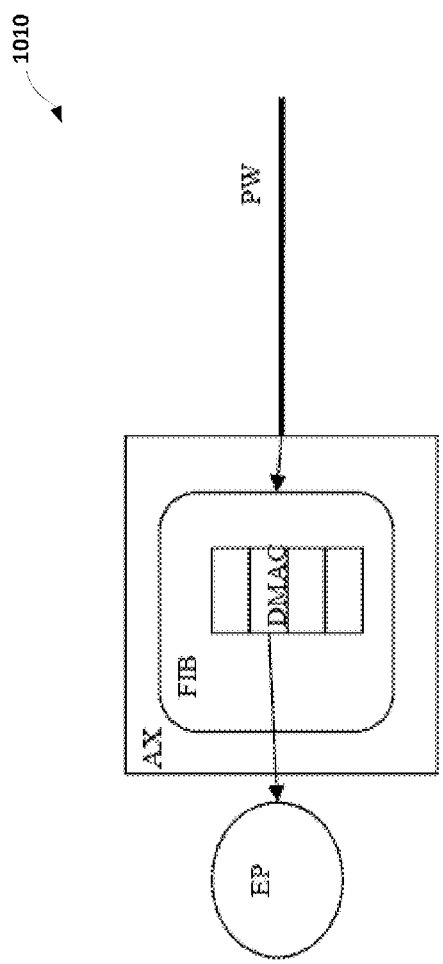
FIG. 57 is a block diagram illustrating an example network system that shows next-hop chaining at an access node for downlink.

FIG. 57 is a block diagram illustrating an example network system 1010 that shows next-hop chaining at an access node for downlink. As shown in FIG. 57, on the downlink a packet arrives at the AX via PW, and the PW is mapped either directly to an egress port (in the case of port based session management) or a FIB (assumed to be part of a named Bridge Domain) in the case of MAC based policy.

```
PW     ->  egress port
       ->  FIB
FIB    ->  egress port
```

Figure 58:
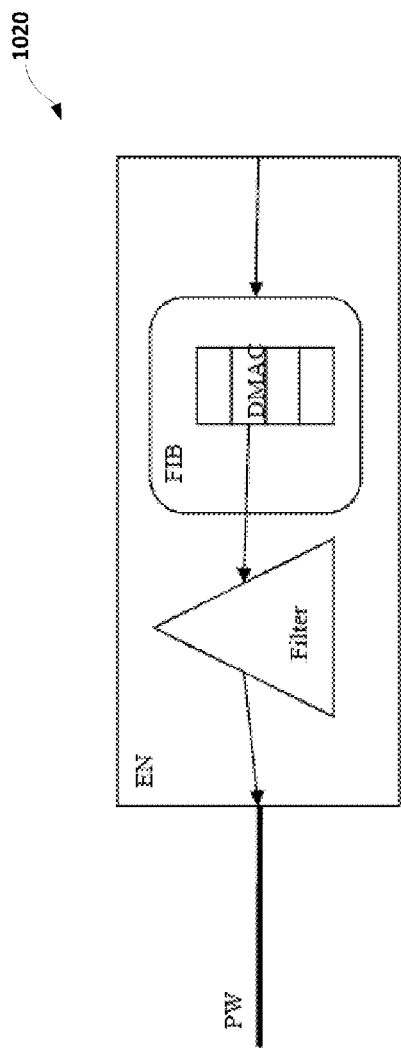
FIG. 58 is a block diagram illustrating an example network system that shows next Policy and Next-Hop Chaining at the Edge Node for Downlink.

FIG. 58 is a block diagram illustrating an example network system 1020 that shows next Policy and Next-Hop Chaining at the Edge Node for Downlink. On the edge node for downlink a packet arrives at some Bridge Domain and is switched to the egress PW. If policy exists the packet is first passed through the policy filter. In the case of port based session, the filter is associated with the DMAC when it is learned from the PW. In the case of MAC based sessions, the MAC is installed in the FIB and a per-MAC policy entry is associated.

```
FIB -> Filter; PW
```

Figure 59:
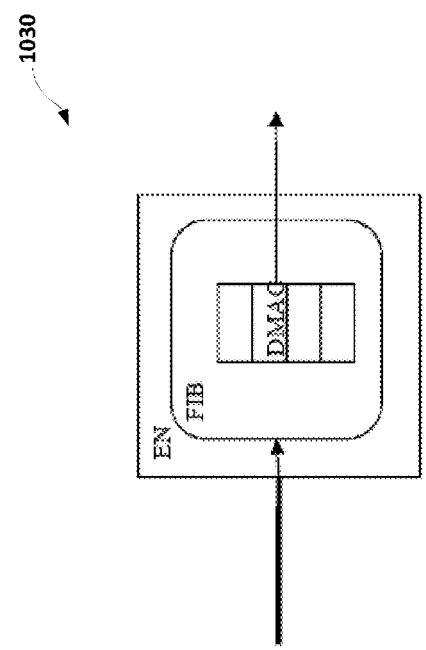
FIG. 59 is a block diagram illustrating an example system that shows Next-Hop Chaining at the Edge Node for Uplink.

FIG. 59 is a block diagram illustrating an example system 1040 that shows Next-Hop Chaining at the Edge Node for Uplink. For uplink, a packet is switched from the PW directly in the FIB associated with the PW.

```
PW -> FIB
```

The architecture described herein can also provide for application control of packet policy. Network operators may use dynamic packet policy insertion. Routers typically only support static policy and require a configuration change to modify the policy rules effective on the system. With dynamic policy, an application could know via external means that a specific subscriber flow requires special treatment, for example, policing, dropping or re-marking. In some examples, the controller provides an API at the controller that allows an application to modify the policy of a particular user in real-time.

For example, a voice stream might be identified by a voice signaling gateway. This gateway could request that the controller classifies the stream as Expedited Forwarding (EF) traffic and runs a policer on the traffic to ensure that the EF class is not abused. However, realizing such a capability in real time may not be feasible for two reasons, one is the potential amount of per-flow signaling required in the network, the second is the ability for existing systems to effect the policy in real time, such a capability may require rework in existing packet policy mechanisms.

The architecture described herein may be targeted at some specific example deployment scenarios. For example, in some aspects the techniques of this disclosure may be used in mobile backhaul networks for small-cell deployment. Examples of a central controller operating with a mesh network of simple nodes are described in U.S. Ser. No. 14/500, 793, entitled "MESH NETWORK OF SIMPLE NODES WITH CENTRALIZED CONTROL," filed Sep. 29, 2014, the entire contents of which are incorporated by reference herein.

The limitations associated with licensed radio spectrum and the increasing demands in data traffic from mobile users are forcing service providers to think about solutions that require the cell-size to shrink to increase spatial reuse of spectrum, as well as solutions that require the use of unlicensed spectrum to supplement the capacity provided by licensed bands. Increasing use of small cells implies new demands on the backhaul technologies—both wired and wireless. In some examples, the small cells (say, on pole-tops) could be connected to the pre-aggregation boxes either by fiber (using some variant of Passive Optical Network (PON) technology) or by wireless technology. Wireless backhaul technology could operate in the micro-wave range, 60 GHz or sub 6 GHz ranges. Some of these technologies are inherently line-of-sight (LOS) implying that the towers (or antennas) need to be in clear view of each other, while others are either near-line-of-sight or non-line-of-sight depending on how much the waves can travel around obstacles in the line of view. Similarly, a wireless backhaul device could be PTP (point-to-point) or PMP (point-to-multi-point).

Support is also needed for Heterogeneous Networks (HetNets) which use a combination of small cells and macro-cells to cover a given area. The radio resources are shared between the small cell radios and the macro-cellular radios and often traffic is backhauled from the small cells to the macro-cell which acts as an aggregator.

Service Providers are also deploying small-cells with Wi-Fi access. Wi-Fi Access Points (APs), with radios for both Wi-Fi-based access and Wi-Fi-based backhaul, could be deployed to operate as a mesh, or could be used to extend the coverage of a wired network to places without Ethernet cabling. In the case of Wi-Fi mesh, the Root Access Point needs to have connectivity to the pre-aggregation box, and simple mesh routing protocols are used to send packets to the APs in the mesh.

There are several key requirements for this use case that the architecture described herein can provide, including the ability to operate at a large scale. The number of small cells in a typical service provider deployment is likely to be in the thousands. The techniques described herein can be used to easily configure and provision these many devices and also ensure that the experience of the connected users is of high quality. The previous point about large scale also necessitates plug-and-play support to avoid having the service provider to send expert technicians to help set up the equipment at every location. Untrained technicians should be able to mount the devices to the pole-tops and connect them to power, and then the device should be able to connect to the network, find the Controller and configure itself. The architecture also may need to have a small software footprint. The pole-top mounted backhaul devices in small cells often have very limited hardware capabilities in terms of CPU power and memory. The software that runs on these devices for controlling the device needs to be lightweight. In addition, the access devices may be exposed to the elements, and so should be able to support extremes in temperature, rain etc.

The techniques of this disclosure may be backhaul-technology-agnostic, and work well for both wired and wireless backhaul of the small cell traffic. In certain deployments, like urban areas, fiber access may be available to the small cell devices, while in other deployments, because of the environment, wireless backhaul, LOS or NLOS, may be preferred.

Support for X2 interface is also needed. Long-term evolution (LTE) introduces the notion of an X2 interface between adjacent cells, primarily for the purpose of transferring low latency control traffic between cells. The techniques of this disclosure can provide support for such east-west connections or paths between cells (e.g., between access nodes).

The techniques of this disclosure may also allow the controller to provide robust timing and synchronization out to the cells, which can be useful for the proper operation of the radio access network (RAN), for example. The overall solution can have support for Institute of Electrical and Electronics Engineers (IEEE) 1588v2 and Synchronous Ethernet (Sync-E). This is described in further detail in U.S. Ser. No. 14/586,507, entitled CONTROLLER-BASED NETWORK DEVICE TIMING SYNCHRONIZATION, filed Dec. 30, 2014, the entire contents of which are incorporated by reference herein.

Another example use-case is the support of macro-cellular traffic. Typically a cell-site router will be placed in a but at the site of the cell-tower, and the cell-site router aggregates traffic from a number of access devices—2G, 3G, 4G/LTE—and carries them to the pre-aggregation box in the CO. With the dramatic increase in mobile traffic, the backhaul of traffic from the macro-cell sites to the core network is a key area of spend for service providers. Also, the advent of LTE and LTE-A has created an inflection point where the service providers are considering packet transport for the backhaul traffic.

The key requirements from this use case are: (1) backhaul-technology-agnostic, working well for both wired and wireless backhaul of mobile traffic. In certain deployments, there may be fiber or other wired access to the cell-tower, while in other deployments, because of the terrain wireless backhaul, may be preferred. (2) Support for X2 interface is also needed. Long-term evolution (LTE) introduces the notion of an X2 interface between adjacent cells, primarily for the purpose of transferring low latency control traffic between cells. The techniques of this disclosure can provide support for such east-west connections or paths between cells (e.g., between access nodes). (3) Robust timing and synchronization out to the cells, and (4) ruggedization. The backhaul device at the cell tower typically sits in an enclosure but is still exposed to the elements. Such devices need to be ruggedized, as they operate under extreme conditions.

Another example use case for the techniques of this disclosure is for fixed wireless broadband. In places where sites are very far apart (as in rural areas) or in places where it is hard to install Ethernet cable or fiber, the last hop from the CO to the residence may need to be over wireless links. Fixed wireless broadband access is quite common in developing countries as it allows quick rollout of services and on-boarding of subscribers. Also, in rural areas of developed countries, where houses are far apart, such wireless access is commonly used to connect customers to the network. Typically, a tower with some point-to-multipoint technology is used to connect to wireless devices on the sides of houses, from where wired or wireless (e.g., Wi-Fi) connectivity is provided to the residents in the dwelling. The key requirements from this use-case are: (1) Robust wireless backhaul support: The key feature in this use-case is that the last hop to the customer-premise is wireless. So, the solution needs be able to support high capacity and QoS over this wireless link. (2) Scale: Since this use-case is about connectivity to customer premises, the scale is likely to be large as the leaf-nodes (customer dwellings) could be in the hundreds. Managing a large number of end-devices is a key requirement as is monitoring and troubleshooting. (3) Plug-and-play: The previous point about large scale also necessitates plug-and-play support to avoid having the service provider to send expert technicians to help set up the equipment at the customer premises. The customers should ideally be able to connect the device and then the device should be able to connect to the network, find the Controller and configure itself. (4) Small software footprint: The CPE devices are usually very inexpensive and have very limited hardware capabilities in terms of CPU power and memory. The software that runs on these devices for controlling the device needs to be lightweight. (5) Ruggedized: The backhaul devices on the tower and on the side of the dwelling are typically exposed to the elements. Such devices need to be ruggedized as they operate under extreme conditions.

Another example use case is for a converged access and aggregation network. Service providers today are under increased pressure to provide bandwidth and services while keeping prices flat. One typical way they are doing this is by converging the mobile backhaul, residential and business networks, which previously used to be run as three separate networks. By moving to a common or universal backhaul infrastructure for these three key networks, the SPs are able to save expenses by making better use of capacity, by providing a common management infrastructure for configuration, monitoring and troubleshooting and by using common subscriber management functionality. Residential and business networks typically use wired backhaul to the CO, running over DSL, cable or optical fiber. Mobile backhaul networks could use wired or wireless backhaul.

The key requirements from this use-case for the architecture are: (1) Plug-and-play: The need to support large numbers of Endpoints on customer premises, business sites and cell-sites necessitates plug-and-play devices to avoid having the service provider send expert technicians to help set up the equipment at every location. Untrained technicians or even the customer should be able to install the devices and connect them to power, and then the device should be able to connect to the network, find the Controller and configure itself. (2) Small software footprint: The CPE devices are usually very inexpensive and have very limited hardware capabilities in terms of CPU power and memory. The software that runs on these devices for controlling the device needs to be lightweight. (3) Interoperability: Most SPs already have a lot of equipment out in the field, and they are unwilling to completely rip-and-replace their gear for a new technology. So, any new technology needs to be able to interoperate with the equipment that is already in the field. Also, some SPs are typically unwilling to buy all their equipment from a single vendor. They prefer standards-based technologies that will work with equipment from multiple vendors, rather than be locked with a proprietary technology from a single vendor, regardless of how good the technology is. There are, of course, other SPs that are willing to deploy proprietary technology from a vendor, because their preference is to deploy an end-to-end solution from a single vendor. (4) Wired and wireless backhaul: The solution should be backhaul-technology-agnostic, and work well for both wired and wireless backhaul. In this use-case, the backhaul is primarily wired, although there may be some wireless backhaul for the mobile traffic.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
sending, by a network node, a plurality of hello messages to neighboring network nodes within a network, wherein each of the plurality of hello messages is sent on a different respective network link coupled to the network node and includes an indicator specifying a respective distance as a number of network hops from the network node to a centralized controller that manages the network;
receiving, by the network node, a plurality of hello reply messages from respective neighboring network nodes within the network in response to the plurality of hello messages, wherein each of the plurality of hello reply messages is received on a different respective network link coupled to the network node and includes a respective indicator specifying a respective distance as a number of network hops from the respective neighboring network node sending the hello reply messages to a centralized controller that manages the network;
determining, by the network node and based at least in part on the respective distance specified by one or more of the plurality of hello reply messages received from the neighboring network nodes, an active one of the network links coupled to the network node to one of the neighboring network nodes having a shortest distance to the centralized controller;
forwarding, by the network node, a discover message on the active link to the neighboring network node having the shortest distance to the centralized controller, wherein the discover message includes a neighbor node list specifying a set of neighboring network nodes from which hello reply packets were received and an intermediate node list that will specify a set of network nodes the discover message will traverse; and
after receiving a discover reply message sent by the centralized controller in response to the centralized controller receiving the discover message, sending, by the network node, a control message to the centralized controller encapsulated with a Multi-protocol Label Switching (MPLS) label that indicates the control message is to be automatically forwarded by a receiving one of the network nodes along a shortest path toward the centralized controller.

2. The method of claim 1, further comprising:
receiving, by the network node, a second discover message from a neighboring one of the network nodes;
checking, by the network node, whether an intermediate node list specified by the second discover message includes the network node;
in response to determining that the intermediate node list includes the network node, discarding the second discover message; and
in response to determining that the intermediate node list does not include the network node:
updating, by the network node, the intermediate node list to include the network node and an ingress port and egress port of the network node; and
forwarding, by the network node, an updated second discover message on the active link to the neighboring network node having the shortest distance to the centralized controller.

3. The method of claim 2, wherein the intermediate node list identifies a Media Access Control (MAC) address of each of the plurality of network nodes, and corresponding ingress and egress port pairs through which the discover message traversed from the network node to an edge node, inclusive of the network node and the edge node.

4. The method of claim 1, further comprising:
by the network node, periodically broadcasting a hello message as a link-local broadcast message on all ports of the network node;
by the network node, receiving respective hello reply messages from the neighboring network nodes in response to the broadcast hello messages;
in response to receiving the respective hello reply messages:
setting as active a link on which the respective hello reply messages are received from the neighboring network nodes; and
updating a table of shortest distances to the centralized controller based on at least one member selected from a group consisting of (1) the number of network hops specified by the hello messages and (2) the number of network hops specified by the respective hello reply messages; and
by the network node, adding the neighboring network nodes from which hello reply messages are received to the neighbor node list.

5. The method of claim 1, wherein the discover message comprises a first discover message that specifies a first generation number, the method further comprising:
sending, by the network device, a keepalive message to the centralized controller; and
in response to receiving no keepalive reply message from the centralized controller within a time period after sending the keepalive message, forwarding a second discover message on the active link, wherein the second discover message specifies a second generation number having a value greater than a value of the first generation number.

6. The method of claim 1, further comprising:
receiving, by the network node, a control message sent by the centralized controller and destined for a neighboring network node, wherein the control message is encapsulated within a label stack comprising a plurality of MPLS labels allocated by the centralized controller;

by the network node, removing an outer label of the label stack; and forwarding the control message with a modified label stack to a next hop selected based on the outer label.

7. The method of claim 1, wherein sending the control message to the centralized controller comprises sending an endpoint indication message that indicates an endpoint status change, wherein the endpoint indication message specifies a type of an endpoint, an address of the endpoint, and a status of the endpoint indicating whether the endpoint is up or down.

8. The method of claim 7, wherein sending the control message to the centralized controller comprises sending a direct switch response message to acknowledge receipt of a direct switch request message from the centralized controller for mapping traffic from the endpoint to a pseudo wire.

9. The method of claim 1, wherein sending the control message to the centralized controller comprises sending a pseudo wire response message to acknowledge receipt of a pseudo wire request message from the centralized controller for creating a pseudo wire on the network node.

10. A network node comprising:
one or more processors;
one or more physical interfaces configured to send a plurality of hello messages to neighboring network nodes within a network, wherein each of the plurality of hello messages is sent on a different respective network link coupled to the network node and includes an indicator specifying a respective distance as a number of network hops from the network node to a centralized controller that manages the network,
wherein the one or more physical interfaces receive a plurality of hello reply messages from respective neighboring network nodes within the network in response to the plurality of hello messages, wherein each of the plurality of hello reply messages is received on a different respective network link coupled to the network node and includes a respective indicator specifying a respective distance as a number of network hops from the respective neighboring network node sending the hello reply messages to a centralized controller that manages the network; and
a protocol module executing on the one or more processors, wherein the protocol module is configured to determine, based at least in part on the respective distance specified by one or more of the plurality of hello reply messages received from the neighboring network nodes, an active one of the network links coupled to the network node to one of the neighboring network nodes having a shortest distance to the centralized controller,
wherein the protocol module is configured to forward a discover message on the active link to the neighboring network node having the shortest distance to the centralized controller, wherein the discover message includes a neighbor node list specifying a set of neighboring network nodes from which hello reply packets were received and an intermediate node list that will specify a set of network nodes the discover message will traverse; and
wherein the protocol module is configured to, after receiving a discover reply message sent by the centralized controller in response to the centralized controller receiving the discover message, send a control message to the centralized controller encapsulated with a MPLS label that indicates the control message is to be automatically forwarded by a receiving one of the network nodes along a shortest path toward the centralized controller.

11. The network node of claim 10, wherein the one or more physical interfaces are configured to receive a second discover message from a neighboring one of the network nodes,
wherein the protocol module is configured to check whether an intermediate node list specified by the second discover message includes the network node;
wherein the protocol module is configured to, in response to determining that the intermediate node list includes the network node, discard the second discover message; and
wherein the protocol module is configured to, in response to determining that the intermediate node list does not include the network node:
update the intermediate node list to include the network node and an ingress port and egress port of the network node; and
forward an updated second discover message on the active link to the neighboring network node having the shortest distance to the centralized controller.

12. The network node of claim 10, wherein the discover message comprises a first discover message that specifies a first generation number, wherein the protocol module is configured to send a keepalive message to the centralized controller, and
wherein the protocol module is configured to, in response to receiving no keepalive reply message from the centralized controller within a time period after sending the keepalive message, forwarding a second discover message on the active link, wherein the second discover message specifies a second generation number having a value greater than a value of the first generation number.

13. The network node of claim 10, further comprising a forwarding plane,
wherein the one or more physical interfaces are configured to receive a control message sent by the centralized controller and destined for a neighboring network node, wherein the control message is encapsulated within a label stack comprising a plurality of MPLS labels allocated by the centralized controller;
wherein the forwarding plane removes an outer label of the label stack, and forwards the control message with a modified label stack to a next hop selected based on the outer label.

14. The network node of claim 10, wherein the control message comprises an endpoint indication message that indicates an endpoint status change, wherein the endpoint indication message specifies a type of an endpoint, an address of the endpoint, and a status of the endpoint indicating whether the endpoint is up or down.

15. The network node of claim 14, wherein the control message comprises a direct switch response message to acknowledge receipt of a direct switch request message from the centralized controller for mapping traffic from the endpoint to a pseudo wire.

16. The network node of claim 10, wherein the control message comprises a pseudo wire response message to acknowledge receipt of a pseudo wire request message from the centralized controller for creating a pseudo wire on the network node.

* * * * *